US006357292B1

(12) United States Patent
Schultz et al.

(10) Patent No.: US 6,357,292 B1
(45) **Date of Patent: *Mar. 19, 2002**

(54) APPARATUS AND METHOD FOR REMOTE SENSING AND RECEIVING

(75) Inventors: Thomas J. Schultz, Neenah; Alan J. Campbell, New Berlin, both of WI (US)

(73) Assignee: Sentech Inc., Appleton, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,226

(22) Filed: Mar. 13, 1998

Related U.S. Application Data

(63) Continuation of application No. 08/530,938, filed on Sep. 20, 1995, now Pat. No. 5,728,933, which is a division of application No. 08/226,664, filed on Apr. 11, 1994, now Pat. No. 5,483,826, which is a continuation of application No. 07/792,134, filed on Nov. 13, 1991, now Pat. No. 5,301,553, which is a continuation-in-part of application No. 07/453,785, filed on Dec. 20, 1989, now Pat. No. 5,083,457.

(51) Int. Cl.[7] .......... B60C 23/02
(52) U.S. Cl. .......... 73/146.5
(58) Field of Search .......... 73/146.5, 146.8, 73/178 R; 340/445, 58, 825; 364/558

(56) References Cited

U.S. PATENT DOCUMENTS 4,067,235 A * 1/1978 Markland .......... 73/146.5
4,360,888 A * 11/1982 Onksen et al. .......... 73/178 R
4,695,823 A 9/1987 Vernon .......... 340/58
4,730,188 A 3/1988 Milheiser .......... 340/825

* cited by examiner

*Primary Examiner*—William Oen
(74) *Attorney, Agent, or Firm*—Fenwick & West LLP

(57) ABSTRACT

A sensing and displaying system is provided including a sensor unit having a transducer disposed in intimate contact with a vessel. The transducer senses a characteristic within the vessel like pressure and outputs an electrical signal representative thereof. The sensor unit further includes a response signal generator which transmits a signal representative of the characteristic. A receiver unit receives the transmitted signal and converts it to visual indicia of the characteristic, for example, a number on a liquid crystal display. The system is capable of two-way communication between the sensor unit and the receiver unit. Both the sensor unit and receiver unit store transmitted data in internal memory.

1 Claim, 23 Drawing Sheets

APPARATUS AND METHOD FOR REMOTE SENSING AND RECEIVING

RELATED PATENT APPLICATIONS

This is a continuation of application Ser. No. 08/530,938 filed on Sep. 20, 1995 now U.S. Pat. No 5,728,933, which is a divisional of application Ser. No. 08/226,664 filed on Apr. 11, 1994, now issued U.S. Pat. No. 5,483,826, which is a continuation of application Ser. No. 07/792,134 filed on Nov. 13, 1991, now issued U.S. Pat. No. 5,301,553, which is a continuation-in-part of application Ser. No. 07/453,785 filed on Dec. 20, 1989, now issued U.S. Pat. No. 5,083,457. The disclosure of co-pending application Ser. No. 08/530, 938, titled "Apparatus and Method for Remote Sensing and Receiving", and filed on Sep. 20, 1995 is incorporated by reference herein.

TECHNICAL FIELD

The present invention relates, generally, to a transmitter and receiver combination for measuring a parameter, pressure, force, or weight, within a vessel, and more particularly, to a sensor unit including a transducer and an infrared generator cooperating therewith, for transmitting infrared signals to a remote receiver unit including a measurement display.

BACKGROUND OF THE INVENTION

Measurements of physical parameters related to various vessels, containers or equipment need to be taken in order to ensure maximum safety, and efficiency. Unfortunately, taking the measurements is often difficult, time consuming, or dangerous. Taking the measurements is often difficult because the gauges or displays for providing the needed measurements are often located in places which are difficult to view. For instance, truck tire gauges are notoriously difficult, unpleasant, and time consuming to view as discussed in Ser. No. 07/453,785.

Taking measurements is often time consuming because gauges or other devices for displaying the physical parameter must be viewed by a human being. An inspector often must record such measurements for a large number of vessels. Unfortunately, the gauges are often difficult to read and often require physical contact in order to make measurements. For example, a fire inspector or other building personnel may be required to determine if all the fire extinguisher devices in a particular building are adequately filled or fully charged by reading a small gauge which is often obscured by other equipment. Even more difficult, some types of fire extinguisher devices can only be measured by physically weighing the device. Thus, reading gauges manually is time consuming and expensive.

Also, taking measurements is time consuming because data must be recorded by hand. Besides recording the measurement, the inspector is usually required to write down all relevant information pertaining to the inspection of the multitude of fire extinguisher devices. For instance, the inspector is expected to record data such as date, time, and unit identification along with the measurements. This procedure is time consuming and leaves many opportunities for inspector error.

Taking measurements can be dangerous to both humans and the environment. Frequently, the measurement process involves exposure to harmful matter or dangerous moving parts. For instance, refrigerators, air conditioners, and other cooling devices contain ammonia or other dangerous chemicals. Frequently, measuring the quantity of ammonia or freon in a device requires opening the system and attaching a pressure gauge. Inevitably ammonia or freon is released into the environment. Even worse, large amounts of ammonia or freon are often accidentally spilled when taking measurements.

Thus, a low cost system for measuring physical parameters of various types of vessels, containers or equipment is needed which improves ease, efficiency, and safety.

SUMMARY OF THE INVENTION

The present invention provides a remote sensing and receiving system including a sensor unit and a remote receiver unit. The sensor unit includes a transducer disposed to sense the physical parameter of an apparatus. The transducer generates an electric signal representative of the magnitude of the physical parameter and applies this signal to an LED driver. The LED driver modulates an LED, which transmits an infrared (IR) signal.

The remote receiver unit receives a modulated IR signal and applies the IR signal to a processor. In response, the processor drives a digital display, which produces visual indicia indicative of the magnitude of the physical parameter.

The present invention also can be configured to allow for two-way communication between the sensor unit and remote receiver unit. The receiver unit controls the sensor unit by transmitting activation signals for turning the sensor unit on, reading signals for requesting data from the sensor unit, and writing signals for transmitting data to the sensor unit. The sensor and the receiver unit each have a transmitter and a receiver to enable communication through pulses of carrier signals. The data communicated can be stored in memory in the sensor unit or the receiver unit.

BRIEF DESCRIPTION OF THE DRAWING

Preferred exemplary embodiments of the remote sensing and receiving system, in accordance with the present invention, will hereinafter be described in conjunction with the appended drawings wherein like designations denote like elements, and.

DETAILED DESCRIPTION OF THE PREFERRED EXEMPLARY EMBODIMENTS

Figure 1:
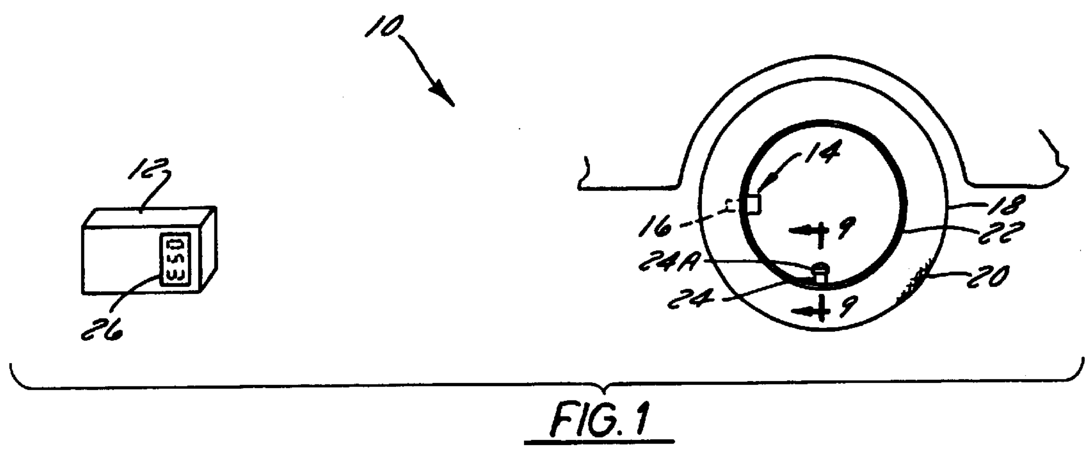
FIG. 1 is a schematic representation of a remote display unit and a transmitter unit, including a transducer mounted on a conventional vehicle tire.

Referring now to FIG. 1, a remote sensing and receiving system or detect and display system is configured as a tire pressure sensor apparatus in accordance with a first embodiment of the present invention. The tire pressure sensor apparatus includes a display unit 12 and a transducer unit 14 having a pressure sensor unit 16 or other transducer exposed to the pressurized air in a tire 18. Pressure sensor unit 16 is illustratively disposed within the pressurized cavity of tire 18, between the tread portion 20 and rim 22 of tire 18. However, those skilled in the art will appreciate that pressure sensor unit 16 may assume any suitable disposition which allows it to sense the internal tire pressure. For example, as discussed in greater detail below, pressure sensor unit 16 may be mounted within the valve 24 of tire 18, either in the stem or cap of the valve. Alternatively, pressure sensor unit 16 may be mounted to, embedded within or extend from the sidewall portion of the tire, tread 20, or rim 22.

Pressure sensor unit 16 is configured to convert tire pressure into an electrical signal representative of tire pressure, for subsequent transmission to display unit 12. In response to a pressure transmission, display unit 12 produces visual indicia, such as, for example, a digital readout 26, representative of tire pressure.

Figure 2A:
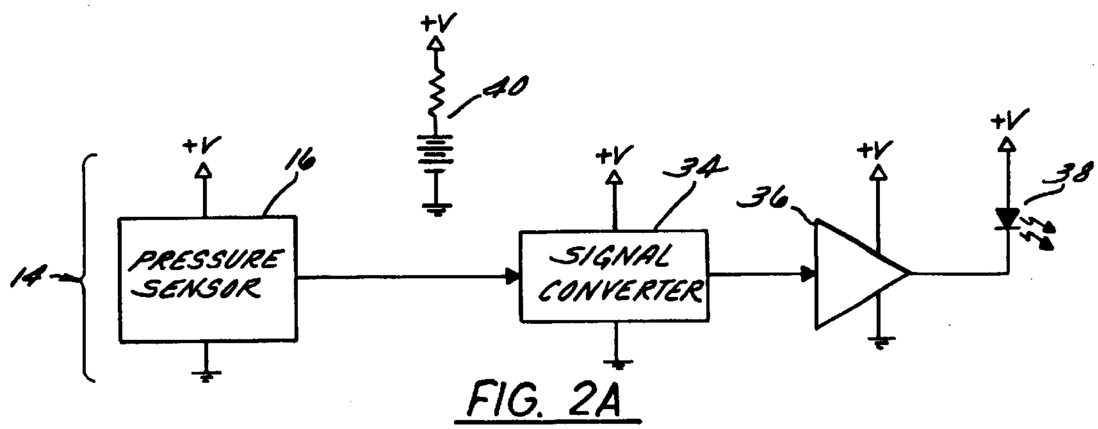
FIGS. 2A and 2B are schematic block diagrams of an alternate preferred embodiment of a remote sensing and receiving system configured to be used as a tire pressure sensor system.

Referring now to FIG. 2A, transducer unit 14 suitably includes a suitable pressure sensor (a transducer like pressure sensor unit 16), a suitable signal converter 34, a light emitting diode driver 36 and an LED 38.

Pressure sensor unit 16 is advantageously configured to sense tire pressure, generate an electrical signal indicative of the sensed pressure, and apply the signal to signal converter 34. Signal converter 34 converts the pressure signal into an encoded form suitable for use as a modulating signal for LED 38, i.e., LED 38 is modulated in a manner which represents the sensed pressure as a selected characteristic of the encoded signal, e.g., frequency, pulse code, pulse width, etc. Signal converter 34 includes a suitable encoder, such as, for example, a voltage-to-frequency converter, an analog-to-digital converter, a voltage-to-pulse width converter, or the like, and supporting circuitry.

The encoded signal indicative of tire pressure produced by signal converter 34 is applied to LED driver 36. The output of LED driver 36 drives an LED 38, which emits a modulated response signal, suitably in the infrared frequency range, indicative of tire pressure. The LED emissions are preferably directional, so that the hand-held display unit can discriminate between individual tires, even where the tires are in close proximity to each other. The foregoing components associated with transducer circuit 14 are suitably powered by a battery circuit 40 disposed within the transducer unit. A specific embodiment of pressure sensor unit 16 will hereinafter be described in more detail in conjunction with FIG. 5.

Figure 2B:
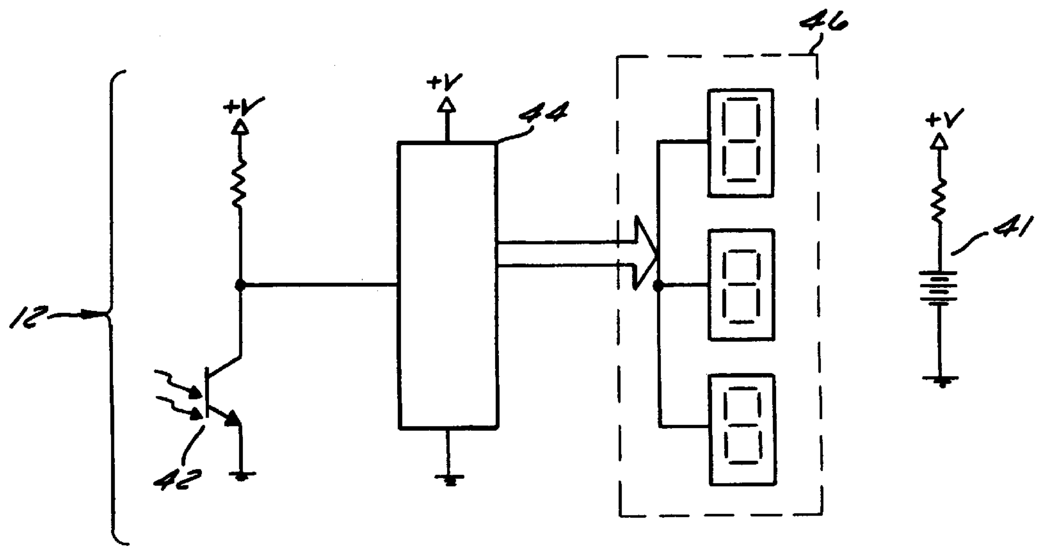

Referring now to FIG. 2B, display unit 12 includes: a battery circuit 41; an appropriate sensor 42, e.g. an IR sensor; a processor 44; and a conventional display 46. The modulated signal transmitted by LED 38 is received at display unit 12 by sensor 42. The voltage from battery 41 is applied to sensor 42, and is modulated in accordance with the response signal received from transducer circuit 14. The modulated signal is applied to a processor 44, wherein information is extracted from the signal and manipulated into a form suitable for application to display 46. Display 46 generates visual indicia, for example a digital readout, representative of tire pressure. A specific embodiment of display unit 12 will hereinafter be described in more detail in conjunction with FIGS. 3 and 4.

As discussed in greater detail below, the functions performed by the various elements comprising the foregoing schematic circuit diagrams may be implemented in a variety of ways. For example, the functions performed by transducer unit 14 may be embodied in a unitary microchip (integrated circuit) for convenient disposition within the valve stem or valve stem cap of a vehicle tire. The functional elements comprising the display unit 12 may similarly be implemented in a microchip or microprocessor, and incorporated into a hand-held remote control display device.

Figure 3A:
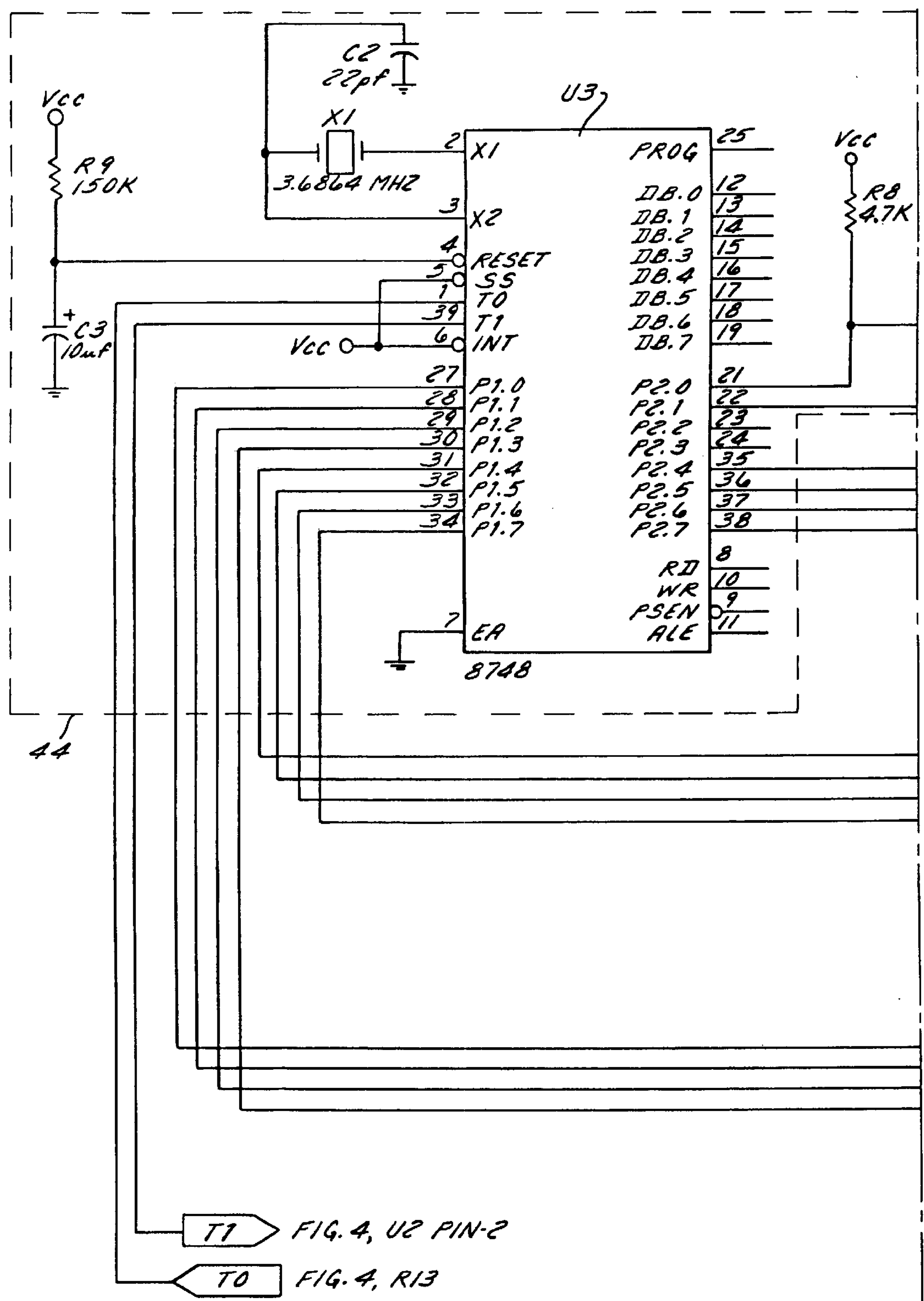
FIGS. 3A, 3B and 4 are electrical schematic circuit diagrams of an alternate preferred embodiment of the display in accordance with one aspect of the present invention.
Figure 3B:
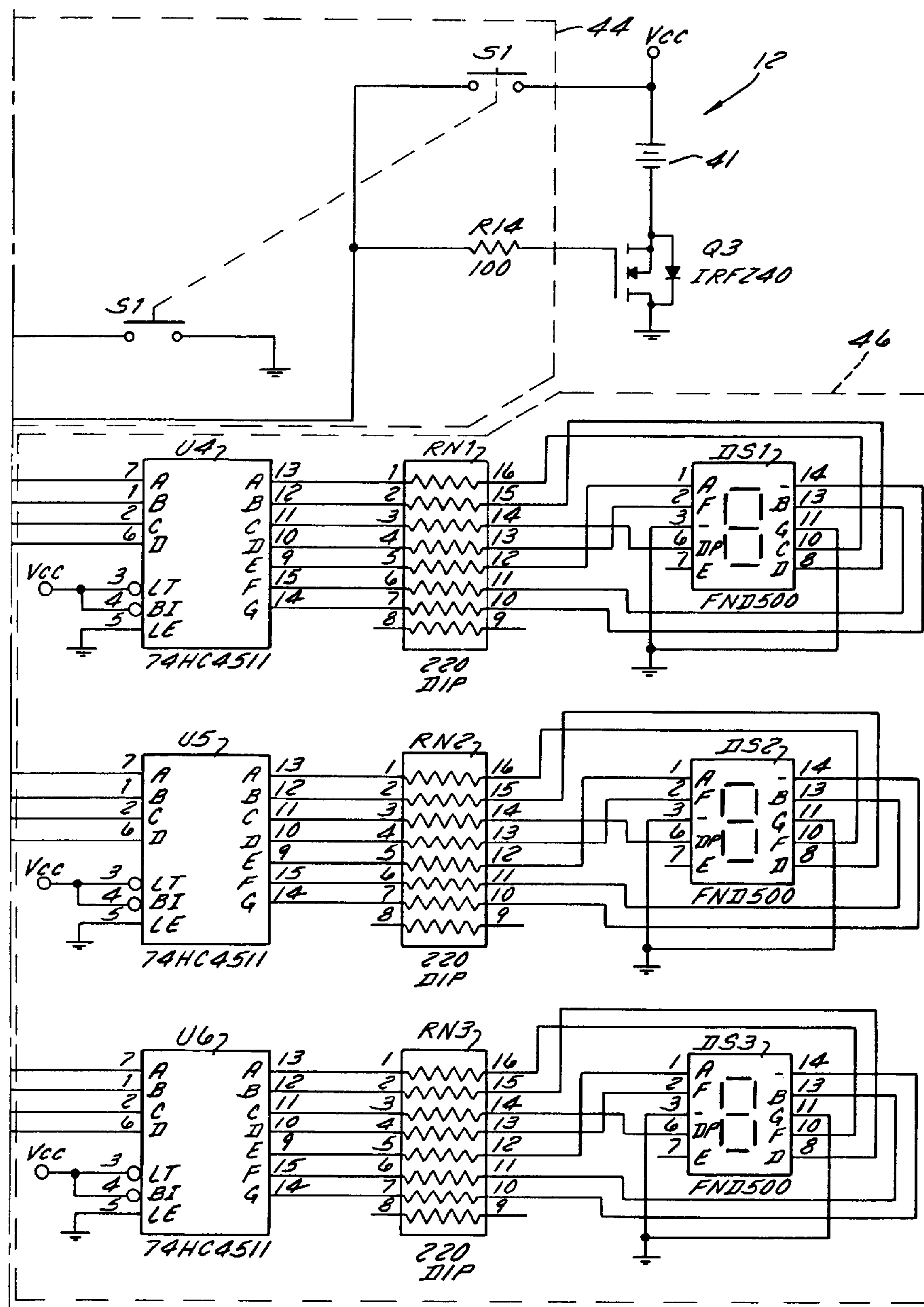
Figure 4:
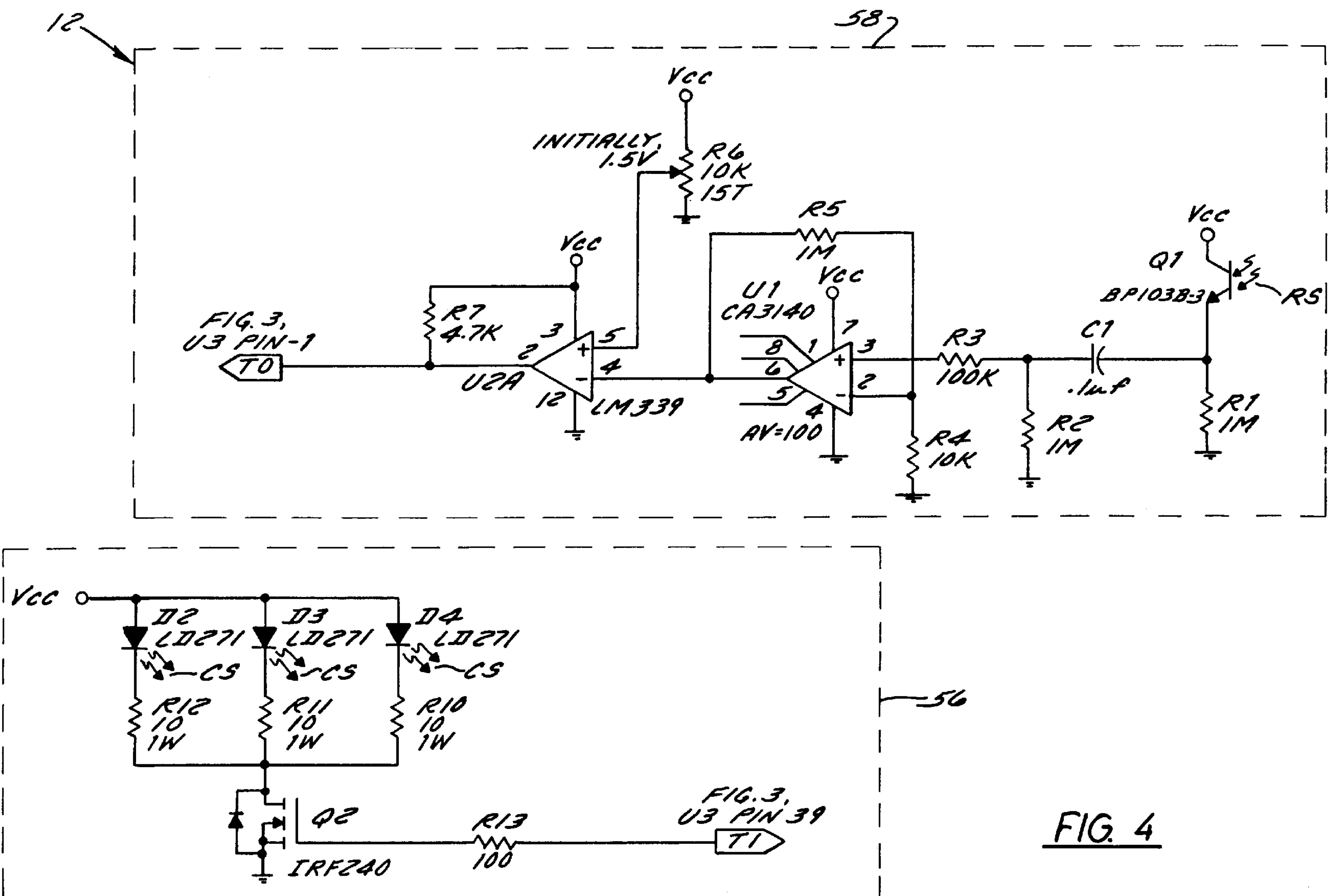
Figure 5:
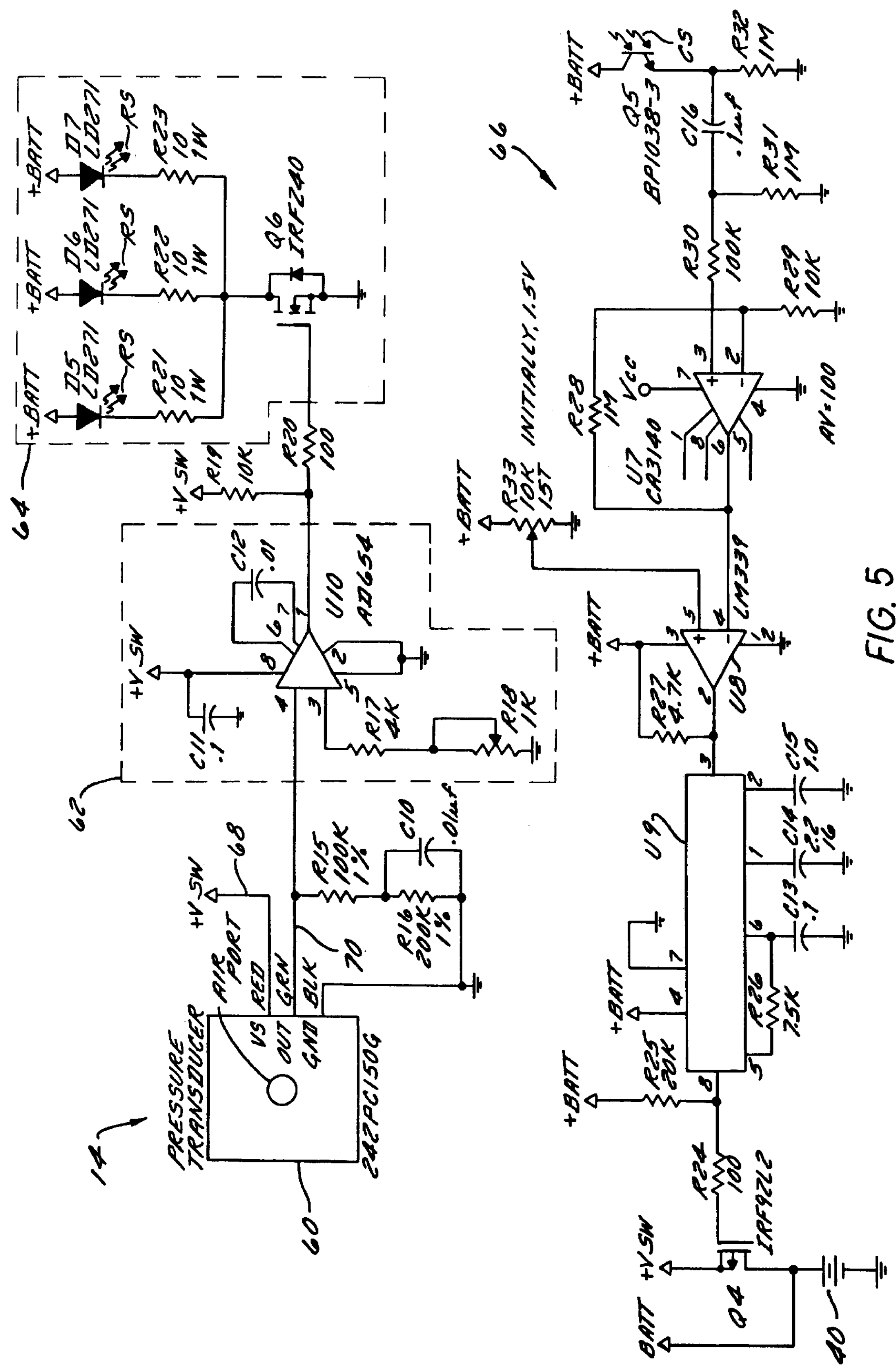
FIG. 5 is an alternate preferred embodiment of the display unit in accordance with another aspect of the present invention.

Referring now to FIGS. 3–5, an embodiment of tire pressure sensing system 10 employing frequency modulation for encoding will be described.

With specific reference to FIGS. 3A, 3B and 4, processor 44 of display unit 12 suitably comprises a switch 51, a processor U3 including a clock X1, a command generator circuit 56, and an amplifier circuit 58. Display 46 suitably comprises three conventional seven segment displays DS1, DS2, and DS3, and associated drivers.

To conserve power, display unit 12 remains in a "dormant" state until "powered up" by the operator, as described below. In the dormant state, i.e., when switch 51 is open, pins 21 and 22 of processor U3 terminate at an open circuit. When it is desired to determine the tire pressure, the operator depresses switch 51 to power up display unit 12.

More particularly, battery 41 cooperates with switch 51, a resistor R14, and a transistor Q3, (e.g., an IRFZ40 field effect transistor manufactured by the Motorola Semiconductor Company). With switch 51 open, no current flows through resistor R14. When switch 51 is closed, current is applied to the base of transistor Q3 through resistor R14, thereby turning on transistor Q3 and allowing the output from battery 41 to be applied to pin 22 of processor U3. Each time switch 51 is depressed, software resident in processor U3 initiates an active cycle having a predetermined duration, e.g. ten seconds, during which pin 22 is maintained at a high logic state. Closure of switch 51 also drives pin 21 of processor U3 to a low logic state (illustratively to ground).

Processor U3 suitably comprises an HMOS-E single component 8-bit microcomputer, for example a Model 8748H manufactured by Intel. The timing for processor U3 is suitably provided at pins 2 and 3 thereof by clock X1, suitably comprising a 3.6864 Mhz crystal.

In the powered-up condition, i.e., when switch 51 is closed, processor U3 generates a command reference signal at output terminal T1 (pin 39). The command reference signal suitably corresponds to a tone of predetermined frequency. The command reference signal is applied to a lead T1 of command generator 56 (FIG. 4), thereby turning a transistor Q2 on and off in accordance with the frequency of the command reference signal. Transistor Q2 is advantageously similar to transistor Q3, described above.

In response to the application of the pulsed command reference signal to the base of transistor Q2, VCC is applied across respective LEDs D2, D3 and D4. Respective LEDs D2–D4 suitably comprise respective IR emitters, Model No. LD271, manufactured by Seimens-Litronix. Thus, respective LEDs D2–D4, under the control of processor U3, generate emissions modulated with a predetermined frequency (tone). As described in greater detail below, the frequency modulated infrared signal transmitted by command generator 56 comprises a "wake-up" command signal C5 used to activate transducer unit 14. Also as described in greater detail below, transducer unit 14 responsively transmits an infrared signal, indicative of tire pressure, back to display unit 12.

With continued reference to FIG. 4, a response signal R5 generated by transducer unit 14 is received by display unit 12 at amplifier circuit 58. More particularly, response signal R5 is sensed by a photo-sensitive transistor Q1. Transistor Q1 is suitably a photo-transistor, Model No. BP103B-3, manufactured by Seimens-Litronix. Upon application of response signal R5 to the base of transistor Q1, transistor Q1 generates a signal at the emitter thereof indicative of response signal R5, and hence, indicative of the encoded sensed pressure. The received signal is applied to a filter comprising a capacitor Cl and a resistor R1. The filtered signal is then applied to pin 3 of an amplifier U1, e. g., a BIMOS operational amplifier CA3140 integrated circuit, with a gain of 100. The amplified signal representative of tire pressure is applied to pin 4 of a comparator U2A.

Comparator U2A is suitably a low power, low offset voltage comparator, e.g., a Model No. LM339 manufactured by National semiconductor. Comparator U2A advantageously cooperates with a variable resistor R6 to adjust the sensitivity of amplifier circuit 58. Specifically, the resistance of R6 may be selected such that a desired voltage level is maintained at pin 5 of comparator U2A. In this way, only those voltage levels present at pin 4 of comparator U2A which are above a predetermined threshold level are passed through the comparator.

Comparator U2A applies an output signal to a lead TO connected to pin 1 of processor U3 (FIG. 3). Processor U3 converts the signal received at pin 1 thereof into respective first, second, and third parallel binary signals for subsequent application to display 46.

More particularly, processor U3 outputs a first 4-bit binary signal at pins 35–38 thereof, which first 4-bit binary signal is applied to respective pins 1, 2, 6, and 7 of a first display driver U4 in display 46. Driver U4 suitably comprises a BCD-to-7-segment latch/decoder, for example Model No. MC54/74HC4511 manufactured by Motorola. In response to the application of the first binary signal, driven U4 applies a first output signal, through a resistive network RN1, to a first display D51. Display D51 suitably comprises a 7-segment display, for example Model No. FND500 manufactured by Fairchild semiconductor.

Similarly, processor U3 applies second and third 4-bit binary signals to display drivers D5 and D6 which, in turn, drive display D52 and D53, respectively. Displays D51 DS2, and D53 cooperate to produce a 1, 2, or 3 digit numeric display indicative of the tire pressure sensed by transducer unit 14.

Referring now to FIG. 5, transducer unit 14 suitably comprises a pressure transducer 60, a voltage-to-frequency converter 62, an IR sender 64, and a power circuit 66.

Figure 9:
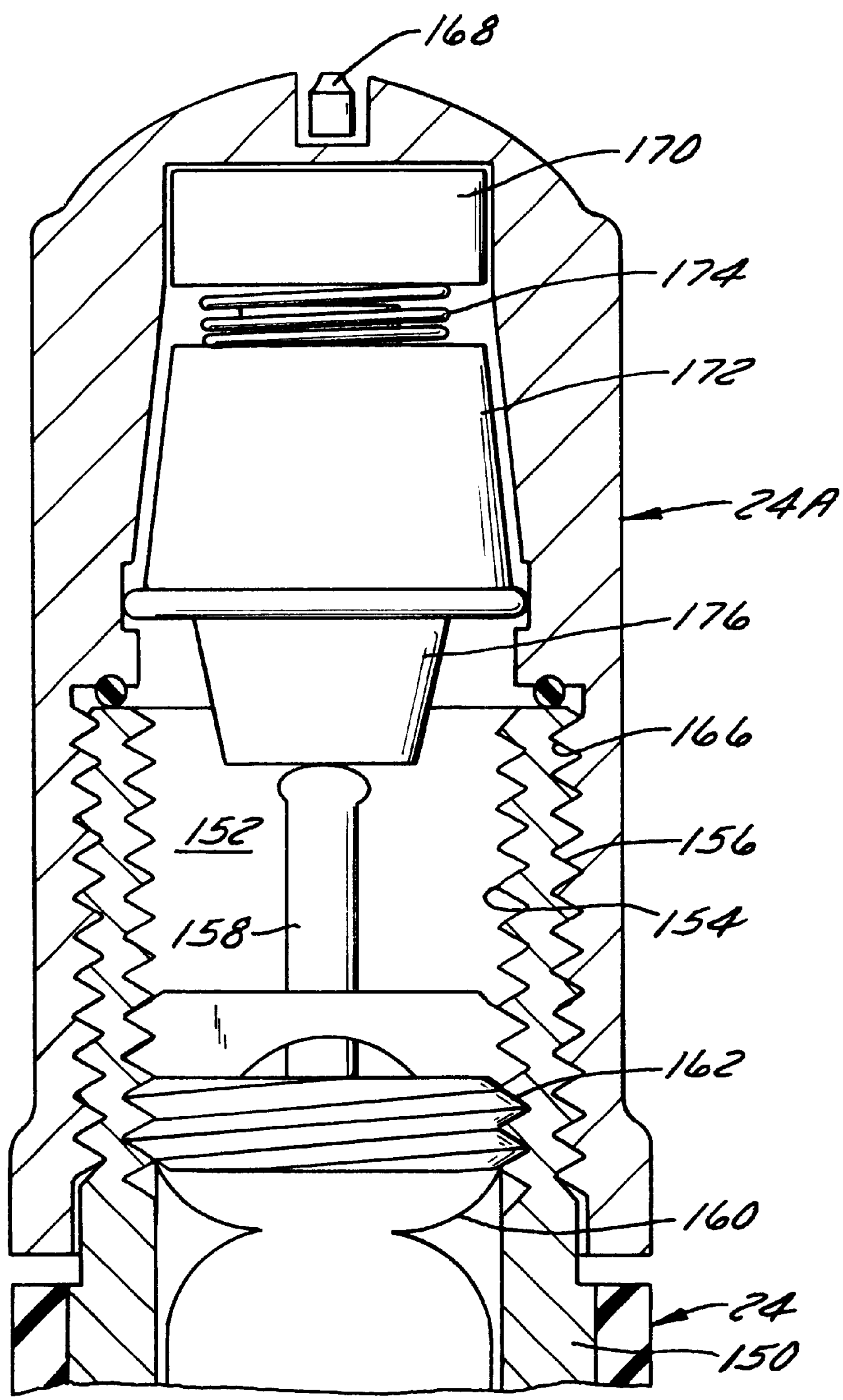
FIG. 9 is a cross-section view, taken along line 9—9 in FIG. 1, of a tire valve stem and valve stem cap with an alternate preferred embodiment of the present invention.

In a preferred embodiment of the present invention, transducer unit 14 is configured for disposition within a modified valve stem cap for use in conjunction with conventional vehicle tire valve stems (see FIG. 9). In this manner, a low cost pressure sensor circuit may be powered by a battery which, upon depletion of power, may be discarded. Nonetheless, it is desirable to construct the transducer circuit such that a minimum amount of power is consumed. Transducer unit 14 therefore preferably operates in alternative "dormant" and "active" states. The active state is triggered by reception of command signal CS from display unit 12.

Power circuit 66 controllably provides power to the respective components of transducer unit 12, in accordance with the operational state. Respective parallel voltage outputs +EATT and +v Sw are provided: +EATT, a low level, constant voltage output for supplying operating power to the various components comprising transducer unit 14; and +v SW, selectively provided through a transistor Q4, to pressure transducer 60, converter 62, and IR sender 64. Transistor Q4 is turned on only upon receipt of command signal CS by power circuit 66 from command generator 56 (FIG. 4). Accordingly, transducer unit 14 consumes a minimal amount of battery power when transistor Q4 is off.

Command signal CS is received at a photo-sensitive transistor Q5 in power circuit 66. Upon reception of command signal CS at the base of transistor Q5, a signal indicative of command signal CS is generated at the emitter of transistor Q5. The received signal is filtered (by a capacitor C16 and a resistor R31) and applied to an amplifier U7, suitably with a gain of 100 and equivalent to amplifier U1.

The output of amplifier U7 is applied to a comparator US, suitably equivalent to comparator U2A. Comparator US cooperates with a variable resistance resistor R33 in a manner similar to that described in connection with amplifier circuit 58 (FIG. 4). In this way, the sensitivity of power circuit 66 may be adjusted so that +V SW is applied to transducer 60 only upon the receipt by transistor Q5 of command signals which exceed a predetermined level determined by resistor 33.

The output of comparator U8 is applied to a tone decoder U9, for example a Model No. LM567 decoder manufactured by National Semiconductor. Tone decoder U9 functions as a simple decoder, producing an output at pin 8 thereof having a high logic state only when the appropriate "tone" is received by transistor Q5. Tone decoder U9 thus functions as a band width discriminator, rejecting input signals having band widths outside the range defined by the foregoing components and producing a high logic output in response to a tone within a predetermined band width.

Pin 8 of decoder U9 is applied to the base of transistor Q4. When a high logic state signal is produced at pin 8 of tone decoder U9, transistor Q4 is turned on, making SW available.

Power circuit 66 thus maintains transducer circuit 14 in a dormant state notwithstanding the receipt by photo-sensitive transistor Q5 of spurious input signals outside the predetermined band width from, for example, sunlight, headlights, and the like.

Transducer 60 suitably comprises an electromechanical transducer capable of generating a low level voltage output, for example between 0 and 10 volts, in response to the application of pressures in the range typically exhibited by vehicle tires, i.e., up to 150 psi. Piezoelectric materials are known to be excellent transducers. Although it is desirable to miniaturize the pressure sensing circuit in the preferred embodiment, a pressure sensor Model No. 24 OPC manufactured by Microswitch has yielded satisfactory results in the laboratory. Those skilled in the art will appreciate that transducer 60 may comprise a suitable microsensor.

Voltage-to-frequency converter 62 suitably comprises a converter U10, for example, a voltage-to-frequency (VF) converter Model No. AD654 manufactured by Analog Devices. With +V SW applied to lead 68 of pressure transducer 60, an output signal is produced at lead 70 and applied to pin 4 of VF converter U10. In response, VF converter U10 produces an output at pin 1 thereof having a frequency which is proportional to tire pressure.

Voltage-to-frequency converter 62 further suitably includes a variable resistance resistor R18 disposed in operative association with convertor U10. Together, VF converter U10 and variable resistance resistor R18 cooperate to calibrate the output at pin 1 of conversion circuit 62 with respect to pressure transducer 60.

More particularly, the resistance of resistor R18 may be selected such that the output at pin 1 of VF converter U10 is zero when transducer 60 is exposed to ambient pressure.

Converter 62 thus generates a signal having a frequency indicative of pressure, ranging from 0 Hz at atmospheric pressure to a predetermined maximum frequency at an anticipated maximum pressure.

The output of converter 62 is applied across a resistor R20 to an output (driver) transistor Q6, which may be equivalent to transistor Q2, described above. The frequency of the signal applied to the base of transistor Q6 represents the modulation frequency of response signal RS generated by IR sender 64.

IR sender 64 includes a plurality of LEDs D5, D6, and D7, which may be equivalent to LEDs D2–D4 discussed above in connection with command generator circuit 56. More particularly, LEDs D5–D7, in respective series connections with resistors R21–R23, are disposed in parallel, between $^{-}$BATT from battery 40 and transistor Q6. Upon the application of a signal from converter 62 to the base of transistor Q6, a current path through each of LEDs D5–D7 is completed, through transistor Q6 to ground. The frequency of the signal applied at pin 1 of VF converter U10 represents the modulation frequency of response signal RS generated by respective LEDs D5–D7.

As previously mentioned, response signal RS generated by IR sender 64 is received by amplifier circuit RS (FIG. 4) of display unit 12, and is processed to derive pressure information for subsequent display.

The operation of the preferred exemplary embodiment shown in FIGS. 3–5 will be described with reference to FIGS. 6–8.

Software resident in processor U3 governs the operation of tire pressure sensor apparatus 10. Upon the application of Vcc to pin 22 of processor U3, a series of initializing functions are performed (step 102). For example, a high logic input state is maintained at pin 22 for a predetermined cycle time, e.g. ten seconds, regardless of the length of time switch 51 is actually depressed by the operator. In contrast, a low logic state is present at pin 21 only while switch 51 is depressed.

An additional initializing function involves driving respective displays DS1–DS3 of display circuit 46 to a blank condition (step 102). That is, display circuit 54 may display, for example, three zeros, three eights (either constant or flashing) or, alternatively, the display may be literally blank with none of the segments comprising the displays illuminated. Conventional BCD-to-7-Segment logic may be may be advantageously employed in the control of display circuit 54.

A further initializing function involves setting up an internal counter to generate the command reference signal at pin 39 of processor U3 (step 102), although pin 39 is not enabled until step 110, discussed below. In a particularly preferred embodiment, the tone associated with command signal CS corresponds to a frequency of 1209 hz. As discussed above in connection with FIGS. 3 and 4, the command reference signal effects the generation of command signal CS at respective LEDs D2–D4 of command generator circuit 56.

Figure 6:
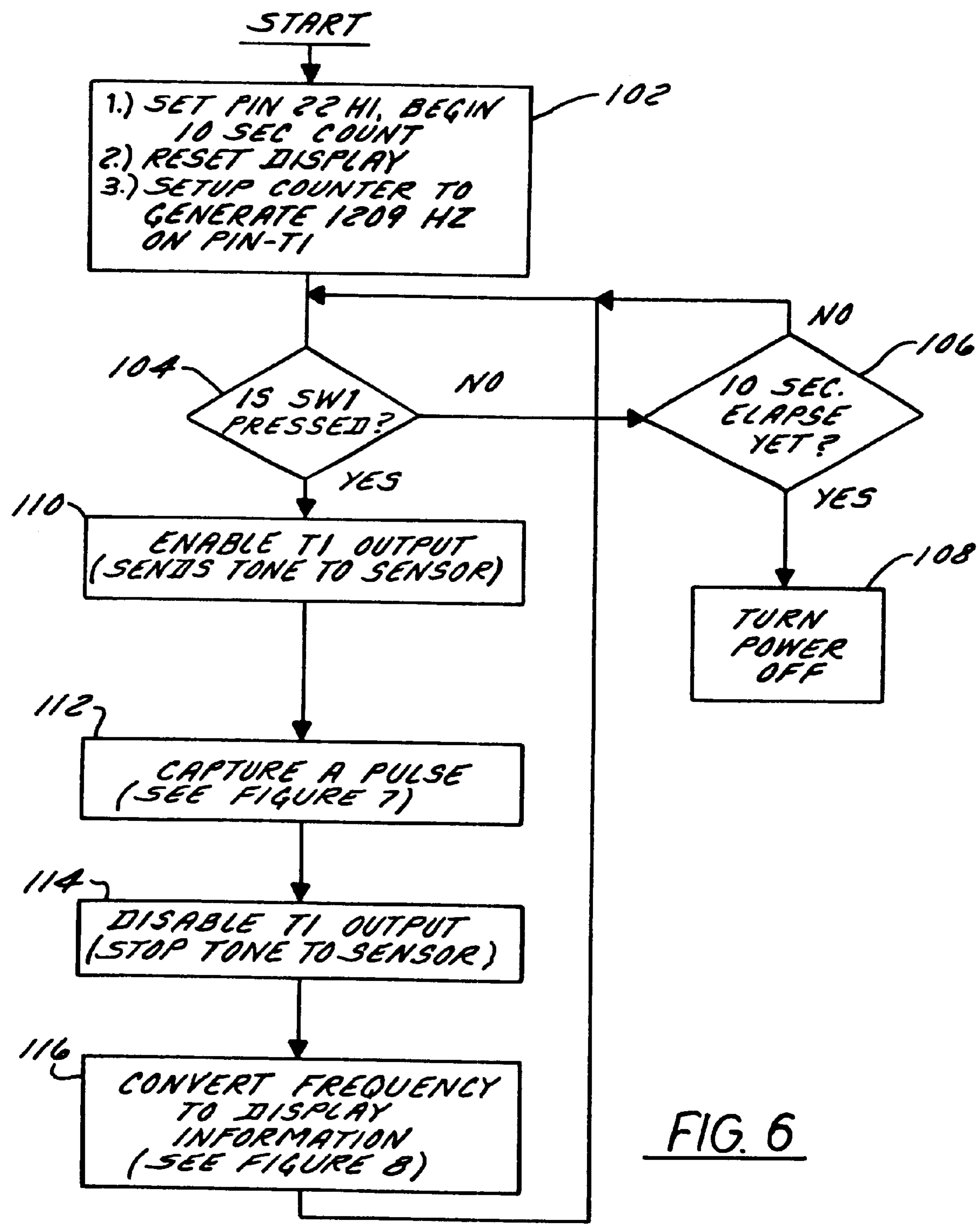
FIGS. 6–8 are flow charts of the operation of remote sensing and receiving system operating as an exemplary tire pressure sensor system.

Each time switch S1 is depressed, the sequence depicted in FIG. 6 is reset, and processor U3 begins executing at the START position. For clarity, it is presumed that switch S1 is initially depressed once.

When it is desired to display the tire pressure sensed by transducer unit 14, the operator depresses switch S1 on hand-held display unit 12. As a result, power is applied to pin 22 of processor U3, and the voltage level at pin 21 is driven low, indicating that switch S1 is depressed.

After initialization, the state of switch S1 is checked (step 104) to determine if switch S1 is depressed. If the voltage level at pin 21 is low, it is determined that switch S1 is depressed; if an open circuit is detected at pin 21, it is determined that switch S1 is not depressed.

If processor U3 determines that switch S1 is depressed, the output at pin 39 is enabled, thereby applying the command reference signal to command generator circuit 56 and transmitting command signal CS to transducer circuit 52 (step 110).

If in step 104 it is determined that switch S1 is not depressed, a predetermined delay period of, for example, ten seconds, is elapsed (step 106). If after 10 seconds switch S1 is not depressed a second time, battery 41 is turned off (step 108). Thus, when the operator requires a "read" by closing switch S1, processor U3 executes the resident software and display unit 12 displays tire pressure for ten seconds, as described below. If switch S1 is pressed again before ten seconds have elapsed, the sequence is interrupted and restarted at START to allow the operator to quickly monitor successive tires without having to undergo a ten second delay between readings. Moreover, battery 41 is automatically turned off ten seconds after the last depression of switch S1.

As discussed above in connection with FIG. 5, transducer circuit 14 emits response signal RS, having a modulation frequency indicative of tire pressure, upon receipt of command signal CS. Response signal RS is captured at pin 1 of processor U3 (step 112). Step 112 will be explained in greater detail in connection with FIG. 7.

Upon capturing response signal RS from transducer unit 14, command signal CS generated at command generator 56 is terminated, i.e., the output at pin 39 of processor U3 is interrupted (step 114), and the frequency of response signal RS is determined and converted by processor U3 to respective first, second and third 4-bit binary signals, as discussed above in connection with FIG. 3 (step 116).

Figure 7:
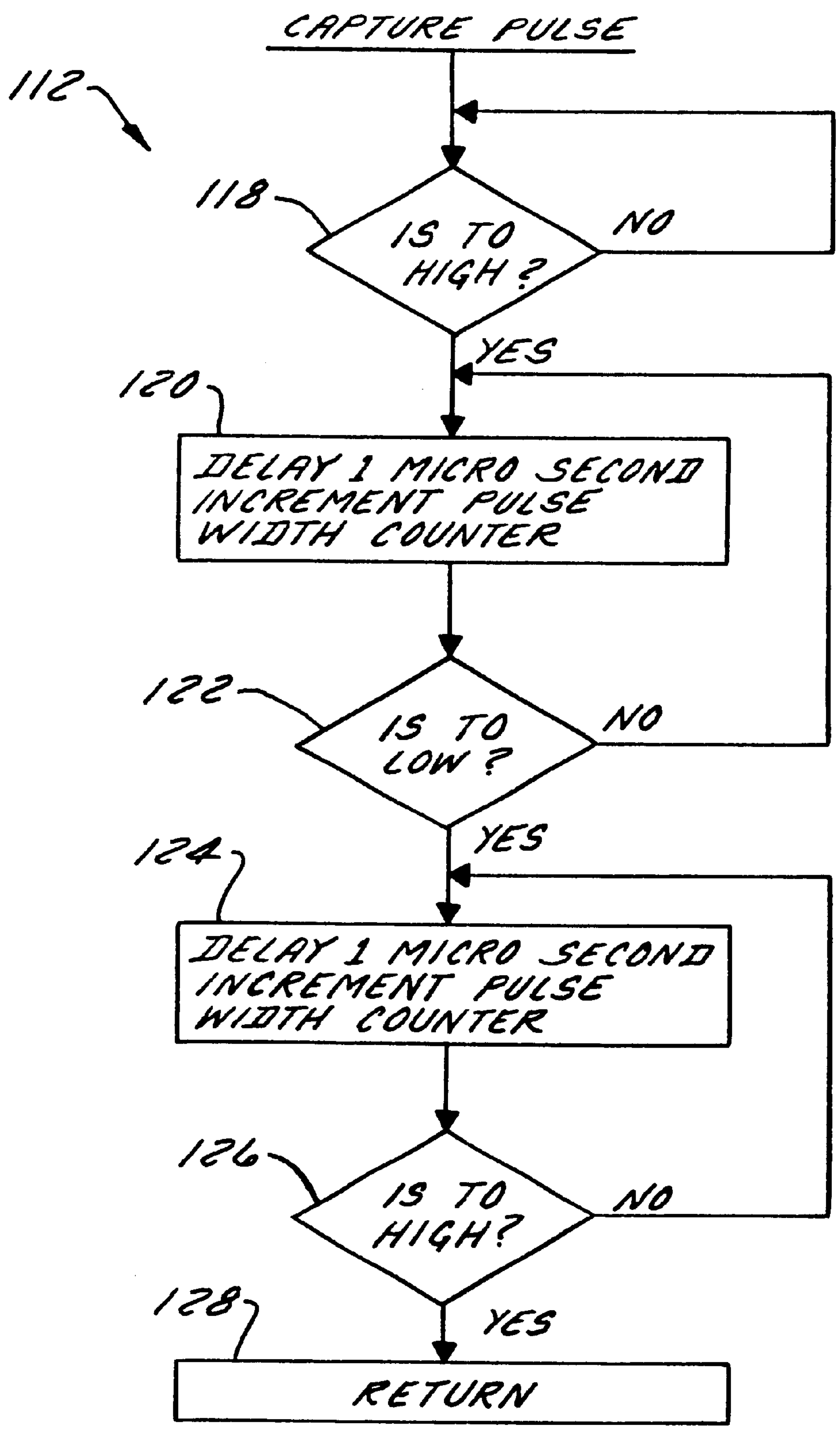
Figure 8:
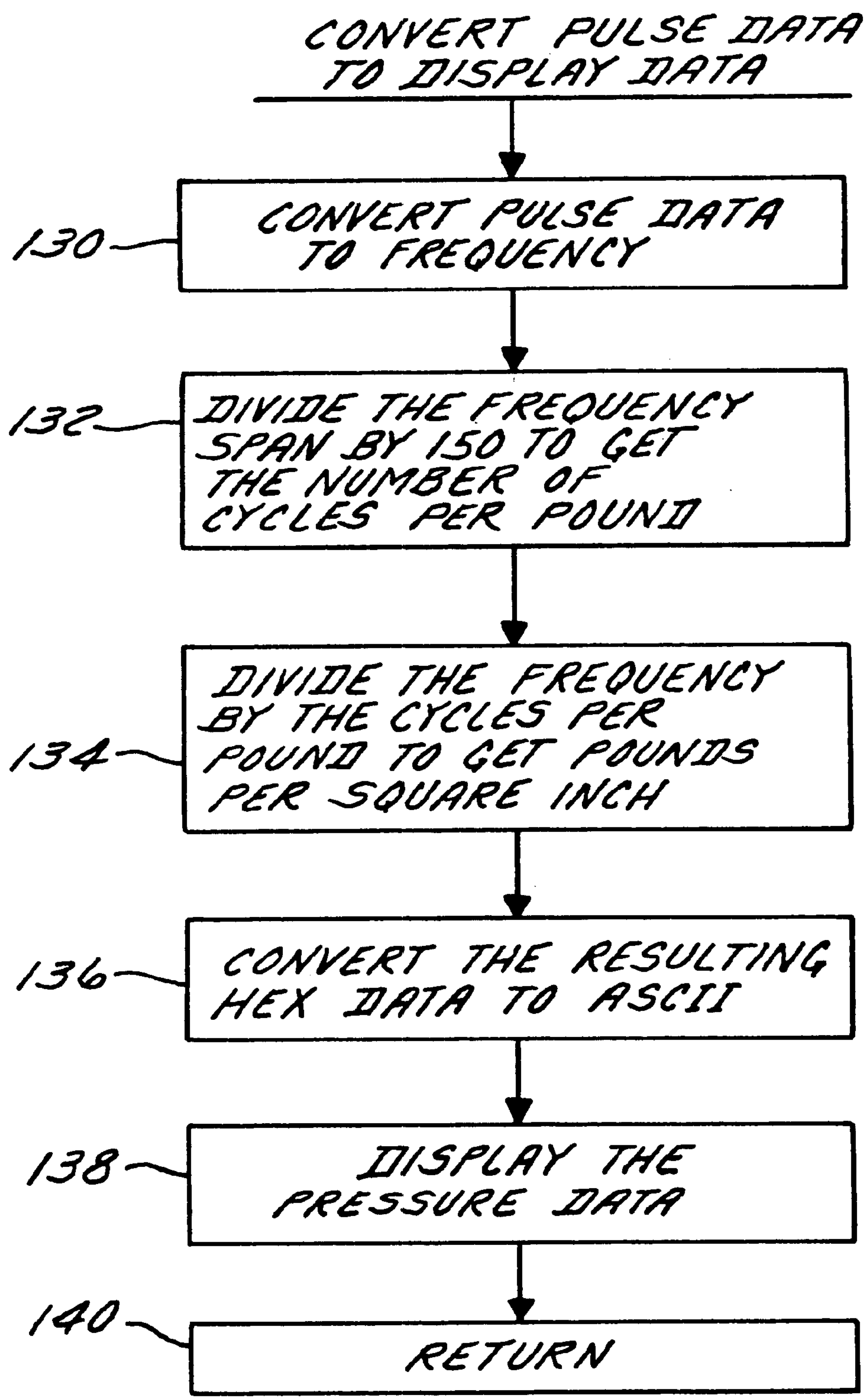

More specifically, with reference to FIG. 7, processor U3 monitors pin 1 to determine if the output TO (the conditioned response signal RS) from amplifier circuit 58 exhibits a high or low logic level. If output TO is low, processor U3 waits for a high logic level (step 118).

When output TO goes high, indicating that the peak portion of response signal RS is present at transistor Q1, a pulse width counter resident in processor U3 is incremented and a 1 micro-second delay is triggered (step 120). Processor U3 then checks to see if output TO is still high (step 122). Steps 120 and 122 are repeated for as long as output TO remains high. In this way, the duration of the peak portion of response signal RS is reflected in (is equal to) the number of increments of the pulse width counter, in micro-seconds (step 120).

When output To goes low, the pulse width counter is again incremented and another micro-second delay is triggered (step 124). Processor U3 then checks if output TO is still low (step 126). Steps 124 and 126 are repeated until output TO again assumes a high logic state, whereupon processor U3 terminates steps 112 and proceeds to step 114. Thus, upon completion of steps 118–126, the counter in processor U3 contains a count representative of the duration of one cycle of the response signal tone, i.e., the period T of one cycle, in microseconds. The frequency f of response signal RS, then, is equal to 1/T.

After determining the frequency of the response signal, processor U3 converts the frequency to display information (step 116). More specifically, the period count in the designated counter in processor U3 is inverted to yield the frequency f of response signal RS.

The frequency data is then converted into a form suitable for driving display circuit 46. The frequency data is within a predetermined range (span) of frequencies having a low frequency limit and a high frequency limit selected by the designer. More specifically, the low frequency value corresponds to the lowest pressure value in connection with which the tire pressure sensor apparatus will be used.

In the preferred exemplary embodiment, the low pressure value of the frequency is zero, corresponding to atmospheric pressure. This allows pressure transducer 60 to be calibrated with respect to voltage-to-frequency converter 62 in a convenient manner.

The high frequency end of the frequency span should be selected to correspond to the maximum pressure for which the device will be used. As is known in the art, conventional automobile tires require a maximum pressure in the range of approximately 35 to 65 psi. If the tire pressure sensor circuit is to be used in connection with automobile tires only, a suitable high limit for the frequency span may correspond approximately 65 to 70 psi. However, in larger tires of the type used on semitractor trailers, a maximum pressure of approximately 150 psi is desirable. Thus, if the tire pressure sensor apparatus is to be employed in the trucking industry, the upper limit of the frequency span preferably corresponds to approximately 150 psi.

The desired frequency span is accordingly divided by the desired operating range, for example, 150, to determine the number of cycles per pound (cpp) (step 132).

The frequency (f) determined in step 130 is then divided by the cycles per pound (CPP) determined in step 132 to yield the pressure in psi (step 134):

f/cpp=psi.

The psi data determined in step 134 is then converted to ASCII data, for example, through well-known hardware and software capable of performing BCD-to-7-segment or hexidecimal-to-7-segment functions (step 136) and applied to display circuit 46 to generate visual indicia of the tire pressure (step 138). Processor U3 then returns to step 104 to await the next request for a pressure reading (step 140). If no request is made after ten seconds, battery 41 is shut down and display unit 12 enters the dormant state until switch S1 is depressed.

As previously noted, transducer unit 12 is advantageously disposed within a cap 24A for valve stem 24 of tire 18.

Valve stem 24 suitably comprises a generally cylindrical stem portion 150 having an internal bore 152 extending therethrough. The proximal portion (not shown) of bore 152 is disposed to communicate with the pressurized tire cavity. The distal portion of bore 152, shown in FIG. 9, typically comprises an internal threaded portion 154 and an external threaded portion 156.

Valve stem 150 further comprises a plunger 158 seated within a valve assembly 160. Valve assembly 160 suitably comprises external threads 162 which threadedly engage internal threads 154 of valve stem 150.

Plunger 158 is connected with a piston (not shown), the underside of which is exposed to the internal tire pressure. The internal tire pressure exerts a force on the piston, urging plunger 158 upwardly in FIG. 9. Furthermore, the piston creates an air-tight seal within valve assembly 160, thereby maintaining the pressure within the tire. When it is desired to release pressure from the tire or, alternatively, to add additional air to the tire, plunger 158 is urged downwardly to establish communication between the internal tire cavity and the distal portion of is bore 152.

Conventional valves typically include a valve cap having internal threads for threadedly engaging external threads 156 of valve stem 150. When it is desired to increase or decrease tire pressure, the cap is removed and plunger 158 is urged downwardly.

The conventional valve cap is replaced with a valve cap 24A which, like a conventional cap, has internal threads 166 which threadedly engage external threads 156 of valve stem 150. Valve cap 24A suitably houses transducer circuit, as discussed in greater detail below. Cap 24A is configured to resemble a conventional valve stem cap to reduce the risk of tampering and theft.

Cap 24A suitably comprises an infrared (IR) unit 168 corresponding to photo-sensitive transistor Q5 and LEDs D5–D7 of transducer unit 14; a battery housing 170 containing battery 40; a housing 172, within which electronic circuitry for selectively converting tire pressure to a response signal, e. g., corresponding to elements 62, 64, 68 and 60, is disposed; a spring 174; and a plunger 176.

Plunger 176, suitably secured to circuit housing 172, is configured to depress valve plunger 158 when cap 24A is secured to valve stem 150. In this way, internal tire pressure is released into the inside of cap 24A when cap 24A engages valve stem 150. As cap 24A is removed from valve stem 150, for example when it is desired to increase or decrease tire pressure, plunger 176 is backed off plunger 158, thereby permitting valve assembly 160 to seal off the internal tire pressure.

Spring 174 prevents mechanical and, hence, electrical contact between battery housing 170 and circuit housing 172 when cap 24A is not secured to valve stem 150. As cap 24A is threadedly secured to stem 150, plunger 158 urges plunger 176 toward battery housing 170, overcoming the force exerted by spring 174 and establishing electrical contact between housing 172 and battery 40. In this way, battery 40 may be conserved until cap 24A is placed on stem 150.

Pressure transducer 60 (not shown in FIG. 9) is suitably housed within housing 172. Signal conversion circuitry, such as that described in connection with signal convertor 34 (FIG. 2), is also housed within housing 172. Similarly, the transmitter and transmitter driver components, analogous to LED 38 and LED driver 36 of FIG. 2, may be housed within housing 172. Alternatively, IR unit 168 may perform the dual function of receiving a command signal and transmitting a response signal, in which case sensor 168 may also comprise an appropriate LED (not shown). In yet a further alternate embodiment, the response generator (LED and driver) may be disposed proximate an opening which extends; through the side of cap 124 proximate housing 172.

Those skilled in the art will appreciate that housing 172 may comprise a signal generator which produces a response signal through a medium other than infrared. Infrared is highly preferred because it does not require FCC licensing as is the case with many frequencies in the radio band. IR frequencies are also desirable in that use thereof reduces the likelihood of interference with other electromagnetic sources typically found in an automotive environment, for example, sunlight, garage door openers, radar detectors, and the like.

Those skilled in the art will also appreciate that, to the extent economically feasible, the electronic circuitry may be implemented in a micro-chip configured for disposition within housing 172. Mass production of such a chip could result in a per unit cost for each transducer circuit which is relatively insignificant with respect to the cost of a tire. When the battery output becomes too low to generate a satisfactory response signal, the cap may be discarded and replaced with one having a new battery. Alternatively, pressure sensor 16 may be mounted to or extend from the sidewall portion of the tire, tread 20, or rim 22.

Figure 10:
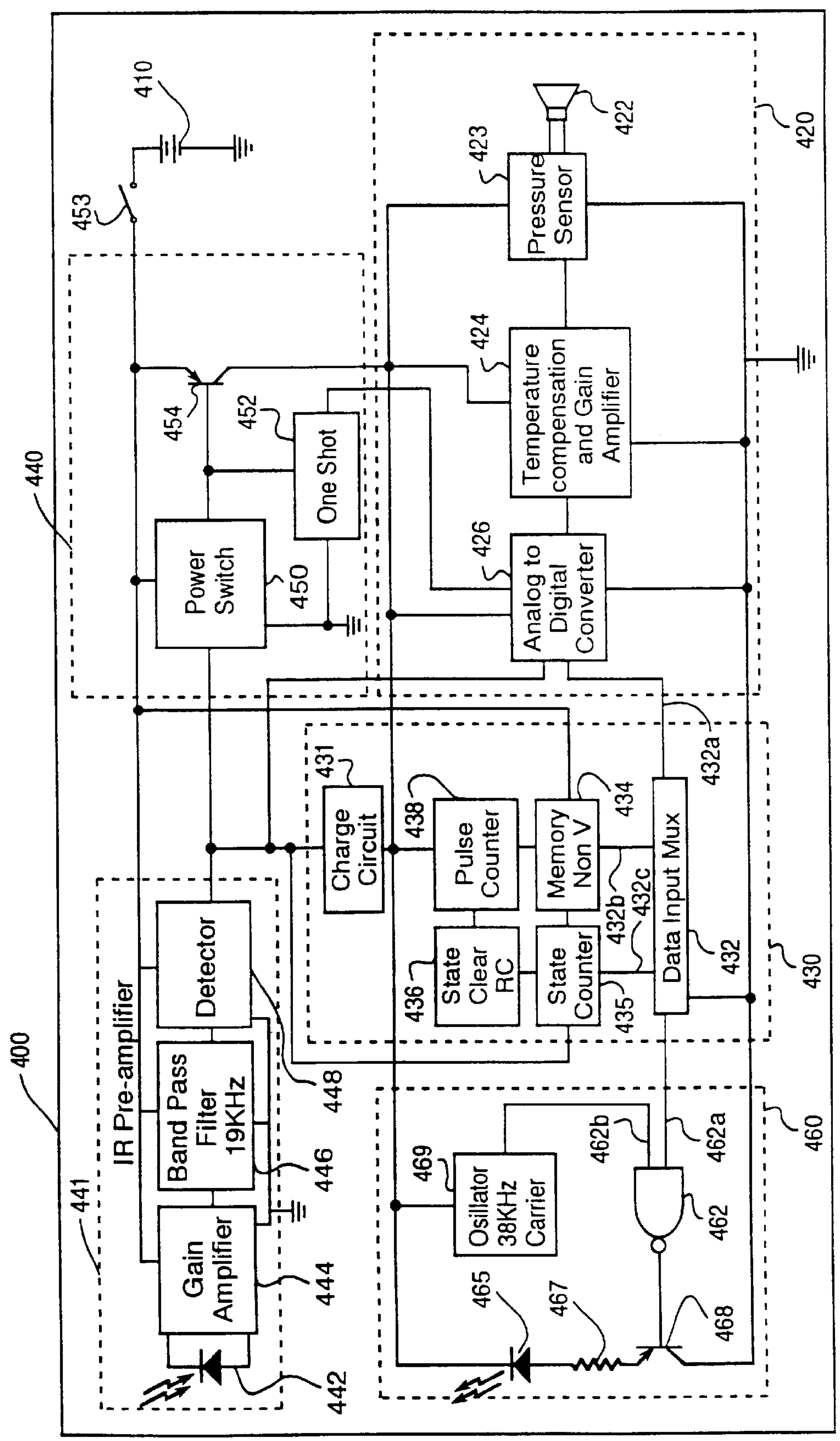
FIG. 10 is a block diagram representation of a preferred embodiment of a sensor unit configured for use with a fire extinguisher device.
Figure 11:
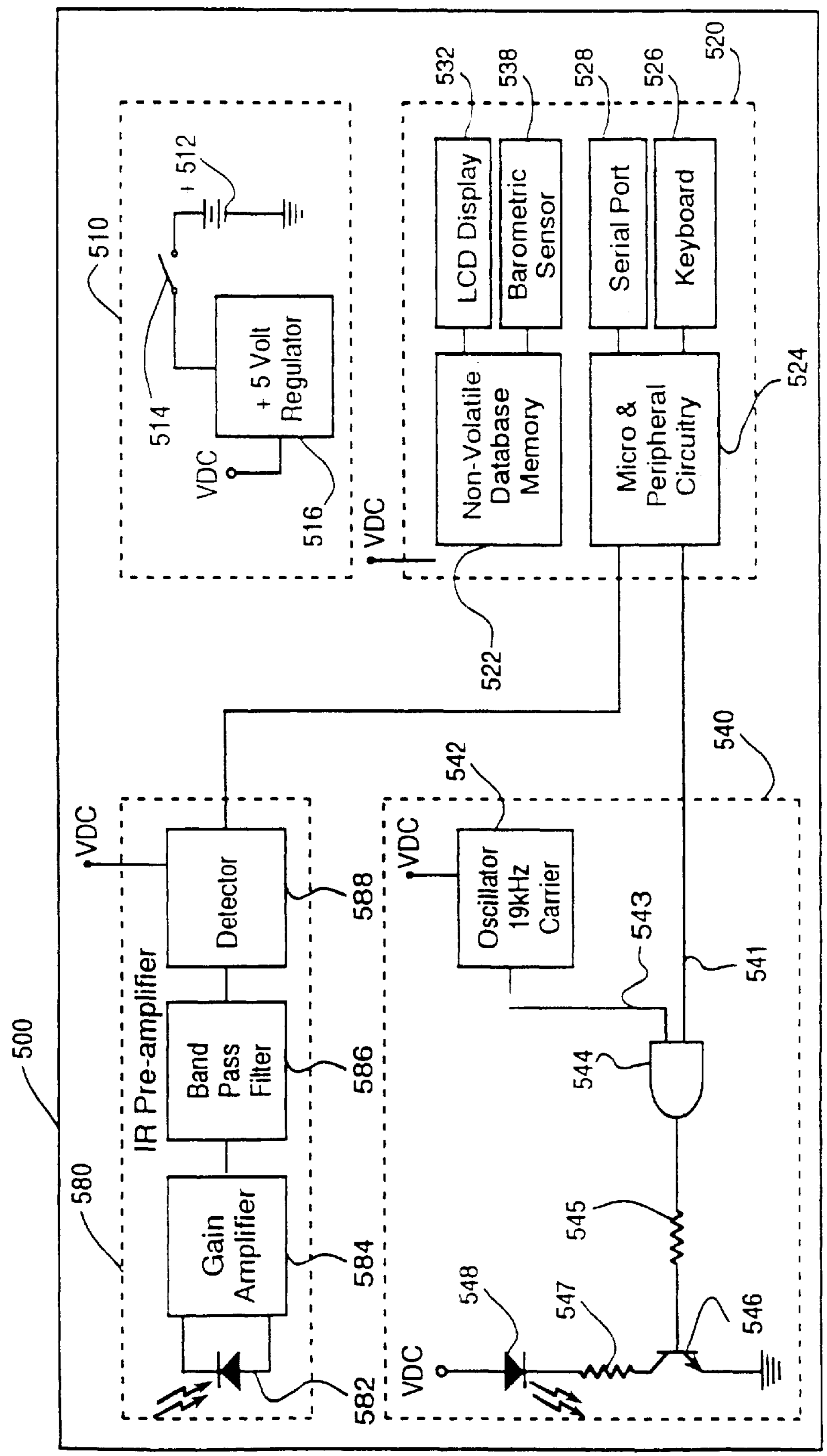
FIG. 11 is a block diagram representation of a preferred embodiment of a receiver unit configured for use with a fire extinguisher device.
Figure 14:
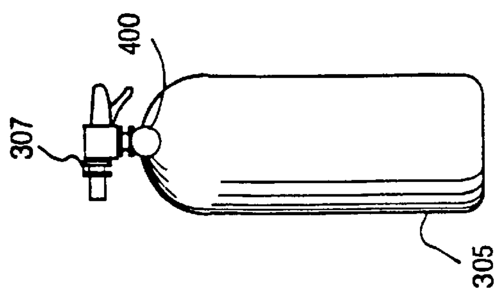
FIGS. 14–17 shows a sensor unit mounted on various equipment.

In a second embodiment, a remote sensing and receiving system may be employed in fire extinguisher devices. With reference to FIGS. 10, 11, and 14, a remote sensor unit 400 and a receiver unit 500 communicate to each other through infrared signals. Sensor unit 400 is attached to a fire extinguisher device 305. Sensor unit 400 is preferably attached during the manufacture of the fire extinguisher. However, sensor unit 400 could be attached when filling the fire extinguisher or as a retrofit after filling.

Sensor unit 400 is affixed to fire extinguisher device 305 preferably near the nozzle 307. A transducer 422 is disposed within the pressurized tank of fire extinguisher 305. Sensor unit 400 is attached in or on fire extinguisher device 305 so that sensor unit 400 can transmit signals via an infrared output 460. Those skilled in the art will appreciate that sensor unit 400 may be mounted in various places so that transducer 422 is exposed to the pressure in the tank of fire extinguisher 305 and infrared output 460 is exposed to the exterior of extinguisher 305.

Sensor unit 400 is manufactured with switch 453, a one time switch. Switch 453 ensures that battery power is not used during the manufacture of sensor unit 400. When switch 453 is closed, sensor unit 400 can be powered from a battery 410. Switch 453 should be closed before sensor unit 400 is distributed.

Sensor unit 400 and a receiver unit 500 are employed in the inspection and maintenance of fire extinguisher devices. In order for proper inspection, sensor unit 400 must be capable of transmitting data to receiver unit 500 indicative of the identification of the fire extinguisher. By way of example, identification data may include an identification number, a filling sight number, the date and time of inspection, and status of the fire extinguisher. Some of this data can be input into a memory 434 at the time fire extinguisher 305 is filled or at the time sensor unit 400 is provided at fire extinguisher 305. This data can also be programmed into memory 434 by receiver unit 500. If memory 434 is powered memory, switch 453 must be closed before loading any data into memory.

Sensor unit 400 stores device information in memory 434. This information generally includes at least one of the following: the building address, date of filling, the filling sight, barometric pressure at the filling sight, device identification number, and location inside the building. All pertinent information for extinguisher maintenance and inspection could be stored in memory 434 as the user requires. Memory 434 and battery 410 can be sized according to the amount of data to be stored.

Generally, the operation of the remote sensing and receiving system is described for use in the inspection of fire extinguisher devices as follows. Fire extinguisher device 305 is employed with sensor unit 400 and filled with contents to capacity (full charge).

After fire extinguisher device 305 is filled, receiver unit 500 sends control signals to turn sensor unit 400 "ON". Next, receiver unit 500 sends control signals to verify the data stored in memory 434 in sensor unit 400 and the pressure in fire extinguisher device 305. After verification, sensor unit 400 returns to a dormant state or "STANDBY" mode, and fire extinguisher device 305 is ready for deployment at a building location. Once deployed, the remote sensing and receiving system is used for easy inspection of fire extinguisher devices at periodic intervals.

In the normal course of building maintenance, an inspector holding receiver unit 500 periodically walks up to fire extinguisher device 305 employed with sensor unit 400. The inspector presses the appropriate keys on a keyboard 526 in order to activate sensor unit 400. In response to the appropriate keys and or switches; receiver unit 500 transmits an activation signal to sensor unit 400. An activation is a signal like a start-up signal which turns on a particular device. In response to this activation signal, sensor unit 400 is turned "ON" and transmits signals indicative of characteristics of fire extinguisher device 305 and sensor unit 400.

After sensor unit 400 is turned "ON", sensor unit 400 is able to produce signals indicative of certain characteristics as is requested by the inspector through receiver unit 500. As an example, the signals could reflect characteristics like current pressure in the extinguisher, identification of the fire extinguisher, and date of charging as well as other data stored by sensor unit 400. Receiver unit 500 stores this information as well as data generated by receiver unit 500 in a memory 522. After a period of time of no signals from receiver unit 500, sensor unit 400 returns to a dormant state or "STANDBY" mode.

Referring now to FIG. 10, sensor unit 400 includes an activation circuit 440, a pressure measurement circuitry 420, a processor circuitry 430, infrared output 460 and battery 410. Activation circuit 440 includes an infrared detector circuit 441, a power switch circuit 450 and a power source transistor 454. Infrared detector circuit 441 includes an infrared sensor 442, a gain amplifier 444, a band pass filter 446, and a detector circuit 448. As is well known in the art, most circuit elements on sensor unit 400 could be reduced and combined with other elements onto a single microchip. This reduction saves manufacturing time, power requirements, and size.

The interaction the circuits in FIG. 10 are explained generally as follows. Detector circuit 441 detects infrared signals and generates demodulated electric signals. These signals are provided to processor circuitry 430, pressure measurement circuitry 420, and activation circuit 440.

In response to signals representing a request for pressure measurement data, pressure measurement circuitry 420 provides a serial electrical signal indicative of pressure data to processor circuit 430. Also, in response to signals representing a request for pressure measurement data, processor circuitry 430 provides this signal to infrared output 460. Infrared output 460 modulates the electrical signal and outputs a modulated infrared signal to the receiver unit 500.

In response to signals representing a request for other data such as data stored in a memory device, processor circuitry 430 generates a serial electric signal representing the requested data and provides the signal to infrared output 460. Infrared output 460 modulates the electrical signal and outputs a modulated infrared signal to the receiver unit 500.

In response to signals requesting that data be written to memory elements in sensor unit 400, processor circuitry 430 receives that data. The data is converted to a serial electric signal by detector circuit 441. Processor circuitry 430 converts the data to parallel form and stores that data in a memory unit in sensor unit 400.

The circuitry in sensor unit 400 generally is in a dormant state until turned "ON" by activation circuit 440. Sensor unit 400 saves energy from battery 410 by operating in the "STANDBY" mode unless communicating with receiver unit 500. In the "STANDBY" mode, all circuitry in sensor 400 is powered down except for infrared detector circuit 441, activation circuit 440, and memory 434. Activation circuit 440 turns remote sensor unit 400 "ON" when activation circuit 440 receives the proper signal from receiver unit 500. In the preferred embodiment the proper signal is 19 kHz carrier signal although sensor unit 400 could be configured for various frequencies. Sensor unit 400 is in a "STANDBY" mode at all other times.

When an activation signal from receiver unit 500 is transmitted to remote sensor unit 400, activation circuit 440 provides a path to power for other circuit elements. Power source transistor 454 is turned on to provide the path to battery 410. The circuit elements that receive power through transistor 454 are processor circuitry 430, pressure measurement circuit 420, and infrared output 460.

Pressure measurement circuit 420 is advantageously configured to sense fire extinguisher pressure, generate an electrical pressure signal, and apply the signal to processor circuitry 430. Processor circuitry 430 then converts the pressure signal into an encoded form suitable for use in infrared output circuit 460.

The encoded signal indicative of pressure produced by processor circuitry 430 is applied to infrared output circuit 460. An infrared LED 465 is modulated in a manner which represents the sensed pressure as a selected characteristic of the encoded signal, e.g., frequency, pulse code, pulse width, etc. In a preferred embodiment, infrared output circuit 460 drives infrared LED 465, which emits a modulated pulse response signal, suitably in the infrared frequency range, indicative of pressure. The LED emissions are preferably directional so that the inspector can determine which sensor unit 400 is being read by the relative position of receiver unit 500 to sensor unit 400.

Referring now to FIG. 11, receiver unit 500 suitably comprises: a power circuit 510, a computer circuit 520, and a transmitter circuit 540. Power circuit 510 includes a battery 512, a switch 514, and a voltage regulator 516. Switch 514 is a standard user activated switch for turning "ON" the receiver unit 500. Receiver unit also includes a receiver circuit 580.

The interaction the circuits in FIG. 11 are explained generally as follows. Receiver circuit 580 detects infrared signals and generates demodulated electric signals. These signals are provided to computer circuit 520 which performs operations or stores data in response to these signals. The data stored could be communicated as part of the electric signal as when the sensor unit 400 is responding to a request for information.

Computer circuit 520 also is responsible for creating control signals such as read, write, and activations signals. These signals are generated by computer circuit 520 in response to commands form the user or software. These signals are provided to transmitter 540. Transmitter 540 modulates these signals and produces a modulated infrared signal for sensor unit 400.

Receiver unit 500 is advantageously configured to transmit control signals like activation signals, read signals, and write signals. Activation signals cause activation circuit 440 to turn "ON" components in sensor unit 400; read signals cause processor circuitry 430 to initiate generation of signals indicative pressure data or other data by sensor unit 400; write signals cause data transmitted by receiver unit 500 to be stored in memory 434 of sensor unit 400. Computer circuit 520 creates these signals which are transmitted to sensor unit 400. These signals are initiated by a program stored in memory 522 or from user manipulation of keyboard 526 or other switches.

Computer circuit 520 applies these control or processor signals to transmitter circuit 540. Transmitter circuit 540 modulates an infrared LED 548 in accordance with processor signals or signals initiated by computer circuit 520. Receiver unit 500 communicates processor signals to sensor unit 400 by modulating LED 548 in a particular frequency, pulse code, pulse width, etc. Preferably, infrared LED 548 operates in the infrared frequency range.

The functions performed by the various elements comprising the foregoing block diagrams may be embodied in a unitary microchip (integrated chip) or several microchips. For example, the functional elements in sensor unit 400 be implemented in a single microchip or in a microprocessor system for convenient disposition in the fire extinguisher device. Also, the functional elements comprising receiver unit 500 could be implemented in a single microchip or in a microprocessor for incorporation in the hand-held device.

Computer circuit 520 suitably comprises memory 522, a micro & peripheral circuit 524, keyboard 526, a serial port 528, a LCD display 532, and a barometric sensor 538. Memory 522 is preferably a RAM chip. Memory 522 is preferably a nonvolatile type of memory so that data is not lost when the receiver 500 is turned off. However, as is well known in the art memory could be substituted by a combination of RAM or ROM. Examples of other types of memory are dip switches, disks, tapes, ROM chips, or other memory devices. Memory 522 stores the various data produced by receiver unit 500 and sensor unit 400. Any needed data, instructions, or a program for computer circuit 520 can be stored in memory 522 or micro & peripheral circuit 524.

Micro & peripheral circuit 524 provides the circuitry for signal generation and processing in receiver unit 500. In a preferred embodiment, micro & peripheral circuit 524 is a microprocessor or a CPU based system. Preferably, micro & peripheral circuit 524 is an integrated microprocessor with internal RAM, EPROM, LCD controller circuitry, and oscillator. A CPU based system as is well known in the art comprises: a control circuit for maintaining the proper sequence of events with regard to interrupts, instructions, wait requests, and timing functions, an arithmetic logic unit (ALU) for performing arithmetic and logic operations, and various registers for program counting, an instruction decoder, and addressing unit. Micro & peripheral circuit 524 further may comprise clock pulse generator for timing operations, memory, input and output ports. Also, micro & peripheral circuit 524 includes any amplification, conversion or isolation necessary for use by any circuit components in receiver unit 500 or the central computer. The functions performed by processor circuitry 534 may be performed by a number of different hardware or software configurations without detracting from the spirit of the invention as recited in the claims.

LCD display 532 enables the operator to view data used and produced by the remote sensing and receiving system. Again, LCD display 532 could be replaced by various displays. For example light displays, CRT's, LEDS, audio displays and other displaying means. Keyboard 526 is a standard keypad. However, keyboard 526 could be replaced by switches or other data entering devices as is well known in the art.

When switch 514 in power circuit 510 is closed, the components in receiver 500 are provided with electrical power from battery 512. The power is regulated by voltage regulator 516. Voltage regulator 516 is a +5 VOLT regulator. Alternatively, regulator 516 could be +3 VOLT or any voltage required by the implemented circuit design.

A description of the preferred internal operation of the remote sensing and receiving system is described as follows with reference to FIGS. 10, 11, 12 and 13. With switch 514 closed, the operator can initiate an activation signal 610 through keyboard 526 or a program stored in memory 522 or micro & peripheral circuit 524. Activation signal 610 is transmitted as pulses of particular frequency or tone as in signal 612; in a preferred embodiment pulses of a 19 kHz signal provides an activation signal 610. Micro & peripheral circuit 524 creates an activation signal when micro & peripheral circuit 524 enables transmitter circuit 540. Processor circuitry changes the state of an input 541 of the AND gate 544 to a logic high. An input 543 of AND gate 541 is a 19 kHz carrier signal created by an oscillator 542. When input 541 is high, the output of AND gate 544 is the same signal received by input 543; in this embodiment, a 19 kHz carrier signal is transmitted as long as input 541 is high. This signal travels across a resistor 545 and turns a transistor 546 on and off at a frequency of 19 kHz. As transistor 546 is modulated at 19 kHz, a 19 kHz signal travels through infrared LED 548 and a resistor 547. Infrared LED 548 produces an infrared signal modulated at 19 kHz in response to the electrical signal. In other words, a 19 kHz carrier signal of infrared light is produced by infrared LED 548 and transmitted to sensor unit 400.

Figure 13A:
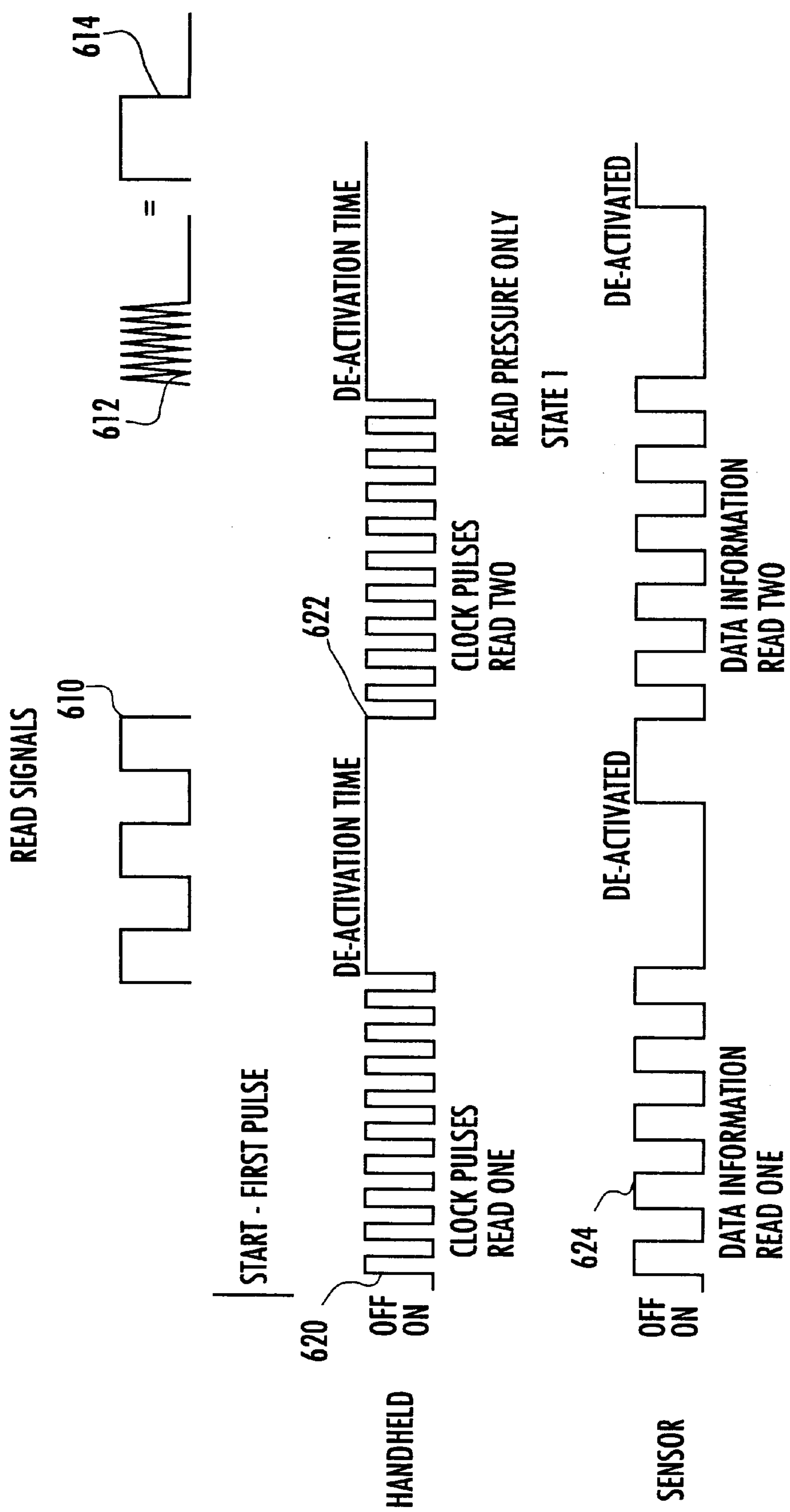
Figure 13B:
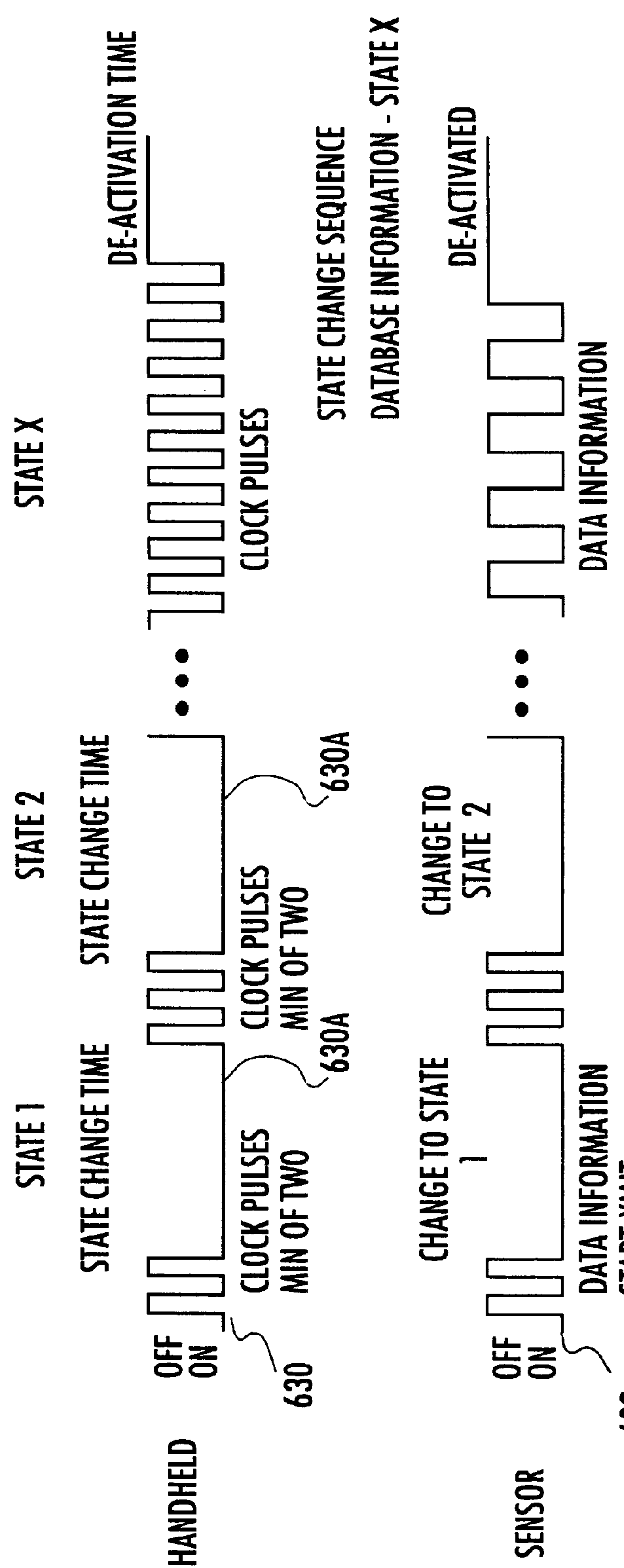

With reference to FIG. 13, a signal 612, a 19 kHz carrier signal, is demodulated as a signal 614, an ON signal. An activation signal is shown as activation signal 610 or as part of hand-held read signal 620.

When any infrared light is transmitted to sensor unit 400, infrared sensor 442 produces an electric signal proportional to the amount of infrared light received. The electric signal is amplified by gain amplifier 444 and input into band pass filter 446. Band pass filter 446 filters signal eliminating any signals not of the proper frequency. Preferably, band pass filter 446 is tuned so that only 19 kHz signals are transmitted to detector 448. Detector 448 receives the filtered signal and demodulates the 19 kHz carrier signal into clock pulses representing the presence of the carrier signal as represented by signal 612. In other words, detector 448 preferably generates a pulse signal similar to the pulse signal created by micro & peripheral circuit 524 and transmitted to input 541. Detector 448 transmits this pulse signal to power switch circuit 450, pressure measurement circuit 420, and processor circuitry 430. Communications between sensor unit 400 and receiver unit 500 are explained as follows from the perspective of the receiver unit 500.

Power switch circuit 450 turns power source transistor 454 to an "ON" state in response to an activation signal. Power switch circuit 450 keeps power source transistor 454 "ON" for a specific amount of time after a signal. Power source transistor 454 provides a path to power other circuit elements in sensor unit 400. The activation signal must be at least 2 pulses in order to keep the sensor unit 400 in an "ON" mode. The activation signal is chosen as two pulses rather than one in order to ensure the reliability of signal reception. In the preferred embodiment, logic circuits and counters are used as part of power switch circuit 450 to turn sensor unit 400 "ON" after receiving the two pulses of activation signal 610. The device can be configured to have various activation signals. For example, a less conservative approach could simply use one pulse to activate sensor unit 400. An activation signal is a necessary part of both read and write signals as is explained below.

Computer circuit 520 creates read signals so that. sensor unit 400 transmits data to receiver unit 500. With reference to FIG. 13, read signal 620 is produced by receiver unit 500 upon initiation by operator or program stored in memory 522. The first part of read signal 620 is an activation signal. The rest of read signal 620 are clock pulses which initiate the transmission of data by sensor unit 400.

Read signal 620 is created in the transmitter circuit 540 similarly to activation signal 610. Micro & peripheral circuit 524 sends pulse signals to the input 541 of AND gate 544. In response to this signal, LED 548 is modulated to produce pulses of 19 kHz carrier signals.

In response to this first activation signal, sensor unit 400 is turned "ON". When sensor unit 400 is turned ON from the dormant state or "STANDBY" mode, the sensor unit begins in read mode, state 1. After the activation signal, receiver unit 500 sends clock pulses of 19 kHz carrier signal; these pulses are part of read signal 620.

In the read mode, state 1, sensor unit 400 determines the pressure and transmits pressure data back to receiver unit 500 synchronously with the clock pulses of read signal 620. The pressure data is transmitted in the form of a sensor read signal 624. Once micro & peripheral circuit, 524 receives a pulse representing data in sensor read signal 624, receiver unit 500 transmits another pulse. In response to this pulse, sensor unit 400 transmits another pulse representing data. Sensor unit 400 and receiver unit 500 repeat these operations until the requested data is transmitted by sensor unit 400.

After the data is received, processing circuitry 524 evaluates the pressure data from sensor 400, and then turns input 541 of AND gate 544 low so that receiver unit 500 ceases the transmission of the 19 kHz carrier signal. Sensor unit 400 is deactivated because of this absence of signals.

After deactivation, receiver unit 500 repeats this read sequence with the read signal 622 in order to verify the first reading. If the pressure data received by receiver unit 500 is the same as the first reading, the pressure data is converted into a readable form and displayed on LCD display 532 or stored in memory 522. If the pressure data is different than the first reading, receiver 500 repeats this procedure with another read signal 620. The pressure data, is preferably displayed on LCD display 532 in pounds per square inch.

When additional information is desired from the sensor unit 400, receiver unit 500 transmits read signals so that sensor unit 400 operates in a different state. Receiver unit

500 changes the state of sensor unit 400 by holding the carrier signals "ON" for a specific length of time without, pulses. If the carrier signal is off for a specified length of time, sensor unit 400 will be deactivated; upon start-up, sensor unit 400 begins in the read mode, state 1 again.

A state change is accomplished by a signal from a charge circuit 431. Charge circuit 431 outputs a pulse when it receives a carrier "ON" signal for a length of time from detector 448. This pulse initiates a state change in a state counter 435. If the carrier "ON" signal is interrupted by pulse signals, charge circuit 441 again must be held "ON" for the specific period of time. Charge circuit 431 can be implemented in various circuits. In a preferred embodiment, charge circuit 431 includes a resistor capacitor network coupled to a one shot and logic circuits for producing a pulse after the carrier signal has been held "ON" for a period of time.

After the carrier "ON" signal has been sent for an appropriate length of time, receiver unit 500 transmits an activation signal of at least two pulses so that sensor unit 400 changes states. Sensor unit 400 changes states in response to this activation signal and the pulse signal from charge circuit 431. In the new state, sensor unit 400 transmits new information corresponding to the different state in response to clock pulses from the receiver unit 500.

With reference to FIG. 13, a read signal 630 activates sensor unit 400 "ON" and transmits the carrier signal until state 2 is reached. When state 2 is reached, receiver unit 500 transmits another activation signal followed by the carrier signal to reach state X. When state 2 is surpassed, receiver unit 500 transmits another activation signal followed by clock pulses so that sensor unit 400 transmits data in state X.

In response to the clock pulses, sensor unit 400 synchronously transmits pulses representing information as shown in read signal 630 and the a sensor read signal 632. These clock pulses allow the receiver unit 500 to keep track of the information received. With this method, information is not received out of sequence because each bit of data is transmitted upon initiation of a clock pulse from receiver unit 500. Receiver unit 500 does not send another clock pulse until the requested bit is received. After all the bits making up the requested data are received, receiver unit 500 does not send any more clock pulses.

As an example, when the sensor unit 400 is in the read mode, state X, identification data is transmitted to receiver unit 500. Sensor unit 400 stores the identification data in memory 434. The data is transmitted serially from memory 434 to multiplexer 432. In a particular embodiment, memory 434 includes a shift register for outputting data. State counter 435 addresses the memory location associated with a given state so that memory 435 outputs the data to the shift register. The clock pulses in read signal 630 initiate a serial output of the data one bit at a time by the shift register.

Various states could be reached by sensor unit 400 through the method of activation signals and carrier signals described above. In these various states, various information could be sought and transmitted according to the users needs.

State X is not the limit of states; other states can be reached by the same technique. For instance, activation signals and carrier signals can be transmitted at appropriate times in order to reach read mode, state Y. In state Y, sensor unit 400 synchronously transmits different information in response to pulses transmitted by receiver unit 500. This different information could be stored in a memory location in memory 434 which is addressable by state counter 435. For example, this different information could be the date of the last measurement of pressure. This procedure can be continued in this fashion until all desired information is obtained.

With reference to FIG. 13, read signal 630 shows that different states can be reached without having to transmit data at every previous state. This feature saves energy as LED 465 is not driven unnecessarily. For instance, read signal 630 reaches state X without having sensor unit 400 transmit data in states 1 and 2. Read signal 630 skipped the data in states 1 and 2 by not providing any clock pulses in between activation signals, instead a constant carrier signal was provided. In contrast, read signal 620 provided for the reception of the data of state 1 by transmitting clock pulses after the activation signal.

The write mode is slightly more complicated than the read mode. Unlike the read mode, receiver unit 500 must send specific data to sensor unit 400 in the write sequence. The data is represented by a series of pulses. This data can be location data, identification data, barometric pressure, the date, or any other data for use or storage by sensor unit 400. The series of pulses are generated by processing circuitry 524 and sent through transmitter circuit 540.

Figure 12:
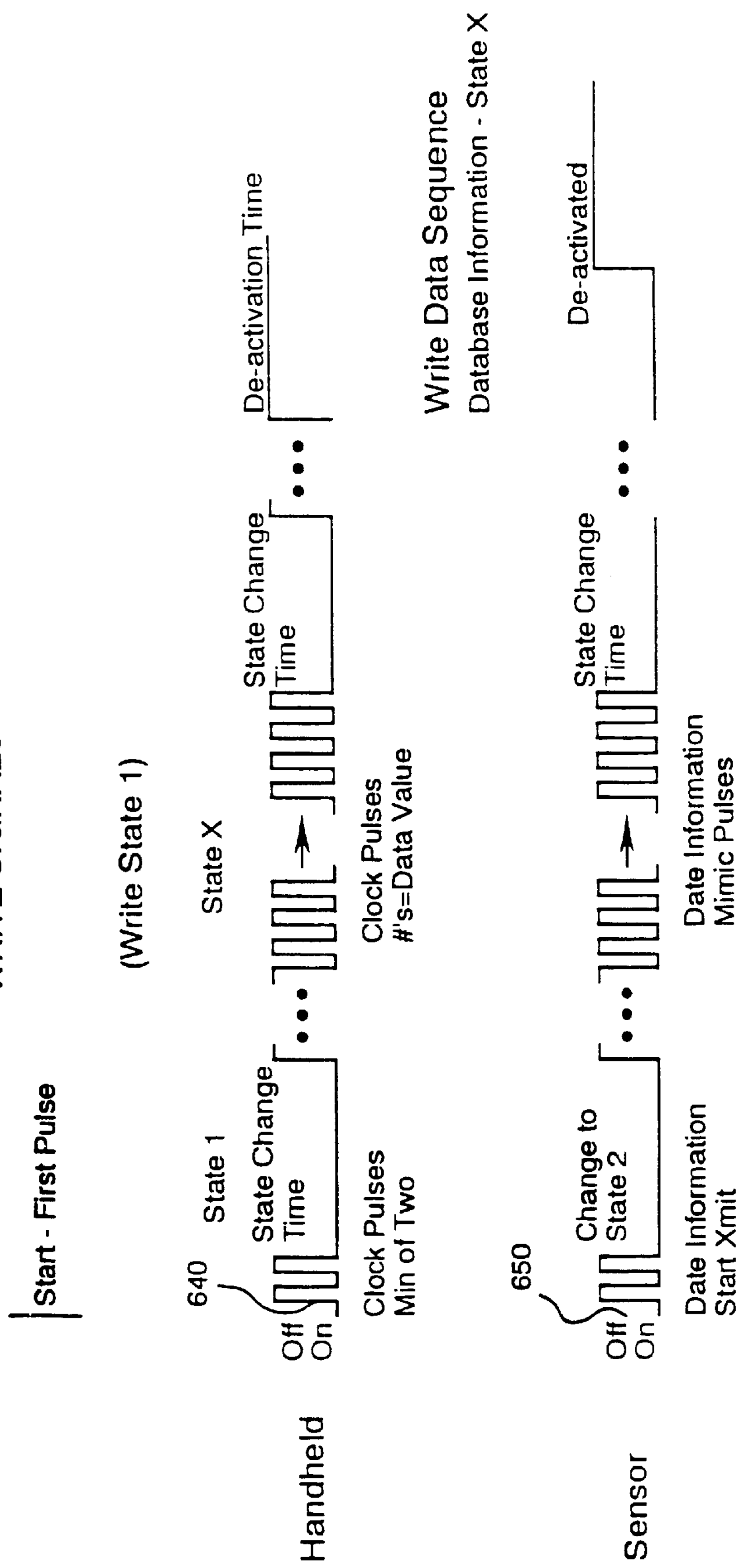
FIGS. 12 and 13 are representations of communication signals transmitted and received by the sensor unit and receiver unit.

With reference to FIG. 12, the write mode is reached in sensor unit 400 with activation signals and providing change state signals with carrier signals for a specified amount of time. Preferably, the write mode is after the last state in the read mode. In other words, receiver unit 500 transmits a series of activation signals followed by carrier signals for a specified length of time until all read states have been surpassed. Once the write mode and proper state is reached, receiver unit 500 sends data corresponding to the state.

Just as the correct state had to be reached in the read mode, the correct state has to be reached for the write mode. For instance, if the operator is transmitting identification data to sensor unit 400, sensor unit 400 should be in the write mode, state X where state X is the state for receiving the first number of the identification.

For example, in order to store identification No. 00225, there are five identification states, one for each digit. After the write mode is reached, sensor unit 100 is put in state X by transmitting the write signal 640. write signal 640 is a combination of an activation signal and carrier signals. After the appropriate mode is reached, the first digit is input by transmitting an activation signal (two clock pulses) and the digit (5 clock pulses). Again, two clock pulses for an activation signal are not required; the circuit can be designed so that one would be sufficient. However, two clock pulses are implemented in this design because two pulses are more reliable. In other words once correct state is reached, receiver unit 500 transmits seven clock pulses. Upon receiving the activation signals, sensor unit 400 synchronously transmits the data back to receiver unit 500 as in the sensor write signal 650. Receiver unit 500 verifies that the data transfer was correct. If the data received was not correct, receiver unit 500 does not advance sensor unit 400 into the next state, and transfers the data again.

In response to the data represented by clock pulses, sensor unit 400 stores the digit five in memory 434 in a space reserved for the first identification number. The memory location is addressed by state counter 435. The clock pulses are counted by the pulse counter 438 so that the total can be input into memory 434. After the data is verified, receiver unit 500 transmits a carrier signal to increment sensor unit 400 to receive the next digit. The second digit is transmitted as four clock pulses. The first two pulses are an activation signal which change sensor unit 400 to the next state; the last two pulses represent the number two. This procedure is repeated until all data is written in sensor unit 400.

Again, other data can be written to sensor unit 400 in other states. The procedure of activation signals and carrier signals for specific times can be used to reach various states. The following are examples of other data that could be written in these other states: filling sight data, barometric pressure data, date data, last reading data, etc.

The following is a detailed description of the communications explained in reference to sensor unit 400. When the first activation signal is received as in the first part of read signal 620, sensor unit 400 is turned ON. Detector 448 generates two electric pulses which are received by power switch 450. In response to these two pulses power switch 450 holds power source transistor 454 ON for a period of time. Power switch 450 holds power source transistor 454 ON after receiving any subsequent carrier on signals or pulses from detector 448.

Upon activation of sensor unit 400, state counter 435 is cleared by the state clear circuit 436. State counter 435 keeps track of states for read modes and write modes. When the state counter 435 is cleared, the sensor unit 400 is in the read mode, state 1 or the state for reading pressure data. State clear circuit 436 is comprised of a resistor capacitor network employed to provide a pulse upon the activation of sensor unit 400. Alternatively, state clear circuit 436 could be a one shot circuit which provides a pulse when sensor unit 400 is turned ON. State counter 436 has an input which sets the counter at zero when a particular input is placed upon the clear counter input. This method for clearing a counter circuit upon device start-up is known in the art.

A one shot circuit 452 is connected to power switch 450. When the output of power switch 450 goes from high to low one shot 452 outputs one pulse. The output of one shot 452 is connected to the analog to digital converter 426. In response to this pulse, analog to digital converter 426 begins a serial output of data representing the pressure measured by transducer 422.

In response to the subsequent clock pulses in read signal 620, sensor unit 400 begins to read the pressure. Transducer 422 provides an electrical signal which is indicative of the pressure. A pressure sensor circuit 423 receives this signal. Preferably, pressure sensor 423 provides a signal ranging from 0 mV at no pressure to 100 mV at full pressure. Full pressure is approximately 300 pounds per square inch depending on the type of fire extinguisher device 305. Amplifier 424 provides necessary temperature compensation and gain adjustment for accurate readings. Preferably, amplifier 424 is configured to output a signal of 10 mV per pound per square inch of pressure depending upon the analog to digital converter 426 and transducer 422 in pressure measurement circuit 420.

The amplified signal is input into analog to digital converter 426. Analog to digital converter 426 is preferably an 8 bit serial converter. For this embodiment, the analog to digital reference is chosen to provide a ratiometric output with maximum pressure resulting in maximum binary numbers. Therefore, in this particular embodiment, 10 mV/pound per square inch at 300 pounds per square inch maximum equals 3.0 volts. Thus, analog to digital converter 426 should be referenced to 3.0 volts to represent maximum pressure and maximum binary number. For an 8-bit converter, the maximum binary number is 256. Upon receiving a clock pulse from one shot 452, analog to digital converter 426 produces a serial signal indicative of the pressure. Alternatively, analog to digital converter 426 could be a parallel analog to digital converter combined with a register capable of serial output.

One shot 452 only enables analog to digital converter 426 once every time sensor unit 400 is turned ON. In this way energy is saved as analog to digital converter 426 is dormant when sensor unit 400 is not in read mode, state 1.

A multiplexer 432 selects which signals are transmitted by infrared output circuit 460. Multiplexer 432 has two data inputs; the first data input 432A is connected to analog to digital converter 426, and second data input 432*b* is connected to memory 434. Multiplexer 432 also has at least 1 control input for selecting the data to output. A control input 432*c* is connected to state counter 435. Preferably, multiplexer 432 has enough control inputs to select the number of sources. In this exemplary embodiment, an OR gate is connected to all the outputs of state counter 435 so that the digital to analog converter is only chosen when state counter 435 outputs a zero. When the state counter 435 outputs a zero, sensor unit 400 is in the read mode state 1 or the read mode for pressure data. When the output is not zero, the multiplexer 432 selects input 432B.

State counter 453 also is connected to memory 434. Depending upon the state, state counter selects various memory locations in memory 434. Memory 434 preferably has parallel memory outputs connected to shift register for serially transmitting data to the multiplexer 432. Alternatively, memory 432 could be a memory device with a serial output or a serial memory device.

Infrared output circuit 460 produces infrared signals in a similar manner to transmitter circuit 540. A signal is transmitted to input 462*a* of a NAND gate 462 from multiplexer 432. An oscillator 469 provides a 38 kHz carrier signal to the input 462*b* of NAND gate 462. If the signal to input 462*a* is high, an inverted carrier signal is output from NAND gate 462. If the signal to input 462*a* is LOW, the output of NAND gate 462 is HIGH. When the output of NAND gate 462 is low, a transistor 468 is turned on and current travels through infrared LED 465 and a resistor 467. Infrared LED 465 emits infrared light in response to this current. The infrared signal is a 38 kHz modulated signal of input 462*a* as a result of the 38 kHz signal on input 462.

The 38 kHz modulated signal is transmitted to receiver circuit 580 in receiver unit 500. Receiver circuit 580 is similar to infrared detector circuit 441 in sensor unit 400. An infrared sensor 582 produces an electrical signal in response to infrared light in proportion to the amount of light received. The amplifier 584 increases the magnitude of the signal produced by infrared sensor 582. The band pass filter 586 prevents signals of inappropriate frequencies from passing to decoder 588. In a preferred embodiment, band pass filter 586 is tuned to 38 kHz so that only signals from sensor unit 400 are allowed to pass. The reason for the different transmit and receive carrier frequencies is to avoid cross coupling of information between receiver unit 500 and sensor unit 400. If cross coupling exists, sensor unit 500 could remain "ON" by inducing a signal from its own infrared output 460 into its own infrared detector circuit 441. The decoder 588 demodulates the signals from filter 586 and generates electric signals. These signals are input into micro & peripheral circuit 524 for appropriate storage or actions.

Once state counter 435 reaches the write mode through write signals, pulse counter 438 counts pulses sent by receiver unit 500. Pulse counter 438 has outputs connected to memory 434. The data on these outputs is indicative of the number of pulses sent by receiver 500; this data is written to memory 434 after the last pulse is transmitted for the particular state. After the data is written, pulse counter 438 is cleared.

State counter 435 addresses memory 434 so that the data from pulse counter 438 is written to the appropriate location. For other states in the write mode, state counter 435 is incremented so that it addresses a different location in memory 434.

With reference to FIG. 12, write signal 640 is received by sensor unit 400 as sensor write signal 650. Sensor write signal 650 initiates a state change by sending an activation signal followed by a specified period of carrier "ON" signal. In response to this period of carrier signals, state counter 435 is incremented to change states When the appropriate state is reached by state counter 435, data is transmitted in the form of clock pulses by receiver unit 500.

State counter 435 provides circuitry for addressing the memory 434 and signalling the memory 434 to input the data on pulse counter 438. This circuitry includes one shots and logic gates for enabling the write input to memory 434 as well as the various address inputs in memory 434. In one embodiment, pulse counter 438 inputs the data into memory in response to a signal from charge circuit 431. Charge circuit 431 produces this signal in response to a carrier "ON" signal after the clock pulses have been sent on write signal 650.

There are various ways of employing processor circuitry 430 so that it addresses various memory locations, interprets data, stores data, and transmits data. This is a preferred embodiment among various embodiments including a microprocessor based system, or integrated circuit system which do not escape the spirit of the invention as discussed in the claims.

Although this particular preferred embodiment of communication has been described, various other communication techniques, and protocols are available without detracting from the spirit of the invention. For instance activation, deactivation, mode changes, and state changes could be communicated by transmitting different pulses, different frequencies, different pulse widths, different transmitters, or any other distinguishing signals.

After an inspection tour is completed, data collected can be downloaded from the receiver unit 500. The serial port 528 provides a means of communication between receiver unit 500 and other devices (not shown). For instance, receiver unit 500 could down load contents of memory 522 into a personal or central computer (not shown) through serial port 528. Also, receiver unit 500 could receive data from an outside source (not shown) through serial port 528.

Receiver unit 500 generates barometric pressure data indicative of the outside barometric pressure. Barometric sensor 538 produces a signal indicative of the barometric pressure of the environment of the receiver. Barometric sensor stores a data value indicative of the barometric pressure in memory 522. This data can be used to more accurately adapt the pressure measurement of the extinguisher. For instance, pressure readings are less accurate when there is a difference between atmospheric pressure at the filling sight and the inspection sight.

Receiver unit 500 also generates time and date data indicative of the time and date of the inspection. This data could be generated by a timer unit (not shown) or inputted by the user through serial port 528 or keyboard 526. The data produced by receiver 500 is stored with data received from sensor unit 400 in memory 522. Memory 522 is large enough to accommodate the relevant data for at least one inspection tour. The data stored in memory 522 can be viewed on display 532 or transmitted through serial port 528 to a central computer.

The physical parameter measured by the remote sensing and receiving system is not limited to pressure. Transducer 422 is a pressure transducer for use in extinguisher devices in which the quantity of contents is measured by pressure; for $CO_2$ fire extinguishers, measuring the pressure inside the extinguisher is an effective way of measuring the charge of the fire extinguisher device. In other types of fire extinguisher devices, like a soda type extinguisher, the charge is effectively measured by weight. Sensor unit 400 can be configured for use in a soda type extinguisher by replacing pressure measurement circuit 420 with a weight measurement circuit. An equivalent of pressure transducer 422 for weight measurement is a strain gauge or other device used to measure weight. The placement of transducer 422 may have to be adjusted for weight application. For instance, a more suitable mounting position for weight transducer is on the bottom of fire extinguisher device 305.

The remote sensing and receiving system can be configured to be employed in various types of devices. For instance, the system could be employed in cooling systems like refrigeration devices, home air conditioners, car air conditioners, commercial environment cooling systems, freezers, and other chilling systems. The remote sensing and receiving system would work similarly to the operations discussed above. Sensor unit 400 would be affixed to the tubes or coils for measuring the pressure of the contents therein. These contents are any refrigerant for use in cooling applications; examples of such refrigerants are freon 12 as well as other types of freon, ammonia, ethane, propane, sulphur dioxide, carbon dioxide, methyl chloride and other refrigerants.

Figure 16:
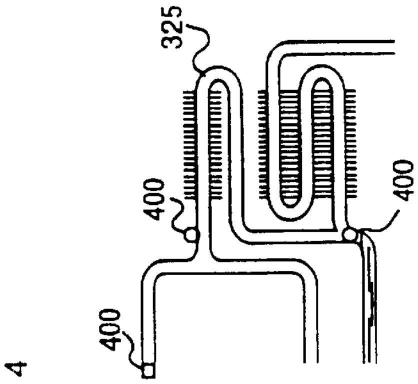

With reference to FIG. 16, sensor unit 400 could be affixed on or within a section of the tubes or coils during manufacture or later affixed to the system as a retrofit. For instance, the sensor unit 400 could be part of a cap placed over the end of a tube-like refrigeration piping 325. Tubes or refrigeration piping 325 can be divided into three categories: liquid lines, suction lines, and discharge lines. Sensor unit 400 could be employed in any of these three lines as well as in the condenser, compressor or evaporator as the user's needs dictate. In a preferred embodiment, the sensor unit 400 is placed in or near the condenser or a reservoir so that it most efficiently detects refrigerant or coolant system pressures. For measurements when the cooling system is off, sensor unit 400 should be placed near the evaporator or a reservoir which collects coolant when the cooling system is off.

Sensor unit 400 could derive power from the host appliance. For instance, in a refrigerator, sensor unit 400 could be supplied from the refrigerator power source rather than battery 410. In air conditioner applications, sensor unit 400 could alternatively receive power from the car or home electrical system rather than battery 410.

The remote sensing and receiving system provides an ideal apparatus for checking piping 325 in units as they progress down the assembly line. For example, a production system could be configured so that an air conditioner employed with at least one sensor unit 400 travels along an assembly line and passes by receiver unit 500 situated near the assembly line. Receiver unit 500 is configured to derive power from the assembly line power supply. Receiver unit 500 reads the pressure data transmitted by sensor unit 400. Receiver unit 500 transmits this data to a central computer or other assembly line apparatus so that appropriate action may be taken with regard to the amount of coolant in the air conditioner.

Another embodiment of the sensing and receiving system is used in fuel systems like fuel lines and fuel tanks. For instance, the system could be employed in natural gas lines or liquid propane tanks.

Figure 15:
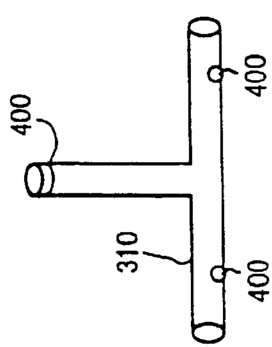

With reference to FIG. 15, the system could be used in a natural gas line 310 to measure the pressure of the contents at various points in the gas lines. These measurements would be helpful for determining leaks and usage of natural gas. In this embodiment, sensor unit 400 would be affixed in or on various points along natural gas line 310; sensor unit 400 could be powered by battery 410 or an AC source. An inspector or robot could determine the natural gas pressure at the various points on the gas line by using receiver unit 500.

Figure 17:
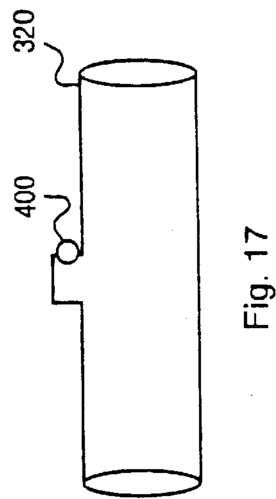

With reference to FIG. 17, the remote sensing and receiving system could also be used in liquid propane tanks. This embodiment is similar to the fire extinguisher embodiment discussed in great detail above. Sensor unit 400 could be affixed in a liquid propane tank 320. Receiver unit 500 would read the pressure data transmitted by sensor unit 400 in a manner similar to the methods discussed in the above other embodiments.

Figure 18:
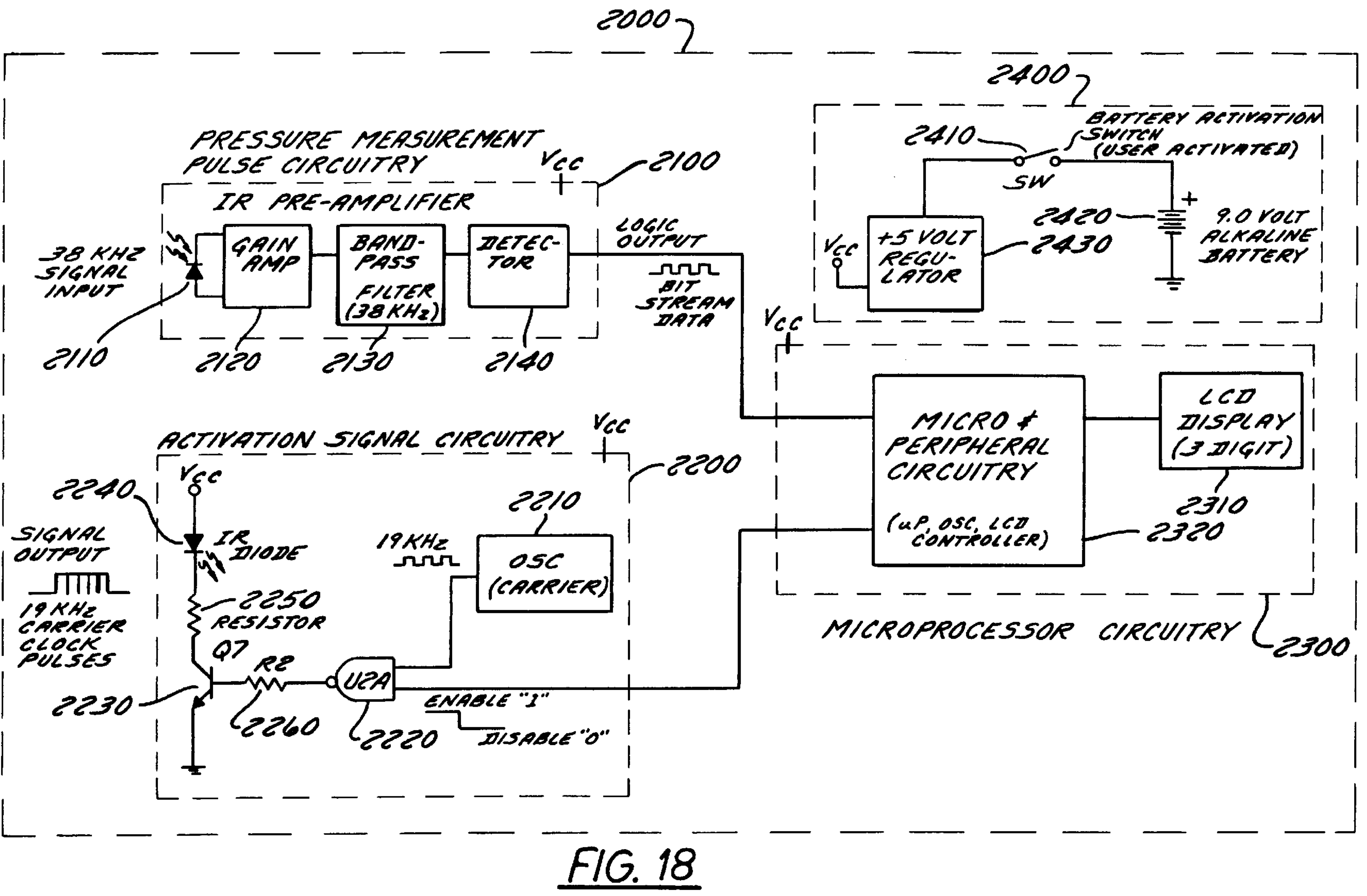
FIG. 18 is a block diagram representation of a preferred embodiment of a receiver unit.
Figure 19A:
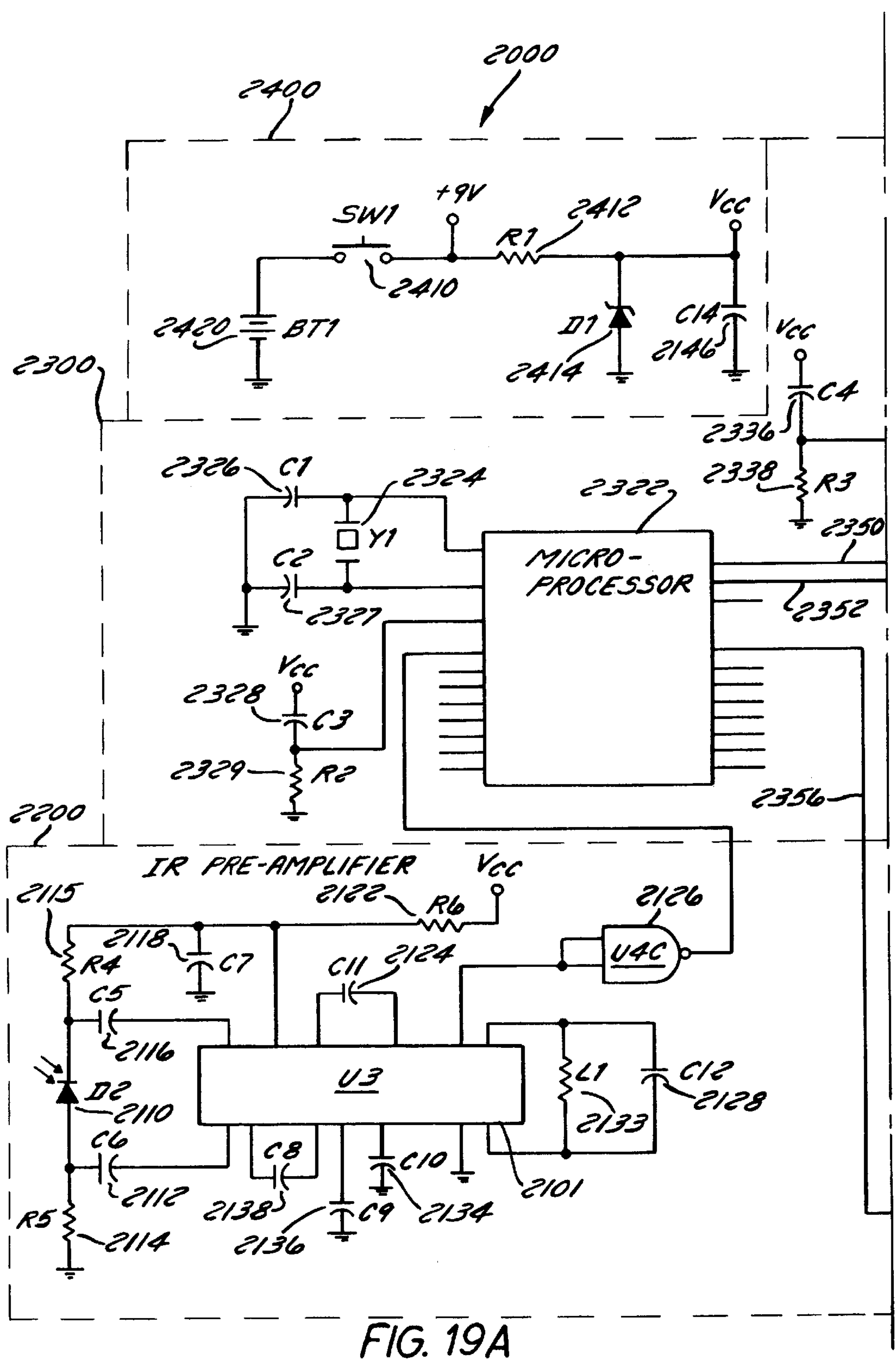
FIG. 19 is an electrical schematic circuit diagram of a preferred embodiment of a receiver unit.
Figure 19B:
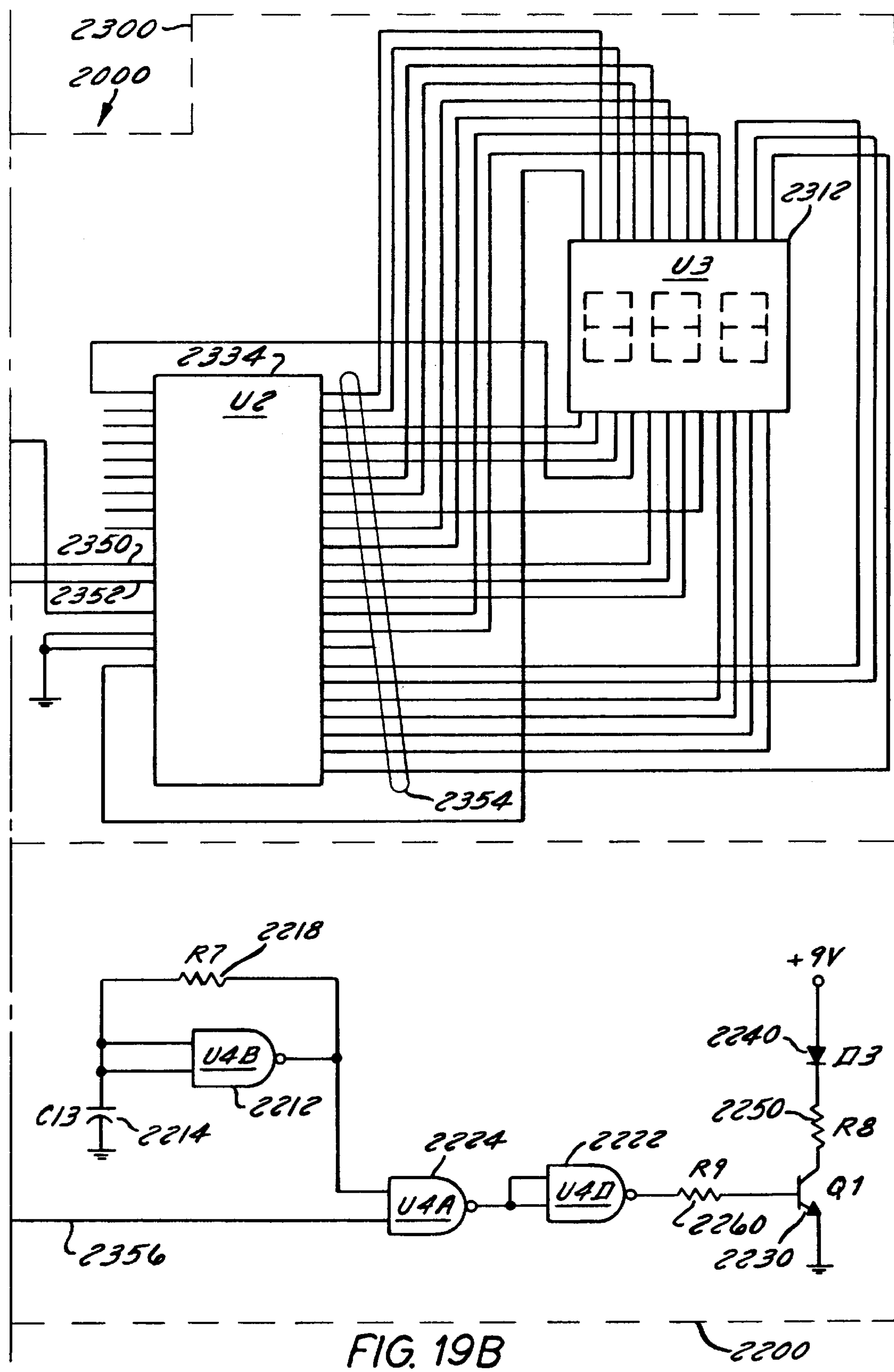

In a third embodiment, a reliable remote sensing and receiving system for use in tire pressure sensing applications, as well as other applications, includes a sensor unit 1000 (FIGS. 20 and 21) and a receiver unit 2000 (FIGS. 18 and 19). Sensor unit 1000 may be affixed to a tire or other vessel similar to sensor unit 400 or transducer unit 14. In this particular embodiment, sensor unit 1000 and receiver unit 2000 utilize digital circuits to implement the sensing and receiving system.

With reference to FIG. 18, receiver unit 2000 includes an infrared receiver 2100, a transmitter circuit 2200, a computer circuit 2300, and a power circuit 2400. These circuits are coupled to each other to perform various; receiving operations.

Computer circuit 2300 provides storage and manipulation of data received from infrared receiver 2100. Computer circuit 2300 supplies data to, and controls transmitter circuit 2200. Computer circuit 2300 includes a micro and peripheral circuit 2320 and an LCD display 2310. Circuit 2320 receives signals from the infrared receiver 2000 and provides data to LCD display 2310 for generating visual indicia of sensor measurements.

Infrared receiver 2100 detects infrared signals from a distance of approximately 3–5 feet from sensor unit 1000 and generates electrical signals representative of the infrared signals. Infrared receiver 2100 which is coupled to computer circuit 2300 also amplifies, filters and demodulates the electrical signals. Infrared receiver 2100 may includes an infrared detector 2110 coupled to a gain amplifier 2120, which is coupled to a band pass filter 2130 which is coupled to a detector 2140. Infrared detector 2110 generates electrical signals in response to infrared light. Gain amplifier 2120 amplifies the signal from infrared detector 2110 and applies a signal to band pass filter 2130. Band pass filter 2130 is tuned so that only signals of approximately 38 kHz are allowed to pass to detector 2140. Detector 2140 demodulates the signal from band pass filter 2130 and provides a demodulated signal to computer circuit 2300.

In response to the demodulated signal, computer circuit 2300 applies a control signal to transmitter circuit 2200. The control signal enables and disables a 19 kHz oscillator signal produced by an oscillator 2210. The oscillator signal is applied to an AND gate 2220. AND gate 2200 outputs the oscillator signal when computer circuit 2300 applies a logic "1" to AND gate 2220. When enabled, AND gate 2220 modulates an NPN transistor 2230 at 19 kHz through a resistor 2260. NPN transistor 2230 conducts current through a resistor 2250 and an infrared LED 2240 in response to the signal from AND gate 2220. Infrared LED 2240 emits infrared light in response to the electric signal.

Power circuit 2400 provides electrical power to receiver unit 2000. A 9-volt battery 2420 provides power through a switch 2410 to a 5-volt regulator 2430. 5-volt regulator 2430 provides a 5-volt signal to the infrared receiver 2100, transmitter circuit 2200, and computer circuit 2300.

Figure 20:
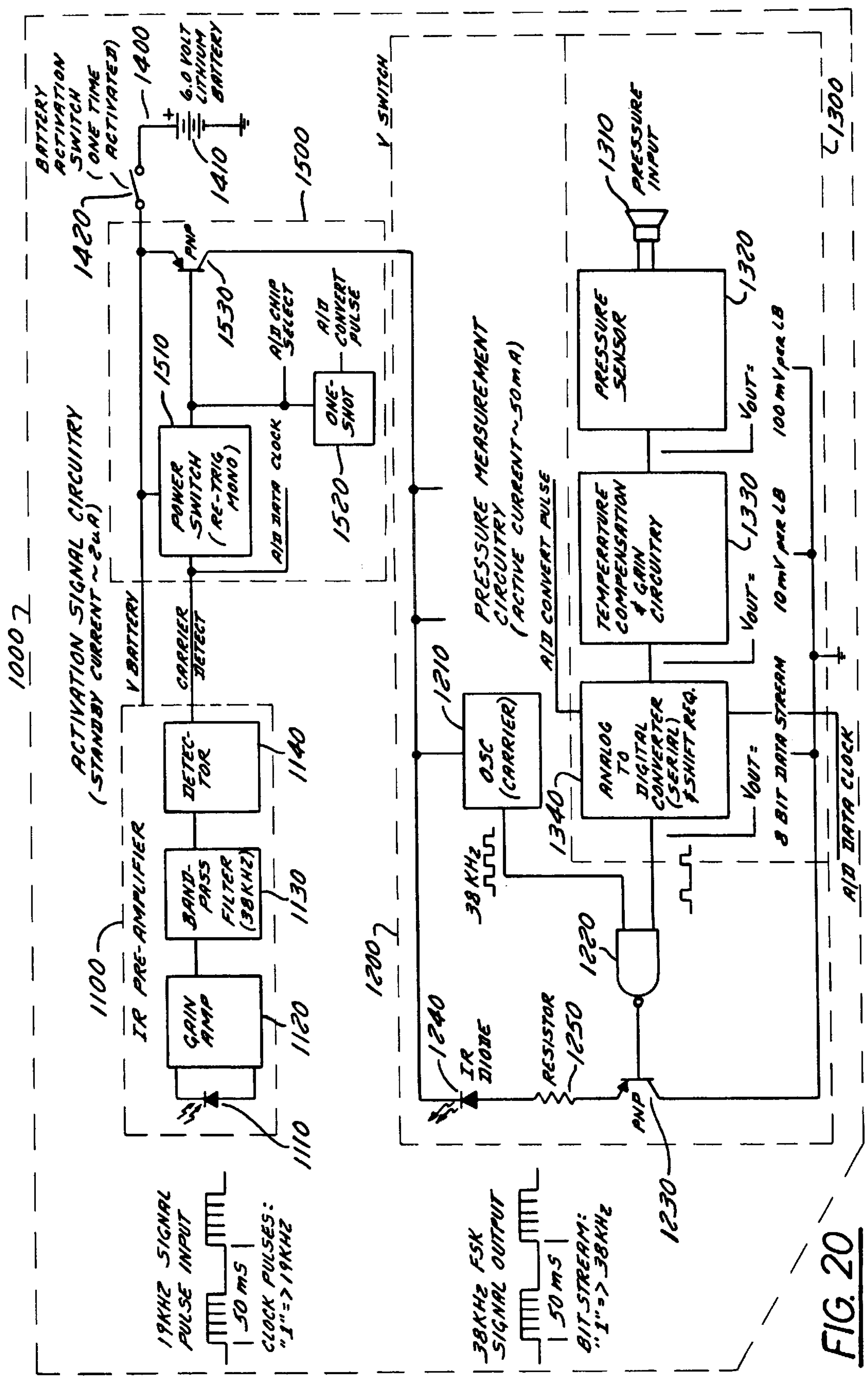
FIG. 20 is a block diagram representation of a preferred embodiment of a sensor unit.

With reference to FIG. 20, sensor unit 1000 includes an infrared receiver 1100, a transmitter circuit 1200, a pressure measurement circuit 1300, a power circuit 1400, and an activation circuit 1500. The operations of these circuits are similar to the operations of the circuits in receiver unit 2000. These circuits are coupled to each other to perform various operations.

Infrared receiver 1100 is similar to infrared receiver 2100. An infrared detector 1110 produces electric signals in response to infrared signals. A gain amplifier 1120 amplifies the electric signal from infrared detector 1110. A band pass filter 1130 is tuned so that only signals of approximately 19 kHz are allowed to pass from amplifier 1120 to a detector 1140. Detector 1140 demodulates the signal and provides signals such as an A/D data clock signal to activation circuit 1500 and pressure measurement circuit 1300.

Transmitter circuit 1200 is similar to transmitter circuit 2200. Transmitter circuit 1200 is controlled by pressure measurement circuit 1300. An oscillator 1210 provides a 38 kHz signal to one input of a NAND gate 1220. Pressure measurement circuit 1300 provides a signal representing pressure measurement data to a second input of NAND gate 1220. When transmitter circuit 1200 is enabled by pressure measurement circuit 1300, NAND gate 1220 provides the 38 kHz oscillator signal to a PNP transistor 1230. This signal modulates PNP transistor 1230 at 38 kHz . In response to this modulation, current travels through infrared diode 1240 and a resistor 1250. When current travels through infrared diode 1240, infrared light is emitted.

Power circuit 1400 provides power to the sensor unit 1000. Power circuit 1400 includes a switch 1420 and a battery 1410. Battery 1410 may be a 6-volt lithium battery. Switch 1420 is a one time activated switch which protects battery 1410 from providing power during the manufacture of sensor unit 1000.

Activation circuit 1500 provides power to pressure measurement circuit 1300 when an activation signal, or start-up signal, is provided to a power switch 1510. Power switch 1510 may be a retriggerable monostable circuit. In this particular embodiment, a start-up signal is an infrared 19 kHz modulated signal. The start-up signal can be a pulse or constant "ON" signal of the 19 kHz carrier signal. In response to a start-up signal, power switch 1510 turns a PNP transistor 1530 "ON" and sends a signal to a one shot circuit 1520. One shot circuit 1530 produces an A/D convert signal in response to the signal from power switch 1510. When transistor 1530 is "ON", power is provided to pressure measurement circuit 1300 and transmitter 1200. When transistor 1530 is "OFF", power is only provided to activation circuit 1500 and infrared receiver 1100. Disabling power to circuit 1200 and circuit 1300 increases the life of battery 1410.

When pressure measurement circuit 1300 is provided power by activation circuit 1500, pressure measurement circuit 1300 generates a signal indicative of pressure and provides the signal to transmitter circuit 1200. Pressure measurement circuit 1300 includes a pressure sensor 1320, a pressure transducer 1310, an amplifier 1330, and an analog-to-digital converter 1340.

Pressure sensor 1320 produces an electrical signal indicative of pressure sensed by pressure transducer 1310. This electrical signal is amplified by amplifier 1330. Amplifier 1330 provides temperature compensation and gain amplification. Analog to digital converter 1340 converts the analog pressure signal from amplifier 1330 into a binary signal in response to the A/D convert signal produced by one shot 1520. In response to A/D data clock signal, analog to digital converter 1340 serially outputs the binary signal to transmitter circuit 1200 for eventual reception by receiver unit 2000.

The general operations of receiver unit 2000 and sensor unit 1000 are similar to the general operations of sensor unit 400 and receiver unit 500 discussed previously with reference to FIGS. 10 and 11. With reference to FIGS. 18 and 20, a start-up signal is initiated by computer circuit 2300 and transmitted by transmitter circuit 2100.

The start-up signal is received by infrared receiver 1100. In response, infrared receiver 1100 provides this signal to activation circuit 1500. In response to this signal, activation circuit 1500 provides power to circuits 1200 and 1300. In response to the supply of power and the A/D convert signal, pressure measurement circuit 1300 generates an electric signal indicative of pressure.

In response to clock signals transmitted by receiver unit 2000, transmitter circuit 1200 transmits an infrared signal to receiver unit 2000, where the signal is indicative of the electric signal produced by pressure measurement circuit 1300. Upon detection of the infrared signal, infrared receiver 2100 generates an electric signal indicative of the infrared signal and transmits the electric signal to computer circuit 2300 to produce a display signal applied to LCD display 2310.

Referring to FIG. 19, circuit 2300 includes a microprocessor 2322 which controls the various circuits associated with receiver unit 2000. Microprocessor 2322 is preferably a Signetics 80C751 processor. This device is chosen because the cost is minimal and yet it provides the necessary functions. Another suitable microprocessor 2322 for this type of application is an NEC micro PD75304. Microprocessor 2322 is a mask program device. Other versions is of microprocessor 2322 such as EPROM versions which come in a window or one-time programmable version are suitable.

The various devices coupled to microprocessor 2322 are standard device interconnections as is well known in the art. The reset pin is coupled to a 10 microfarad electrolytic capacitor 2328, and a 10K ohm resistor 2329. Resistor 2329 and capacitor 2328 form a standard "power on reset" circuit. (All resistors in this second embodiment are 0.25 watt and 1% tolerance.) Inputs X1 and X2 are connected to a 12 MHz oscillator 2324, a capacitor 2326 and a capacitor 2327 to provide an oscillator signal. Oscillator 2324 is a standard 12.0 MHz oscillator crystal with 0.01% tolerance. Capacitors 2326 and 2327 are 20–30 pF ceramic disk capacitors. Descriptions for the various circuit connection for microprocessor 2322 are described in the technical documentation associated with microprocessor 2322.

Microprocessor 2322 may be programmed in a high level language called PLM-51 designed for the 8051 family of microprocessors, of which the 80C751 is a family member. However, an I2C bus driver and minor interrupt vector routines are programmed in 8051 assembly language. An example of the software is enclosed as appendix A and will be explained in more detail with respect to FIG. 23.

Microprocessor 2322 is coupled to a liquid crystal display (LCD) 2312 by an LCD display controller 2334. Data lines 2350 and 2352 couple microprocessor 2322 to controller 2334, and controller 2334 is coupled to LCD 2312 by data bus 2354. Microprocessor 2322 provides signals to LCD 2312 via controller 2334. LCD 2312 is a LXD 3-digital display mode 30 manufactured by LXD. The LXD mode 30 is chosen for low cost and low power consumption. Other manufacturers of similar devices are available, such as optrex. Controller 2334 drives LCD 2312 in response to signals from microprocessor 2322. Controller 2334 may be a Signetics PCF8577. The Signetics PCF8577 may be chosen since the I2C bus protocol is built into controller 2334. A 680 pF ceramic disk capacitor 2336 and a 1 M ohm resistor 2338 provide a "power on reset" circuit for controller 2334. The details of the interaction and interconnections of microprocessor 2322, LCD 2312, and controller 2334 are explained in the product literature of each device.

Microprocessor 2322 enables transmitter circuit 2200 to emit 19 KHz modulated infrared signals. A 100K ohm resistor 2218, a 0.0018 microfarad ceramic disk capacitor 2214, and a NAND gate 2212 produce a 19 kHz signal. NAND gate 2212 is a 14093 Schmidt NAND gate produced by Motorola or equivalent. (All NAND gates of the second embodiment are of this type.) The charging and discharging of capacitor 2214 and resistor 2218 create the 19 kHz output from NAND gate 2212.

Microprocessor 2322 is coupled to a NAND gate 2224 by data line 2356, where the output of NAND gate 2212 is also connected to gate 2224. NAND gate 2224 allows microprocessor 2322 to selectively apply the 19 kHz signal to a NAND gate 2222. When NAND gate 2224 is enabled by the P3.0 output of microprocessor 2322, the 19 kHz signal is provided to a NAND gate 2222. NAND gate 2222 acts as an invertor. The signal output from NAND gate 2222 is transmitted through a 4.7K ohm resistor 2260 to the base of NPN transistor 2230. NPN transistor 2230 is a 2N4401 transistor produced by Motorola or equivalent.

Transistor 2230 is modulated by the signal from NAND gate 2212 through NAND gate 2224 and NAND gate 2222. When transistor 2230 is turned "ON", current runs through 100 ohm resistor 2250 and infrared LED 2240. When current travels through LED 2240, infrared light is generated. Thus, LED 2240 produces a 19 kHz modulated infrared signal indicative of the electrical signal from NAND gate 2224. Infrared LED 2240 is preferably an LTE5208A, made by Light-On or an equivalent. This diode was found to give a suitable transmission distance. Numerous manufacturers make infrared LEDs which are appropriate for this application.

Signals from sensor unit 1000 are received by infrared detector 2110 of infrared receiver circuit 2100. Infrared detector 2110 provides an electrical signal indicative of the infrared signal to an infrared preamplifier 2101. Various operations of infrared receiver circuit 2100 are implemented through infrared preamplifier 2101. Infrared preamplifier 2101 is a Signetics TDA3047 infrared preamplifier.

Infrared detector 2110 is biased by a 22 ohm resistor 2122, a 22K ohm resistor 2115 and a 22K ohm resistor 2114. A capacitor 2116 and a capacitor 2112 filter out the DC signal so that only the AC signal from infrared detector 2110 is input into infrared preamplifier 2101. Capacitor 2116 and 2112 are 0.01 microfarad ceramic disc capacitors. A capacitor 2124, a capacitor 2138, a capacitor 2136, and a capacitor 2134 perform isolation and filtering operations. Capacitor 2124 is a 0.01 microfarad ceramic disk capacitor; capacitor 2138 is a 0.47 microfarad ceramic disk capacitor; capacitor 2136 is a 0.022 microfarad ceramic disk capacitor; and capacitor 2134 is a 6800 pF ceramic disk capacitor. These arrangements provide coupling, gain and queuing for the various filters and amplifiers in infrared preamplifier 2101. Resistor 2122 and a capacitor 2118 stabilize the power supply for infrared preamplifier 2101. Capacitor 2118 is a 0.47 uF electrolytic capacitor.

Infrared preamplifier 2101 is tuned to receive 38 kHz modulated signals from infrared detector 2110. Infrared preamplifier 2101 provides amplifying, filtering and demodulating operations and outputs a demodulated signal to input P1.0 of microprocessor 2322 through a NAND gate 2126. NAND gate 2126 inverts the signal from infrared preamplifier 2101. The various devices coupled to infrared preamplifier 2101 provide coupling and isolating functions and are described in the product literature associated with infrared preamplifier 2101.

A 4.7 mH inductor 2133 and a 3900 pF ceramic disk capacitor 2128, coupled to pins 7 and 10 of preamplifier 2101, provide filtering for the signal. Inductor 2133, capacitor 2128, and infrared preamplifier 2101 combine to provide a band bass filter tuned to approximately 38 kHz. Infrared detector 2110 is an infrared detector or receiver such as a LTR-316AG produced by Light-On or an equivalent. Numerous manufacturers produce infrared detectors suitable for this application.

Battery 2420 provides power to the circuits in receiver unit 2000. Battery 2420 is a standard 9-volt D battery, preferably alkaline for long life, like an Eveready #522. Battery 2420 needs to be easily replaceable because the receiver unit 2000 is not a throw-away device. In this particular embodiment, battery 2420 provides 9 volts of power to infrared LED 2240 and a regulated 5-volt supply for powering the other circuit components. However, other power sources or batteries that provide voltages suitable for powering of the electronic circuitry are acceptable substitutes for battery 2420.

The 5 volt regulated supply voltage, VCC, and 9 volt supply, +9 volt, are provided through switch 2410 to the circuits in receiver unit 2000. Switch 2410 is suitably a push button switch or an ON-OFF switch. A zener diode 2414 is used to provide a regulated 5-volt voltage. Zener diode 2414 is a 1NS230, a 4.7 volt zener diode or equivalent. A resistor 2412 is a 100 ohm resistor, and switch 2410 is a SPST activation switch. A 47 uF electrolytic capacitor 2416 also filters and regulates the 5-volt voltage.

Figure 21A:
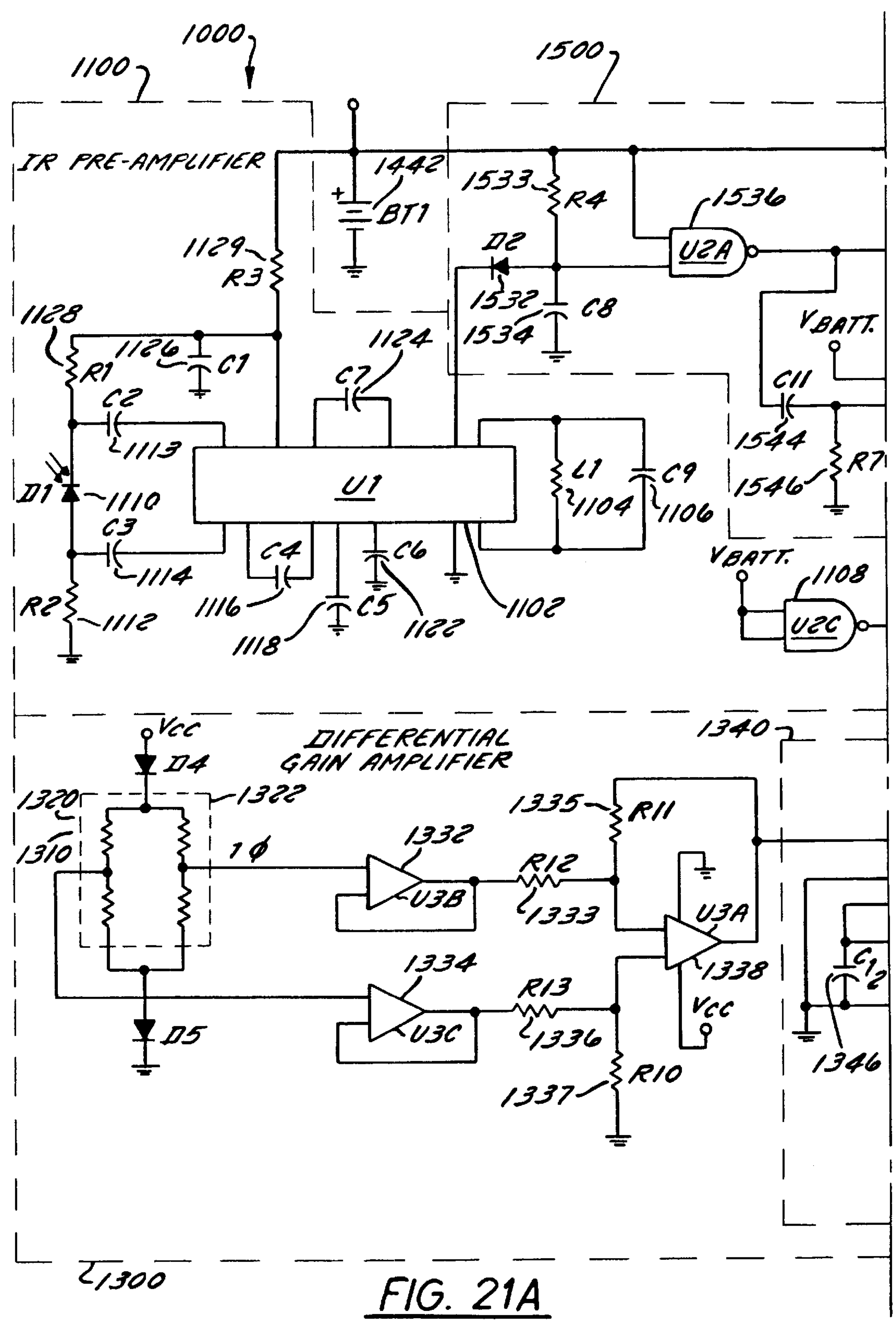
FIG. 21 is an electrical schematic circuit diagram of a preferred embodiment of a sensor unit.
Figure 21B:
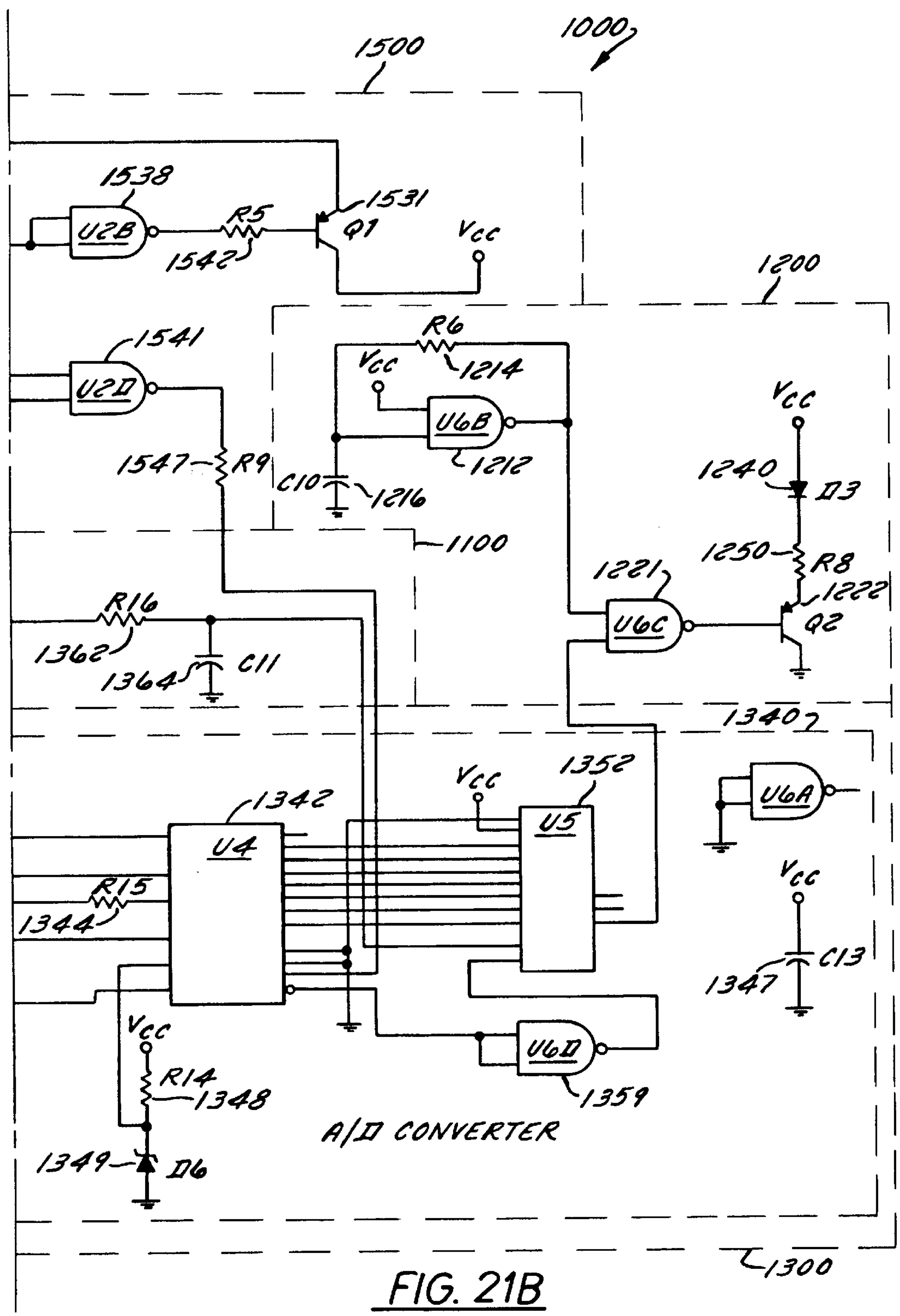

Referring to FIG. 21, pressure is sensed in pressure sensor unit 1000 by transducer 1310. Transducer 1310 and pressure sensor 1320 are combined in a pressure sensor unit 1322. Pressure sensor unit 1322 is preferably a Nova sensor #NPH.

Generally, pressure sensor unit 1322 must be capable of monitoring 0–150 psi accurately. The output of pressure sensor unit 1322 should be linear with respect to pressure unless the circuitry of sensor unit 1000 is modified appropriately. Unit 1322 should also experience minimum drift with respect to temperature range. The use of a silicon technology to create a piezoresistive bridge is most effective in this application. These devices are quite linear and minimize the effects of temperature drift because all components reside in the same substrate and can be designed to compensate each component. However, the temperature range for the tire pressure sensing system is very extreme. With a temperature range of −40° C. to 125° C., even the best device has problems maintaining accuracy or consistency. In this application, a best fit scenario is recommended; that is, fit the curve for accuracy for the most useful range and let the accuracy fall off at the extremes. The extremes of the temperature range are not very often used. The Nova sensor #NPH is a suitable low cost choice.

Pressure sensor unit 1322 provides a full scale output voltage at approximately 100 mV. In other words, when pressure sensor unit 1322 is exposed to 150 pounds per square inch of pressure, the difference in outputs 10 and 4 is 100 mV. Several manufacturers make pressure sensor products which are usable for this application, like Honeywell, IC Sensors and Nova Sensor. The 100 mV output voltage is too small for devices like an analog-to-digital converter to work effectively. Thus, an amplifier with a gain of approximately 30 is used to interface unit 1322 to devices like an analog-to-digital converter.

Temperature compensation and gain circuitry 1330 is implemented through an amplifier 1332, an amplifier 1334 and an amplifier 1338. Amplifiers 1332, 1334, and 1338 are LM324 op-amps or equivalents. These amplifiers are well known in the art. A 10K ohm resistor 1333, a 10K ohm resistor 1336, a 287K ohm resistor 1335, and a 287K ohm resistor 1337 are used to provide the appropriate gain.

Analog-to-digital converter 1340 receives an analog signal indicative of pressure from amplifier 1338. Converter 1340 is suitably comprised of a analog-to-digital converter 1342, a resistor 1348, a zener diode 1349, a 150 pF ceramic disk capacitor 1346, a 10K ohm resistor 1344, a NAND gate 1359 and a serial shift register 1352. A shift register 1352 combined with a parallel analog-to-digital converter is used because a clock frequency of less than 10 kHz is needed. Presently available Serial A/D converters are not suitable for applications involving clock signals less than 10 kHz. This is due to the dynamic nature of internal data storage. Analog-to-digital converter 1342 is suitably a National ADC0801 8-bit A/D converter or equivalent. In support for analog-to-digital converter 1342 , a 1.2 volt reference is provided by means of 4.7K ohm resistor 1348 and zener diode 1349. Zener diode 1349 is a LM385 1.2 volt reference zener diode or equivalent. A capacitor 1347 provides decoupling for analog-to-digital converter 1342. Capacitor 1347 is a 2.2 microfarad electrolyte capacitor.

The outputs of analog-to-digital converter 1342 are provided to serial shift register 1352. When a pulse appears on the write input of analog-to-digital converter 1342, a parallel binary output of the analog signal is provided. Serial shift register 1352 receives the parallel binary signal in response to a control signal through gate 1354. The control signal is produced at the INTR pin of converter 1342. Serial shift register 1352 is suitably comprised of a Motorola 14021 8-bit shift register or an equivalent. Serial shift register 1352 provides a serial output of the parallel binary signal in response to pulses input to the clock input. The output of a shift register 1352 is applied to a NAND gate 1221.

NAND gate 1221 drives a transistor 1222. NAND gate 1221 is a 14093 Schmidt NAND gate produced by Motorola or an equivalent. (All NAND gates in sensor unit 1000 are 14093 NAND gates.) PNP transistor 1222 is suitably a Motorola #2N4403, T0-92 or equivalent transistor. When current flows through transistor 1222, current flows through resistor 1250 and infrared LED 1240. Infrared LED 1240 is suitably a LTE5208A, manufactured by Light-on. Suitable infrared LEDs 1240 are manufactured by other manufacturers as well. The Light-On device was chosen for transmission distance characteristics and cost.

A NAND gate 1212 produces a 38 kHz oscillator signal. A 100K ohm resistor 1214 and an 820 pF ceramic disk capacitor 1216 allow NAND gate 1212 to produce the 38 kHz oscillator signal. This oscillator signal is applied to NAND gate 1221 which drives transistor 1222.

Start-up signals from receiver unit 2000 are received by infrared receiver 1100. Infrared detector 1110 provides an electrical signal indicative of the infrared signal to an infrared preamplifier 1102. Infrared detector 1110 is biased by a 22 ohm resistor 1129, a 22K ohm resistor 1128, and a 22K ohm resistor 1112. Infrared detector 1110 is a LTR-316AG detector manufactured by Light-on or an equivalent. Various operations of infrared receiver 1100 are implemented through infrared preamplifier 1102. Infrared preamplifier 1102 is a Signetics TDA 3047 infrared preamplifier.

Infrared preamplifier 1102 is tuned to receive 19 kHz modulated signals from infrared detector 1110. Infrared preamplifier 1102 outputs a demodulated signal at pin 9. A capacitor 1113 and a capacitor 1114 provide a filter so that only AC signals from infrared detector 1110 are input into infrared preamplifier 1102. Capacitors 1113 and 1114 are 0.01 uF ceramic disk capacitors. Infrared preamplifier 1102 provides amplifying, filtering, and demodulating operations for the signal received by infrared detector 1110. A 0.047 microfarad capacitor 1116, a 0.022 microfarad capacitor 1118, and a 6800 pF capacitor 1122, provide various queuing and gain functions for infrared amplifier 1102. Capacitors 1124 1118 and 1122 are all ceramic disk capacitors. Resistor 1129 and 47 uF electrolytic capacitor 1126 also stabilize the power supply for infrared preamplifier 1102. Capacitor 1124, provides coupling between the amplifiers in infrared preamplifier 1102. Other chips which provide similar signal processing may require different values or difference components than those associated with the infrared preamplifier 1102 of this design.

The various devices coupled to infrared preamplifier 1102 are described in the product literature. An inductor 1104, a capacitor 1106 and infrared preamplifier 1102 provide a band pass filter tuned to approximate 19 kHz.

A battery 1442 is provided to power various components of unit 1000. The negative terminal of battery 1442 is coupled to ground, and the positive terminal is coupled to preamplifier 1102 by resistor 1129. The positive terminal is also coupled to a NAND gate 1536 and the emitter of a transistor 1531. A resistor 1533 couples the positive terminal to one input of gate 1536, and the anode of diode 1532. The cathode of diode 1532 is coupled to preamplifier 1102 and a NAND gate 1108. Battery 1442 provides a logic "1" to one input on gate 1536, a gate 1541, and gate 1108.

Battery 1442, preferably comprised of two 3-volt lithium batteries in series, provides a 6 volt power source. Battery 1442 is suitably comprised of two Eveready #CR2025 lithium oxide button, 3.0 volt. Of course, a single 6.0 volt battery is an alternative. Battery 1442 can be any suitable equivalent which is small, lightweight, has a stable supply voltage, and provides high current pulse capability, and low cost. Again, any power source is acceptable that can provide adequate voltage and current to the circuit. Custom integrated circuit implementation may reduce the power source requirement to one 3 volt power supply such as one Lithium 3V battery.

NAND gate 1536 is coupled to preamplifier 1102 through a retriggerable monostable circuit including resistor 1533, diode 1532 and a capacitor 1534. Capacitor 1534 is coupled between ground and the anode of diode 1532. When the input coupled to diode 1532 is a level "0", the output of NAND gate 1536 is a level "1". When the output of NAND gate 1536 is a level "1", the output of a NAND gate 1538 is a level "0". NAND gates 1536 and 1538 are 14093 Schmidt NAND gates manufactured by Motorola. When the output of NAND gate 1538 is "0", transistor 1531 is turned "ON" through a resistor 1542. When transistor 1531 is turned "ON", power is provided to the various circuit elements in sensor unit 1000.

Transistor 1531 provides power to various circuit elements in sensor unit 1000. Transistor 1531 is a 2N4403 PNP transistor produced by Motorola or equivalent. When a carrier signal is detected by an infrared detector 1110, infrared preamplifier 1102 sets pin 9 at a logic level "0". When pin 9 of infrared preamplifier 1102 is a logic "0", capacitor 1534 is discharged through diode 1532. When capacitor 1534 is discharged, the input of NAND gate 1536 is a logic "0". Diode 1532 is a 1N4148 or equivalent, and capacitor 1534 is a 0.47 microfarad ceramic disc capacitor. A 100K ohm resistor 1533 delays the charging of capacitor 1534 so that the input to NAND gate 1536 remains a logic "0" for a predetermined amount of time after infrared preamplifier outputs a logic "1".

The output of NAND gate 1536 is also coupled to NAND gate 1541 through a one shot circuit. The one shot circuit is comprised of a 0.1 microfarad ceramic disk capacitor 1544 and a 10K ohm resistor 1546. The output of the one shot circuit is coupled to NAND gate 1541. The output of NAND gate 1541 is coupled to converter 1342 through, a 10K resistor 1547.

The output of infrared preamplifier 1102 at pin 9 is also coupled to NAND gate 1108. The output of NAND gate 1108 is coupled to register 1352 through a filter comprised of a 10K ohm resistor 1362 and a 0.01 microfarad ceramic disk capacitor 1364.

A more detailed description of the operation of sensor unit 1000 and receiver unit 2000 will now be explained in detail with reference to FIGS. 21 and 19. When receiver unit 2000 is turned "ON" via switch 2410, microprocessor 2322 outputs a logic level "1" from the P3.0 output into the second pin of NAND gate 2224 in response to software instructions. The first pin of NAND gate 2224 is connected to NAND gate 2212 which provides a 19 kHz oscillator signal. Therefore, when pin 2 of NAND gate 2224 is a logic "1", a 19 kHz signal is output from NAND gate 2224. This signal is inverted by NAND gate 2222 and provided through resistor 2261) into transistor 2230. Thus, transistor 2230 is modulated at 19 kHz. Infrared LED 2240 provides a modulated infrared signal in response to the signal applied to transistor 2230.

If infrared LED 2240 is within range of infrared detector 1110 in sensor unit 1000, the signal from receiver unit 2000 is received by sensor unit 1000. When infrared preamplifier 1102 receives a 19 kHz signal from infrared detector 1110, the output of infrared preamplifier 1102 is a logic "0".

When the output at pin 9 of infrared preamplifier is a logic "0", the retriggerable monostable circuit comprised of diode 1532, capacitor 1534, and resistor 1533 outputs a logic "0". In other words, when infrared preamplifier 1102 outputs a logic "0" at pin 9, pin 2 of NAND gate 1536 is pulled to a logic zero through diode 1532. When output 9 of infrared preamplifier 1102 is a logic "1" capacitor 1534 charges up and provides a logic "1" to NAND gate 1536.

When NAND gate 1536 is provided a logic "0" from the retriggerable monostable circuit, NAND gate 1536 outputs a logic "1". This output is provided to NAND gate 1538 which acts as an invertor. Thus, when NAND gate 1536 outputs a logic "1", transistor 1531 is turned "ON" and provides a 5 volt signal, VCC, to the circuit components in sensor unit 1000. When NAND gate 1536 outputs a logic "0", transistor 1531 is turned "OFF" and power is not supplied to VCC.

When the output of NAND gate 1536 changes from a level "1" to a level, a pulse is provided to NAND gate 1541 through a one shot circuit comprised of capacitor 1544 and resistor 1546. Capacitor 1544 and resistor 1546 provide a one shot to increase reliability of the pulse by preventing minor glitches from being interpreted as pulses. In response to the pulse, NAND gate 1541 provides an inverted pulse to analog-to-digital converter 1342 through resistor 1547. Resistor 1547 prevents an unacceptable current flow from battery 1442 to analog-to-digital converter 1342. This inverted pulse signal is called the convert pulse signal.

The sensing of pressure by sensor unit 1000 begins when sensor unit 1000 is turned "ON". When transistor 1531 is turned "ON", power at VCC is provided to pressure sensor unit 1322. Diode 1324 and diode 1326 are 1N4148 diodes used to isolate unit 1322 from VCC and ground. Unit 1322 provides a differential output from pins 4 and 10 indicative of the pressure sensed. The outputs are provided to amplifier 1332 and amplifier 1334. Amplifiers 1332 and 1334 are unity gain amplifiers which isolate the outputs of unit 1322. Amplifier 1332 and amplifier 1334 provide outputs to differential amplifier 1338. Differential amplifier 1338 has a gain of approximately 30. Resistor 1333 and resistor 1335, as well as resistor 1336 and resistor 1337, provide the appropriate gain.

The output of differential amplifier 1338 is provided to analog-to-digital converter 1342. Pressure sensor unit 1322 provides a 100 millivolt signal at 150 pounds per square inch. Thus, the output of unit 1322 is approximately 0.67 millivolts per pound per square inch. This signal is input into differential amplifier 1338 which outputs a signal of approximately 20 millivolts per pound per square inch.

As discussed above, the signal from NAND gate 1541, the convert pulse signal, is provided to analog-to-digital converter 1342. The inverted pulse, the convert pulse signal, is provided to the write input at pin 3 of analog-to-digital converter 1342. When analog-to-digital converter 1342 receives this signal on the write input, analog-to-digital converter 1342 provides a digital parallel 8-bit output representative of the magnitude of the analog signal. The analog-to-digital converter 134 provides a radiometric binary value for the analog input. The binary value is referenced to 1.2 volts through resistor 1348 and zener diode 1349. When analog-to-digital converter 1342 receives an analog signal of 1.2 volts or greater, a binary output of FFH is provided. Resistor 1348 is a 4.7K ohm resistor for biasing zener diode 1349. Zener diode 1349 is a LM385 or equivalent providing a 1.2 volt reference voltage. Resistor 1344 and capacitor 1346 provide internal clocking frequencies for analog-to-digital converter 1342. The values are chosen in accordance with the technical documentation for analog-to-digital converter 1342.

When the data is output from analog to digital converter 1342, the interrupt pin on analog-to-digital converter 1342 outputs a level "0". This signal is applied to NAND gate 1359 which inverts the signal and provides it to serial shift register 1352. In response to a pulse on the P/S input of serial shift register 1352, parallel data from analog-to-digital converter 1342 is loaded into shift register 1352.

After sensor unit 1000 has been turned "ON", receiver unit 2000 awaits a predetermined amount of time for shift register 1352 to obtain a binary number indicative of the pressure measured. After this time has elapsed, microprocessor 2322 emits a clock pulse from output P3.0 in response to the software. As described with reference to the start-up pulses, NAND gate 2224 provides a pulse of 19 kHz in response to the clock pulse from microprocessor 2322. This clock pulse is transmitted as a 19 kilohertz modulated infrared pulse from LED 2240. As with the start-up signals, the clock signal is received by infrared detector 1110. In response to this signal, infrared preamplifier 1102 provides an inverted pulse on its pin 9 output. This pulse keeps sensor unit 1000 "ON" by triggering the retriggerable monostable circuit.

This pulse is also provided to NAND gate 1108 which acts as an invertor. NAND gate 1108 produces clock pulses in response to the change of output on pin 9 of infrared preamplifier 1102. This pulse is transmitted across resistor 1362. Resistor 1362 and capacitor 1364 provide a filter for the pulse. This filter eliminates any pulses of insufficient duration and therefore protects against inconsequential receptions by infrared detector 1110. The signal from NAND gate 1108 is provided to the clock input of serial shift register 1352 and is called the Clock In signal. In response to the Clock In signal, shift register 1352 provides the logic level of the most significant bit at output QH. Output QH is provided to NAND gate 1221. As stated previously, infrared LED 1240 provides infrared light modulated at 38 kHz if the NAND gate 1221 is provided with a logic "1" from serial shift register 1352.

Receiver unit 2000 receives the signal if it is within the range of infrared LED 1240. The signal is received by infrared detector 2110. Infrared detector 2110 provides an electric signal to infrared preamplifier 2101 at pins 2 and 15. The output of infrared preamplifier 2101 at pin 9 is inverted by NAND gate 2126. NAND gate 2126 provides this signal to input P1.0 of microprocessor 2322 if a signal is present, the software value of the bit is "1". If a signal is not received by receiver unit 2000 by the time the clock pulse from receiver unit 2000 is over, receiver unit assumes that the value of the bit is "0". The length of the clock pulse is approximately 50 milliseconds for this particular embodiment.

The software implemented in microprocessor 2322 stores this value and then provides another clock pulse at output P3.0. This clock pulse provides a pulse of infrared light modulated at 19 kilohertz. This infrared pulse is received by infrared detector 1110 and a pulse is provided as the clock in signal to the clock input of shift register 1352 in the same manner that the previous pulse was described. This pulse clocks serial shift register 1352 so that the second most significant bit is output from the QH output of serial shift register 1352. This bit is output by infrared LED 1240. As described above, this output is sensed by infrared detector 2110 and provided to microprocessor 2322. This sequence is repeated until all eight bits are received by microprocessor 2322.

The software in microprocessor 2322 then delays for approximately 125 milliseconds. When no 19 kilohertz signals are sensed by infrared detector 1110, infrared preamplifier 1102 provides a logic "1" output on pin 9. If the output of infrared preamplifier 1102 at pin 9 remains logic "1" for a predetermined length of time, capacitor 1534 charges to a logic "1" level. This predetermined length of time is less than 125 milliseconds. When capacitor 1534 charges to a logic "1" level, the output of NAND gate 1536 becomes low. This signal is inverted through NAND gate 1538 and transistor 1531 is turned "OFF". Thus, power is not provided to circuits coupled to the signal VCC. Thus, the shift register 1352, analog-to-digital converter 1342, differential amplifier 1338 and pressure sensor unit 1322 are not provided, power.

After the 125 milliseconds, microprocessor 2322 provides a start-up pulse to NAND gate 2224 in order to take a second reading. As stated above, in response to this signal, LED 2240 produces a modulated 19 kHz infrared signal which is received by sensor unit 1000. In response to this signal, sensor unit 1000 is turned "ON". When sensor unit 1000 is turned "ON", the pressure is measured by pressure sensor unit 1322 and provided through differential amplifier 1338 to analog-to-digital converter 1342. Also, when sensor unit is turned "ON", a convert pulse signal is provided to the write input of analog-to-digital converter 1342. Analog-to-digital converter 1342 provides a parallel binary output indicative of the pressure sensed. These outputs are provided to shift register 1352. As stated above, microprocessor 2322 clocks the sensor unit 1000 so that the binary data indicative of pressure sense is received by receiver unit 2000.

Microprocessor 2322 compares this second value of pressure sensed to the first value of pressure sensed. If the value is the same or approximately the same, microprocessor 2322 averages these two values and converts the value to a ASCII code and stores them in the display array. If the values are not approximately the same, microprocessor 2322 takes another pressure reading and compares the values again. The next time the display task is executed, this data is sent to the LCD display controller 2334 from SCL/P0.0 and SDA/P0.1 outputs of microprocessor 2322. The value of the ASC II code is received in the SCL input and an SDA input of LCD display controller 2334. LCD display controller 2334 drives LCD display 2312 so that the pressure is readable as a three-digit number. Microprocessor 2322 sends the ASCII signal indicative of pressure serially to LCD display controller 2334. The transmission from microprocessor 2322 to LCD controller 2334 is across an I2C bus. LCD display controller 2334 provides all scanning functions for LCD display 2312.

Figure 22:
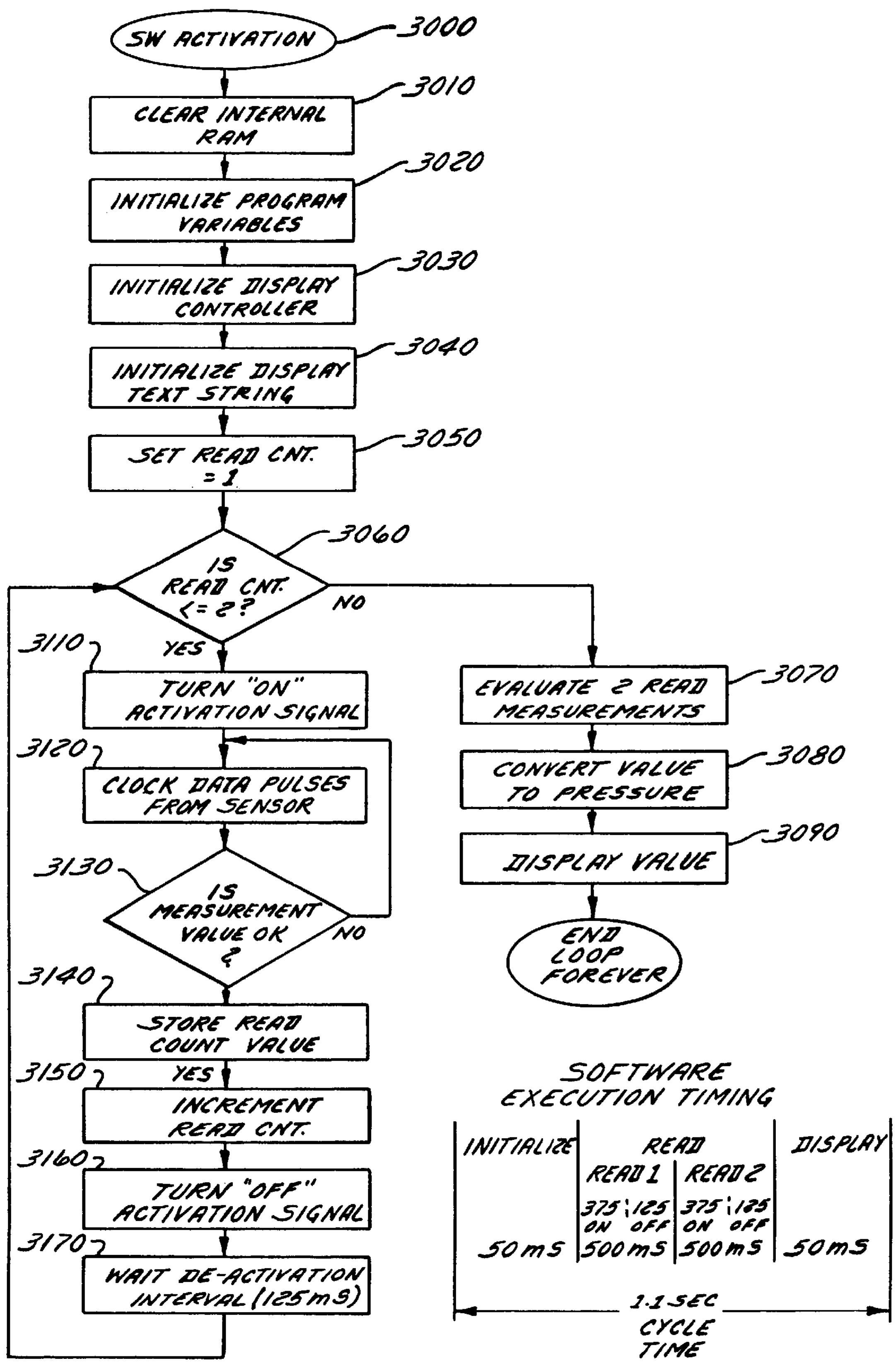
FIG. 22 is a flow chart of a preferred embodiment of the software used in a receiver unit.

With respect to FIG. 22, the software (Appendix A) of receiver unit 2000 is described as follows: Microprocessor 2322 runs certain background routines which execute during the main program execution sequence. An interval timer program runs every 25 milliseconds in the background. This timer keeps track of when timed tests need to run and timed functions are complete. At every 25 millisecond interval, the timer asks the operating system to run the display task and the AID converter read tasks. The display task takes the 3-digit display data and sends it out to LCD Display controller 2334. This display task runs asynchronously with respect to the rest of the program. The display task calls the I2C bus driver module which handles the special interface protocol to the display controller 2334. The AID converter read task takes sequential steps to read the data.

When the operator presses switch 2410 on the receiver unit 2000, power is applied to the circuitry (step 3000). After a short reset pulse to microprocessor 2322 from the network composed of resistor 2329 and capacitor 2328, the software program begins to execute. Microprocessor 2322 ports are then initialized (step 3020), the internal RAM is cleared (set to 00H) (step 3010), the timers are set up, the display controller 2334 is initialized (step 3030), the display text string is initialized (step 3040), the first read is started (step 3050), and then control of the program is turned over to the operating system.

At this point, the timer interrupt is running, the display task is refreshing display controller 2334, and the AID read task is executed every 25 milliseconds. The AID read task determines if receiver unit 2000 has read sensor unit 1000 twice (step 3060). If not, receiver unit 2000 begins to read sensor unit 1000.

In a read sequence, receiver unit 2000 activates sensor unit 1000 with infrared read transmission carrier frequency (step 3110). The analog-to-digital conversion will begin in sensor unit 1000. Next, receiver unit 2000 clocks out the 8 bits of data from serial shift register 1352 (step 3120). Sensor unit 1000 sends a 38 kHz carrier frequency which are detected by receiver unit 2000. Receiver unit 2000 verifies the signal from sensor unit 1000 (step 3130). If the value is verified, receiver unit 2000 stores the value (step 3140). If the signal is not verifiable, receiver unit 2000 clocks the data from sensor unit 1000 (step 3120). After the measurement is stored, the read count value is incremented (step 3150). Receiver unit 2000 ceases sending activation signals after the value is stored (step 3160). Receiver unit 2000 waits for the deactivation time to be reached. In response to the absence of activation signals for 125 milliseconds, sensor unit 1000 is turned "OFF" (step 3170).

After sensor unit 1000 is turned "OFF", the A/D read task evaluates the read count (step 3060). Since the read count is less than 2 (first count sequence), another read will be executed. The sequence is repeated again for the second read. The measurement task will then compare the data for consistency (step 3130). If not consistent, receiver unit 2000 reads sensor unit 1000 again (step 3120).

Assuming two consistent readings have occurred, the read sequence continues until sensor unit 1000 is turned "OFF". After the second read, receiver unit 2000 evaluates the read count (step 3060) and evaluates and averages the two measurements (step 3070). Next, receiver unit 2000 converts the data to ASCII digits (step 3080), and stores the ASCII digits in the display array (step 3090). The program then ends (step 3100).

The next time the display task is executed, the ASCII digits are sent to display controller 2334, where it is placed on the LCD 2312. This concludes the software program execution period. LCD 2312 maintains its display for as long as the power button is pressed.

During the read sequence, the LCD 2312 will display "(CAL)", which means calculating pressure. This is displayed until one of several events occurs:

(1) The pressure readings are complete, at which time the pressure is displayed.

(2) A reading of pressure less than 15 pounds is measured. Due to offsets in sensor unit 1000 and gain amplifier 1330 readings of less than 15 pounds are ignored. The LCD display 2312 displays a "LPS", which means low pressure.

(3) If the pressure reading of 0 is measured, it is assumed that sensor unit 1000 is not functional or not present at all. It assumes no response, and the LCD display 2312 will display (CSE), which means check sensor.

Figure 23:
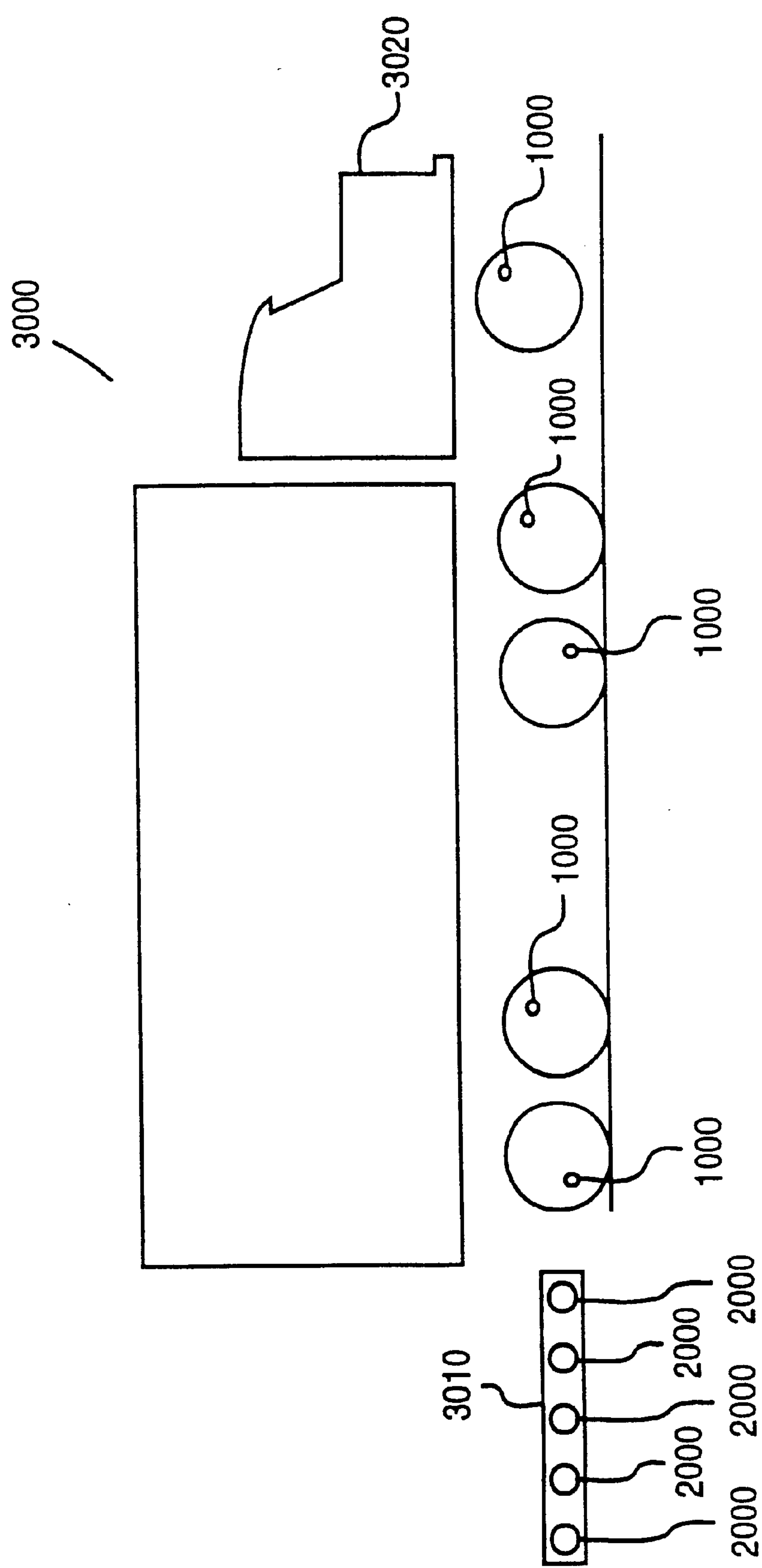
FIG. 23 shows sensor units and receiver units in a drive-by truck tire measuring system.

In another application of the sensing and receiving system, sensor units 1000 can be employed on truck tires and receiver units 2000 can be employed along a 6-foot long bar. With reference to FIG. 23, a truck 3000 or other car drives by receiver units 2000 and the pressure of the tires is read. Receiver units 2000 are employed along a 6-foot bar 3010 located above the ground. This configuration ensures that the sensor units 1000 are sensed as the truck wheels turn. Alternatively, bar 3010 may be employed vertically from the ground. Alternatively, infrared detectors like infrared receiver circuit 2100 or infrared detector 2110 could be employed on bar 3010 rather than an entire unit 2000. The identification features of sensor unit 400 may be utilized to provide identification of each tire.

Receiver units 2000 provide the pressure data to a large display situated so that the driver can read the display from cab 3020 of truck 3000. The display may be employed as red and green lights so that a red light is illuminated if any sensor 1000 transmits an unsafe pressure value. If all sensor units 1000 transmit safe pressure values, a green light is illuminated. This application is desirable in light of the stricter regulations regarding truck tire pressures on highways.

In another application, sensor unit 1000 or sensor unit 400 can be employed in an operating room (Not Shown). Operating rooms are pressurized so that when the door opens, various germs are expelled out of the operating room. Sensor unit 4000 is employed in the operating room to measure pressure. Receiver unit 2000 is employed outside of the operating room or inside the operating room so that the pressure value may be easily read. Thus, sensor unit 1000 has an application in a work piece like an operating room.

Also, sensor unit 4000 is employed in various operating tools such as drills or other pressure related instruments which rely on pressure for proper operation. The pressure associated with the tool is easily read by operating room personnel with receiver unit 2000.

The above description provides three examples of implementations of the sensing and receiving system. The logic gates, microprocessor, displays, LEDs, amplifiers, preamplifiers can be replaced with other components to achieve a remote sensing and receiving system of the present invention. Further, the software, frequency of carrier waves, and method of communication can be modified without differing from the present invention as recited in the claims.

It will be understood that while the various conductors/connectors may be depicted in the drawings as single lines, they are not shown in a limiting sense and may comprise plural conductors/connectors as understood in the art. Further, the above description is of preferred exemplary embodiments of the present invention; the invention is not limited to the specific forms shown. For example, while sensor unit 400 has been shown, it is understood that various sensing devices could be substituted. In addition, the transducer circuit need not have an independent power source; rather, power may be delivered from the transmitter unit to the transducer unit, as desired. Further still, the invention has been described with reference to block diagrams. These function blocks can be combined into the same device or separated into different discrete devices. For instance, the entire sensor unit 400 could be implemented as one integrated chip. These and other modifications may be made in the design and arrangement of the elements discussed herein without departing from the scope of the invention as expressed in the appended claims.

- Remote Pressure Sensor Design - o Software Listings

In the many pages that follow are the actual software program source listings. These modules will generate the code needed to be programmed into the handheld controller EPROM for use in the prototype.

The source was written in PLM-51 language except for two modules. These modules are IVECTOR and I2CBUS which are written in 8051 assembly language.

The program code was compiled/assembled and linked using Intel software development tools; PLM-51 and ASM-51. Note that certain PLM-51 library routines utilized use LJMP statements which will not run under the 80C751 microprocessor. Therefore this code must be substituted with the SJMP statements with last substitute byte a NOP (LJMP - 3 byte, SJMP - 2 byte & NOP - 1 byte). In this program, the library routine P0040S has this one statement. The IVECTOR routine was written to substitute the automatic interrupt vector generation by the compiler.

APPENDIX A

- Remote Pressure Sensor Design -

RPS.PUB -

```
$IC (rps.lit)

/* THIS FILE CONTAINS THE PUBLIC DECLARATIONS FOR THE MAJORITY OF ALL
VARIABLES USED IN THIS PRODUCT */
        Declare
                OS Structure ( Display          Bit,
                               Calc_Pressure    Bit,
                               Measure          Bit,
                               AD_Read          Bit) Pub Main,
                XmtDat                           (4)Byte        Pub
Main,
                Display Structure (Control      Byte,
                                                 Digit1  Byte,
                                                 Digit10 Byte,
                                                 Digit100       Byte)
AT(.XmtDat) Main,
                Freq_Array  (NUMB_READS)Byte    Pub     Main,
                Err_Delay_Cnt           Byte    Pub     Main,
                Interval_Cnt            Byte    Pub     Main,
                Data                            Byte    Pub     Main,
                Bit_Cnt                 Byte    Pub     Main,
                Read_Cnt                        Byte    Pub     Main,
                Read_State              Byte    Pub     Main,
                NoAck                   Bit     Pub     Main,
                Fault                   Bit     Pub     Main,
                Retry                   Bit     Pub     Main,
                Read_Flag                       Bit     Pub     Main;

/* CHARACTER GENERATOR FOR THE PDF-8577 I2C DISPLAY CONTROLLER */
/* CHARACTER NUMBERS 0, 1, 2, 3, 4, 5, 6, 7, 8, 9 */
/* CHARACTER LETTERS C, A, L, P, E */
        Declare
                Dec_I2C8577      (15D)Byte Pub Constant
                ( 3FH, 06H, 5BH, 4FH, 66H, 6DH, 7CH, 07H, 7FH, 67H,
                  39H, 77H, 38H, 73H, 79H  );

/*          A                   Char - DP  G  F  E  D  C  B  A - Value
         -------                ------------------------------------------
   F    !       ! B              0   -  0  0  1  1  1  1  1  1 = 3FH
        !       !                1   -  0  0  0  0  0  1  1  0 = 06H
         -------                 2   -  0  1  0  1  1  0  1  1 = 5BH
   E    !   G   ! C              3   -  0  1  0  0  1  1  1  1 = 4FH
        !       !                4   -  0  1  1  0  0  1  1  0 = 66H
         -------                 5   -  0  1  1  0  1  1  0  1 = 6DH
            D                    6   -  0  1  1  1  1  1  0  0 = 7CH
                                 7   -  0  0  0  0  0  1  1  1 = 07H
                                 8   -  0  1  1  1  1  1  1  1 = 7FH
                                 9   -  0  1  1  0  0  1  1  1 = 67H
                                 C   -  0  0  1  1  1  0  0  1 = 39H
                                 A   -  0  1  1  1  0  1  1  1 = 77H
                                 L   -  0  0  1  1  1  0  0  0 = 38H
```

- Remote Pressure Sensor Design -

```
P   -  0  1  1  1  0  0  1  1 = 73H
E   -  0  1  1  1  1  0  0  1 = 79H          */
```

- 70 -

- Remote Pressure Sensor Design -

RPS.EXT -

```
$IC (rps.lit)

/* THIS FILE CONTAINS THE EXTERNAL DECLARATIONS FOR THE MAJORITY OF
ALL VARIABLES USED IN THIS PRODUCT */

        Declare
                OS Structure ( Display        Bit,
                               Calc_Pressure  Bit,
                               Measure        Bit,
                               AD_Read        Bit ) Ext Main,
                XmtDat                          (4)Byte Ext Main,
                Display Structure ( Control   Byte,
                                              Digit1  Byte,
                                              Digit10 Byte,
                                              Digit100 Byte )
                                              AT(.XmtDat) Main,

                Freq_Array  (NUMB_READS)      Byte    Ext     Main,
                Err_Delay_Cnt                 Byte    Ext     Main,
                Interval_Cnt                  Byte    Ext     Main,
                Data                          Byte    Ext     Main,
                Bit_Cnt                       Byte    Ext     Main,
                Read_Cnt                      Byte    Ext     Main,
                Read_State                    Byte    Ext     Main,
                NoAck                         Bit     Ext     Main,
                Fault                         Bit     Ext     Main,
                Retry                         Bit     Ext     Main,
                Read_Flag                     Bit     Ext     Main;

        Declare
                Dec_I2C8577      (15D)Byte Ext Constant;
```

- Remote Pressure Sensor Design -

RPS.LIT -

```
/* LITERALS */

        Declare
                EXT         LITERALLY       'EXTERNAL',
                AUX         LITERALLY       'AUXILIARY',
                PUB         LITERALLY       'PUBLIC',
                REG         LITERALLY       'REGISTER';

/* PROGRAM LITERALS */

        Declare
                MAX_STATE       LITERALLY       '3D',/* state 0 to 3*/
                DISPLAY_INTRVL  LITERALLY       '4D', /* 100mS */
                CLOCK_INTRVL    LITERALLY       '1D', /* 25mS */
                NUMB_READS      LITERALLY       '2D';

/* REGISTER DECLARATIONS FOR 83C751 PROCESSOR */

        Declare
                P0              Byte            AT(80H)Reg,
                P1              Byte            AT(90H)Reg,
                P3              Byte            AT(0B0H)Reg,
                SP              Byte            AT(81H)Reg,
                TL0             Byte            AT(8AH)Reg,
                TH0             Byte            AT(8CH)Reg,
                RTL1            Byte            AT(8BH)Reg,
                RTH1            Byte            AT(8DH)Reg,
                TCON            Byte            AT(88H)Reg,
                PCON            Byte            AT(87H)Reg,
                I2CON           Byte            AT(98H)Reg,
                I2CFG           Byte            AT(0D8H)Reg,
                I2DAT           Byte            AT(99H)Reg,
                I2STA           Byte            AT(0F8H)Reg,
                IE              Byte            AT(0A8H)Reg;
```

- Remote Pressure Sensor Design -

INTRVL.PLM -

```
INTRVL: DO;

$IC (RPS.Ext)

Timer_25mS$$:   Procedure Pub Using 1;

        TH0 = 9EH; /* SET TIMER FOR NEXT 25mS (9E58H) */
        TL0 = 6EH; /* adjust for 8031 and plm code */
                        /* PIV03 - 14 uS, Set TH1/TL1 - 4 uS */
                        /* Int Latency - 4-5 uS w/o MUL/DIV */
                        /* Total = 22 to 23 uS */
                        /* Adj = 22 uS (16H) */
                        /* Count = 9E58 + 16 = 9E6EH */

/* CHECK FOR DISPLAY TASK TO BE RUN */
        Interval_Cnt= Interval_Cnt + 01H;
        If Interval_Cnt >= DISPLAY_INTRVL Then
                Do;
                OS.Display = 1H;
                Interval_Cnt = 00H;
                End;

/* Time to request A/D read sequence OS task */
        If (Interval_Cnt MOD CLOCK_INTRVL) = 00H Then
                Do; /* Time is right */
                OS.AD_Read = 1H; /* Request is made (flag set) */
                End;

        End; /* Procedure */

        End; /* INTRVL MODULE */
```

- 73 -

- Remote Pressure Sensor Design -

PWR UP.PLM -

```
PWR_UP:          Do;

$IC (RPS.PUB)

        Display_Task$$:          Procedure Ext; End;
        Measure_Task$$:          Procedure Ext; End;
        AD_Read_Task$$:          Procedure Ext; End;
        I2CBus$$:                Procedure Ext; End;
        Calc_Pressure_Task$$:    Procedure Ext; End;
        Display_CAL$$:           Procedure Ext; End;

Power_Up$$: Do; /* Start of Program - Main */

        Declare
                Cnt Byte AT(03H) Main,
                Data_Reg Based Cnt Byte Main;

/* Init Ports */
Start:  P0 = 0FFH; /* I2C Port Pins */
        P1 = 0FFH;
        P3 = 0FEH; /* P3.0 is low to keep transmitter "off" */

/*   Delay de-activation time for sensor */
        Call Time(250D); /* 25mS */
        Call Time(250D); /* 25mS */
        Call Time(250D); /* 25mS */
        Call Time(250D); /* 25mS */

/* Zero RAM Locations */

        Cnt = 10H;
        Do While (Cnt <= 3FH);
                Data_Reg = 00H;
                Cnt = Cnt + 01H;
        End; /* Do While */

/* Continue Register Initialization */
        TL0 = 6EH;      /* Setup 25 mSEC Tmr - 9E58 + 16 (int dly) */
        TH0 = 9EH;
        RTL1 = 00H;     /* Setup I2C Port Timing */
        RTH1 = 00H;
        I2CFG = 70H;    /* I2C Config...Master,Enable, Speed */
        TCON = 15H;     /* Enable Tmr 0 & Tmr 1,Int 0 is Neg Edge */
        IE = 82H;       /* Enable INT'S - Global, Tmr0 */

/*   Initialize Display Controller */
        Call Display_CAL$$;
/*   Setup for first measurement value */
        Read_Flag = 1H; /* Start read activation Pulses */
        Read_Cnt = 00H; /* Set measurement reading to number 1 */
        Read_State = 00H; /* Set to proper state */
```

- Remote Pressure Sensor Design -

```
/* OS Scheduler - Controls software from here */

        Do While 1;
        If OS.AD_Read Then
                Do;
                Call AD_Read_Task$$;
                OS.AD_Read = OH;
                End;
        If OS.Measure Then
                Do;
                Call Measure_Task$$;
                OS.Measure = OH;
                End;
        If OS.Calc_Pressure Then
                Do;
                Call Calc_Pressure_Task$$;
                OS.Calc_Pressure = OH;
                End;
        If OS.Display Then
                Do;
                Call Display_Task$$;
                OS.Display = OH;
                End;
        End; /* Do While */

        End; /* Power Up Procedure */

        End; /* PWR_UP (Main) Module */
```

- Remote Pressure Sensor Design -

DSPTSK.PLM -

```
Dsptsk: Do;

$IC (RPS.Ext)

        SendData$$:     Procedure       Ext;    End;

        Declare
                StackSave Byte  Pub Main,
                SlvAdr  Byte    Pub Main,
                ByteCnt Byte    Pub Main,
                BitCnt  Byte    Pub Main;

Display_CAL$$:          Procedure Pub;

        /* Blank Display */
        Display.Control = 00H;
        Display.Digit1 = DEC_I2C8577(12D);
        Display.Digit10 = DEC_I2C8577(11D);
        Display.Digit100 = DEC_I2C8577(10D);
        SlvAdr  = 74H;
        Retry = 1H; /* Default into loop */
        Do While (Retry);
                ByteCnt = 04H;
                Call SendData;
        End;

        End; /* Display Calculate Procedure */


Display CSE$$:          Procedure Pub;

        /* Blank Display */
        Display.Control = 00H;
        Display.Digit1 = DEC_I2C8577(14D);
        Display.Digit10 = DEC_I2C8577(05D);
        Display.Digit100 = DEC_I2C8577(10D);
        SlvAdr  = 74H;
        Retry = 1H; /* Default into loop */
        Do While (Retry);
                ByteCnt = 04H;
                Call SendData;
        End;

        End; /* Display Check Pressure Sensor Procedure */


Display_CLS$$:          Procedure Pub;

        /* Blank Display */
        Display.Control = 00H;
        Display.Digit1 = DEC_I2C8577(05D);
```

```
        Display.Digit10 = DEC_I2C8577(12D);
        Display.Digit100 = DEC_I2C8577(10D);
        SlvAdr  = 74H;
        Retry = 1H; /* Default into loop */
        Do While (Retry);
                ByteCnt = 04H;
                Call SendData;
        End;

        End; /* Display Closer Procedure */

Display_LPS$$:          Procedure Pub;

        /* Blank Display */
        Display.Control = 00H;
        Display.Digit1 = DEC_I2C8577(05D);
        Display.Digit10 = DEC_I2C8577(13D);
        Display.Digit100 = DEC_I2C8577(12D);
        SlvAdr  = 74H;
        Retry = 1H; /* Default into loop */
        Do While (Retry);
                ByteCnt = 04H;
                Call SendData;
        End;

        End; /* Display Low Pressure Procedure */

Display_Task$$: Procedure Pub;

        /* Send Control and three digits to display controller */
        /* control data....data set in PRSTSK */
        Display.Control = 00H;
        SlvAdr  = 74H;
        Retry = 1H; /* Default into loop */
        Do While (Retry);
                ByteCnt = 04H;
                Call SendData;
        End;

        End; /* Display Task Procedure */

        End; /* Dsptsk Module */
```

- Remote Pressure Sensor Design -

AD_READ.PLM -

```
AD_READ: DO;

$IC (RPS.Ext)

        Declare
                AD_DI    Bit AT(90H)Reg,
                AD_CLK   Bit AT(0B0H)Reg;

        Display_CSE$$: Procedure Ext; End;

AD_Read_Task$$: Procedure Pub;

        If Read_State > MAX_STATE Then
                Read_State = MAX_STATE; /* Set to Error/Sleep State */
        Do Case (Read_State);

        WAKE_UP:/* State 0 */
                Do; /* Should we wake up or sleep */
                IF Read_Flag Then
                        Do; /* Wake Up...Work To Do */
                        Read_State = 01H; /* Wake Up Please */
                        Err_Delay_Cnt = 00H; /* init to zero */
                        End;
                Else
                        Do;/* Do Nothing.....I'M SLEEPING...ZZZZZZ */
                        End;
                End;

        CONVERT:/* State 1 */
                Do; /* Do Clock Conversion Low and High */
                If AD_CLK Then
                        Do; /* Clock is High so set Low - Edge 2 */
                        AD_CLK = 0H;
                        Bit_Cnt = 00H;
                        Data = 00H;
                        Read_State = 02H; /* Set to Read */
                        End;
                Else
                        Do; /* Clock is Low so set High - Edge 1 */
                        AD_CLK = 1H;
                        End;
                End;

        READ_BIT: /* State 2 */
                Do; /* Do Bit Read Clock Low and High */
                If AD_CLK Then
                        Do; /* Clock is High so set Low - Even Edge */
                        /* Check if all bits are read */
                        If Bit_Cnt >= 08H Then
                                Do; /* All Bits read, finish cycle */
                                Read_State = 03H; /* Set to Sleep */
```

```
                        Read_Flag = OH; /* Read Complete */
                        End;
                AD_CLK = OH;
                End;
        Else
                Do; /* Clk is Low, set High after bit read */
                /* Shift Data (Bit Register) left by 1 */
                /* Read P1 and strip all bits except 0 */
                /* Add contents to data to pick up bit */
                Data = SHL(Data,1) + (NOT(P1) AND 01H);
                Bit_Cnt = Bit_Cnt + 01H;/* rcv'd now incr */
                AD_CLK = 1H;
                End;
        End;

SLEEP: /* State 3 */
        Do; /* Sleep ..Clr CLK, wait for remote to shut off */
            /* Then go to Start State to await read flag */
            /* happened. Cnt is # of 50mS intervals (250mS) */
        If Err_Delay_Cnt < 5D Then
                Do; /* Increment Count */
                Err_Delay_Cnt = Err_Delay_Cnt + 01H;
                AD_CLK = OH; /* Insure transmitter off */
                End;
        Else

                Do: /* Time to evaluate if error or end */
                If Read_Flag Then
                        Do; /* Still Set must be error */
                        Read_State = 01H; /* Set to Wake-Up */
                                          /* Repeat reading */
                        End;
                Else
                        Do; /* Not Set must complete call OS*/
                        OS.Measure = 1H; /* Run measure Tsk */
                        Read_State = 00H;/* Go to Start and */
                                        /* wait 4 read flag */
                        End;
                End;
        End;
End; /* Do Case */

/* Kill task and wait for request in 50mS */
OS.AD_Read = OH;

End; /* Procedure */

End; /* AD_READ MODULE */
```

- Remote Pressure Sensor Design -

MSRTSK.PLM -

```
MSRTSK:  DO;

$IC (RPS.ext)


Measure_task$$: Procedure Pub;

        Freq_Array(Read_Cnt) = Data;
        Read_Cnt = Read_Cnt + 01H; /* inc read measurement count */
        If Read_Cnt < NUMB_READS then
                Do; /* Take another measurement */
                Read_Flag = 1H; /* activate read sequence */
                End;
        Else
                Do; /* "NUMB_READS"  measurements done */
                If Freq Array(0) <> Freq Array(1) Then
                        Do;
                        Freq_Array(0) = Freq_Array(1);
                        Read_Cnt = 01H; /* Do Again */
                        Read_Flag = 1H;
                        End;
                Else
                        OS.Calc Pressure = 1H; /* Set calculate task
*/
                End;

        End; /* Procedure */

        End; /* Msrtsk Module */
```

- 80 -

- Remote Pressure Sensor Design -

PRSTSK.PLM -

```
PRSTSK:  Do;

$IC (RPS.ext)

        Display_CSE$$: Procedure Ext; End;
        Display_LPS$$: Procedure Ext; End;

Calc_Pressure_Task$$:   Procedure Pub;

        Declare
                Temp Byte Main;

/* Calculate average value reads from A/D. There are 2 reads */
        Temp = (Freq_Array(0) + Freq_Array(1)) / 2;

        /* Test if very low pressure...if so display low pressure */
        If Temp < 15D Then
                Do;
                If Temp = 00H Then
                        Do;
                        Call Display_CSE$$; /* no reading */
                        Do While 1;
                        End;
                        End;
                Else
                        Do;
                        Call Display_LPS$$;
                        Do While 1;
                        End; /* Do While */
                        End;
                End;
        Else
                Do; /* Pressure is not low...so calc display */
                    /* Take pressure val and convert to 3 digits */
                        /* for display */
                Display.Digit100 = DEC_I2C8577(Temp/100D); /* 100's */
                Temp = Temp MOD 100D; /* remainder */
                Display.Digit10 = DEC_I2C8577(Temp/10D); /* tens */
                Display.Digit1 = DEC_I2C8577(Temp MOD 10D); /* ones */
                End;

        End; /* Procedure */

        End; /* Prstsk Module */
```

- Remote Pressure Sensor Design -

IVECTOR.A51 -

```
        Extrn Code (Timer_25mS)
        Public  TMR0_I

        CSEG AT(000BH)              ;Timer Interrupt 0 Vector (Int 1)
        LJMP    TMR0_I

        Int_Vector_0    SEGMENT CODE
        RSEG    Int_Vector_0

;***************************************************************;
Timer Interrupt 0 Vector using 1.....Code Begin
;***************************************************************
TMR0_I: PUSH    Acc
        PUSH    PSW
        MOV     PSW,#01
        ACALL   Timer_25mS
        POP     PSW
        POP     Acc
        RETI

        END
```

- Remote Pressure Sensor Design -

I2CBUS.A51 -

```
        Public  SendData
        Extrn   Data (XmtDat, BitCnt, ByteCnt, SlvAdr, StackSave)
        Extrn   Bit (Retry, Fault, NoAck)

        I2CBUS_PROC     SEGMENT         CODE
        RSEG    I2CBUS_PROC

        CTVAL   EQU     00H     ;CT1,CT0 bit values for I2C.

        ;Masks for I2CFG bits.
        BTIR    EQU     10H     ;Mask for TIRUN bit.
        BMRQ    EQU     40H     ;Mask for MASTRQ bit.

        ;Masks for I2CON bits.
        BCXA    EQU     80H     ;Mask for CXA bit.
        BIDLE   EQU     40H     ;Mask for IDLE bit.
        BCDR    EQU     20H     ;Mask for CDR bit.
        BCARL   EQU     10H     ;Mask for CARL bit.
        BCSTR   EQU     08H     ;Mask for CSTR bit.
        BCSTP   EQU     04H     ;Mask for CSTP bit.
        BXSTR   EQU     02H     ;Mask for XSTR bit.
        BXSTP   EQU     01H     ;Mask for XSTP bit.

        SCL     Bit     P0.0    ;Port bit for I2C serial clock line.
        SDA     Bit     P0.1    ;Port bit for I2C serial data line.

        CLRTI   Bit     0DDH    ;I2C Config - Clr Timer I Int flag
        TIRUN   Bit     0DCH    ;I2C Configuration - Timer I run
        ATN     Bit     9EH     ;I2C Control - Attention Flag
        ETI     Bit     0A8H    ;Int Enable - I2C Interrupt Enable
        DRDY    Bit     9DH     ;I2C Control - Data Ready Bit
        MASTRQ  Bit     0DEH    ;I2C Configuration - Master Request
        MASTER  Bit     99H     ;I2C Configuration - Master Ack
        RDAT    Bit     9FH     ;I2C Configuration - Receive data bit

        I2DAT   Data    99H     ;I2C Data register
        I2CFG   Data    0D8H    ;I2C Bus Configuration register
        I2CON   Data    98H     ;I2C Bus control register

;*****************************************************************;
I2C Bus Interface Interrupt......Code Begin
;*****************************************************************
; Interrupt Vector - Timer I timeout indicates a 'hung' bus.
                ORG     1BH     ;Timer I (I2C timeout) interrupt.
TimerI: SETB    CLRTI           ;Clear timerI interrupt.
                CLR     TIRUN
                ACALL ClrInt            ;Clear interrupt pending.
                MOV     SP,StackSave ;Restores stack for ret to main.
                AJMP    Recover         ;Attempt Bus Recovery.
ClrInt: RETI
```

- Remote Pressure Sensor Design -

```
;*************************************************************
;I2C Bus Interface Xmit and Rcv Routines......Code Begin
;*************************************************************
; Send data byte(s) to slave.
; Enter with slave address in SlvAdr, data in XmtDat buffer,
; # of data bytes to send in ByteCnt.
SendData:        CLR     NoAck          ;Clear error flag.
                 CLR     Fault
                 CLR     Retry
                 MOV     StackSave,SP   ;Save, SP Save stack address
                                        ;for bus fault.
                 MOV     A,SlvAdr       ;Get slave address.
                 ACALL SendAddr         ;Get bus and send slave address.
                 JB      NoAck,SDEX     ;Check for missing acknowledge.
                 JB      Fault,SDatErr  ;Check for bus fault.
                 MOV     RO,#XmtDat     ;Set Start of transmit buffer.
SDLoop: MOV      A,@RO                  ;Get data for slave.
                 INC     RO
                 ACALL XmitByte         ;Send data to slave.
                 JB      NoAck,SDEX     ;Check for missing ack.
                 JB      Fault,SDatErr  ;Check for bus fault.
                 DJNZ    ByteCnt,SDLoop
SDEX:   ACALL SendStop                  ;Send an I2C stop.
                 RET
; Handle a transmit bus fault.
SDatErr:         AJMP    Recover        ;Attempt bus recovery.

;*************************************************************;
                 Subroutines
;*************************************************************
; Send address byte.
; Enter with address in ACC.
SendAddr: MOV    I2CFG,#BMRQ+BTIR+CTVAL   ;Request I2C bus.
                 JNB     ATN,$            ;Wait for bus granted.
                 JNB     Master,SAErr     ;Should have become the bus
                                          ;master.
SendAd2:         MOV     I2DAT,A          ;Send first bit, clears DRDY.
                 MOV     I2CON,#BCARL+BCSTR+BCSTP    ;Clear start,
                                          ;releases SCL.
                 ACALL XmitAddr           ;Finish sending address.
                 RET
SAErr:  SETB     Fault                    ;Return bus fault status.
                 RET

; Byte transmit routine.
; Enter with data in ACC.
; XmitByte : transmits 8 bits.
; XmitAddr : transmits 7 bits (for address only).
XmitAddr:        MOV     BitCnt,#8        ;Set 7 bits of address count.
                 SJMP    XmBit2
XmitByte:        MOV     BitCnt,#8        ;Set 8 bits of data count.
XmBit:  MOV      I2DAT,A                  ;Send this bit.
XmBit2: RL       A                        ;Get next bit.
                 JNB     ATN,$            ;Wait for bit sent.
```

- Remote Pressure Sensor Design -

```
                JNB     DRDY,XMErr        ;Should be data ready.
                DJNZ    BitCnt,XmBit      ;Repeat until all bits sent.
                MOV     I2CON,#8CDR+8CXA    ;Switch to receive mode.
                JNB     ATN,$             ;Wait for acknowledge bit.
                JNB     RDAT,XMBX         ;Was there an ack?
                SETB    NoAck             ;Return no acknowledge status.
XMBX:   RET
XMErr:  SETB    Fault           ;Return bus fault status.
                RET

; I2C stop routine.
SendStop:       CLR     MASTRQ            ;Release bus mastership.
                MOV     I2CON,#8CDR+8XSTP       ;Generate a bus stop.
                JNB     ATN,$             ;Wait for atn.
                MOV     I2CON,#8CDR       ;Clear data ready.
                JNB     ATN,$             ;Wait for stop sent.
                MOV     I2CON,#8CARL+8CSTP+8CXA ;Clear I2C bus.
                CLR     TIRUN             ;Stop timer I.
                RET

; I2C repeated start routine.
; Enter with address in ACC.
RepStart:       MOV     I2CON,#8CDR+8XSTR       ;Send repeated start.
                JNB     ATN,$             ;Wait for ATN.
                MOV     I2CON,#8CDR       ;Clear data ready.
                JNB     ATN,$             ;Wait for repeated start sent.
                MOV     I2CON,#8CARL+8CSTR      ;Clear start.
                RET

; Bus fault recovery routine.
Recover:        ACALL FixBus              ;See if bus is dead or can be
                                          ;'fixed'.
                JC      BusReset          ;If not 'fixed', try extreme
                                          ;measures.
                SETB    Retry   ;If bus OK, return to main routine.
                CLR     Fault
                CLR     NoAck
                SETB    CLRTI
                SETB    TIRUN             ;Enable timer I.
                SETB    ETI               ;Turn on timer I interrupts.
                RET

; This routine tries a more extreme method of bus recovery.
; This is used if SCL or SDA are stuck and cannot otherwise be freed.
; (will return to the Recover routine when Timer I times out)
BusReset:       CLR     MASTRQ            ;Release bus.
                MOV     I2CON,#0BCh       ;Clear all I2C flags.
                SETB    TIRUN
                SJMP    $                 ;Wait for timer I timeout
                                          ; (this will reset the I2C
                                          ; hardware).

; This routine attempts to regain control of I2C bus after a bus flt.
; Returns carry clear if successful, carry set is failed.
```

- Remote Pressure Sensor Design -

```
FixBus: CLR     MastRQ          ;Turn off I2C functions.
        SETB    C
        SETB    SCL     ;Insure I/O port is not locking I2C
        SETB    SDA
        JNB     SCL,FixBusEx    ;If SCL is low, bus cannot be
                                        ;'fixed'.
        JB      SDA,RStop       ;If SCL & SDA are high, force
                                ;a stop.
        MOV     BitCnt,#9       ;Set max # tries to clr bus.
ChekLoop:       CLR     SCL     ;Force an I2C clock.
        ACALL SDelay
        JB      SDA,RStop               ;Did it work?
        SETB    SCL
        ACALL SDelay
        DJNZ    BitCnt,ChekLoop ;Repeat clks until either SDA
                                ; clrs or we run out of tries.
        SJMP    FixBusEx    ;Failed to fix bus by this method.
RStop:  CLR     SDA         ;Try forcing a stop since SCL & SDA
        ACALL SDelay        ; are both high.
        SETB    SCL
        ACALL SDelay
        SETB    SDA
        ACALL SDelay
        JNB     SCL,FixBusEx    ;Are SCL & SDA still high?
                                ; If so, assume bus is now OK,
        JNB     SDA,FixBusEx    ; and return
        CLR     C               ; with carry cleared.
FixBusEx:       RET

; Short delay routine (10 machine cycles).
SDelay: NOP
        NOP
        NOP
        NOP
        NOP
        NOP
        NOP
        NOP
        RET

        END
```

What is claimed is:

1. A sensor and display system comprising:

a sensor unit, receptive to a command signal, that includes a transducer and a transmitter, where the transducer is coupled to a vessel and senses a parameter of the vessel, and where the transmitter is operatively coupled to the transducer and generates a response signal indicative of the parameter in response to the sensor receiving the command signal; and a display unit in remote communication with the sensor unit and having a transmitter that transmits the command signal to the sensor; an antenna for remotely receiving from the sensor unit the response signal indicative of the parameter; a processor, operatively coupled to the transmitter and the antenna, that extracts from the response signal an indication of the parameter, and a display, operatively coupled to the processor, for displaying information relating to the parameter.

* * * * *